(12) United States Patent
Balasubramanian et al.

(10) Patent No.: US 10,972,876 B2
(45) Date of Patent: Apr. 6, 2021

(54) LOCAL BROADCAST FOR GROUP CALLS

(71) Applicant: QUALCOMM Incorporated, San Diego, CA (US)

(72) Inventors: Srinivasan Balasubramanian, San Diego, CA (US); Kuo-Chun Lee, San Diego, CA (US); Nagaraju Naik, San Diego, CA (US); Carlos Pazos, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 15/884,168

(22) Filed: Jan. 30, 2018

(65) Prior Publication Data

US 2019/0239032 A1    Aug. 1, 2019

(51) Int. Cl.
*H04W 4/06* (2009.01)
*H04W 72/00* (2009.01)
(Continued)

(52) U.S. Cl.
CPC ........... *H04W 4/06* (2013.01); *H04L 65/1069* (2013.01); *H04L 65/4076* (2013.01); *H04W 4/021* (2013.01); *H04W 4/08* (2013.01); *H04W 12/001* (2019.01); *H04W 12/0052* (2019.01); *H04W 12/00503* (2019.01); *H04W 72/005* (2013.01);
(Continued)

(58) Field of Classification Search
CPC ....... H04W 4/06; H04W 72/005; H04W 4/08; H04W 4/021; H04W 76/40; H04W 84/18; H04L 12/189; H04L 12/0052; H04L 12/00503; H04L 12/001
See application file for complete search history.

(56) References Cited

U.S. PATENT DOCUMENTS 9,215,567 B2    12/2015  Choi et al.
9,386,425 B2 *   7/2016  Yu ........................... H04W 4/08
(Continued)

FOREIGN PATENT DOCUMENTS

WO    WO2017146447 A1    8/2017
WO    WO2017167353 A1    10/2017

OTHER PUBLICATIONS

International Search Report and Written Opinion—PCT/US2019/015382—ISA/EPO—dated Mar. 29, 2019 (172846WO).

*Primary Examiner* — Stephen J Clawson
(74) *Attorney, Agent, or Firm* — Holland & Hart LLP

(57) ABSTRACT

Methods, systems, and devices for wireless communications are described for providing local broadcasts for group calls. A user equipment (UE) may request a group call, and either a base station or a local server dedicated to the base station may determine whether to allow the group call based at least in part on an assessed level of interest for the group call. If the group call occurs, the UE may perform one or more aspects of user plane processing for the broadcast data—such as setting Internet protocol (IP) addresses in IP packets, encryption, compression, or media formatting—and may transmit the broadcast data to the base station. The base station may then transmit the broadcast data to one or more interested UEs via one or more multicast transmissions without routing the broadcast data through other network nodes, which may reduce latency and provide other benefits.

25 Claims, 30 Drawing Sheets

(51) Int. Cl.
  *H04W 12/00*    (2021.01)
  *H04W 4/08*     (2009.01)
  *H04W 84/18*    (2009.01)
  *H04W 76/40*    (2018.01)
  *H04L 29/06*    (2006.01)
  *H04W 4/021*    (2018.01)
  *H04L 12/18*    (2006.01)

(52) U.S. Cl.
  CPC ........... *H04W 76/40* (2018.02); *H04W 84/18* (2013.01); *H04L 12/189* (2013.01); *H04L 69/04* (2013.01)

(56) References Cited

U.S. PATENT DOCUMENTS

| | | | | |
|---|---|---|---|---|
| 9,432,820 B2* | 8/2016 | Anchan | ................ | H04W 76/40 |
| 9,479,292 B2 | 10/2016 | Maaref et al. | | |
| 9,516,512 B2 | 12/2016 | Yi et al. | | |
| 2003/0083046 A1* | 5/2003 | Mathis | ................ | H04L 12/1818 |
| | | | | 455/412.1 |
| 2004/0038679 A1* | 2/2004 | Anttila | ................... | H04W 8/12 |
| | | | | 455/433 |
| 2005/0042987 A1* | 2/2005 | Lee | .................... | H04W 72/005 |
| | | | | 455/67.11 |
| 2005/0096017 A1* | 5/2005 | Kim | ........................ | H04W 4/06 |
| | | | | 455/414.1 |
| 2005/0118992 A1* | 6/2005 | Jeong | .................... | H04W 76/40 |
| | | | | 455/422.1 |
| 2006/0034202 A1* | 2/2006 | Kuure | ................... | H04L 12/189 |
| | | | | 370/312 |
| 2007/0293249 A1 | 12/2007 | Wang | | |
| 2011/0261747 A1* | 10/2011 | Wang | .................... | H04B 7/155 |
| | | | | 370/315 |
| 2012/0040621 A1* | 2/2012 | Jung | .................... | H04W 24/10 |
| | | | | 455/67.11 |
| 2012/0184320 A1* | 7/2012 | Tani | .................... | H04W 52/386 |
| | | | | 455/517 |
| 2013/0016645 A1* | 1/2013 | Moriwaki | ............. | H04L 12/185 |
| | | | | 370/312 |
| 2014/0079007 A1* | 3/2014 | Li | ......................... | H04W 28/10 |
| | | | | 370/329 |
| 2016/0044634 A1* | 2/2016 | Seo | ....................... | H04W 76/14 |
| | | | | 370/312 |
| 2016/0081115 A1* | 3/2016 | Pang | ..................... | H04W 56/001 |
| | | | | 370/329 |
| 2016/0087810 A1 | 3/2016 | Zhang et al. | | |
| 2016/0338094 A1* | 11/2016 | Faurie | ................. | H04W 72/085 |

* cited by examiner

LOCAL BROADCAST FOR GROUP CALLS

BACKGROUND

The following relates generally to wireless communication, and more specifically to local broadcast for group calls.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Some wireless communications systems may support broadcast services, such as multimedia broadcast multicast services (MBMS), by which a base station may simultaneously transmit the same data to multiple UEs. Systems and methods for improving the flexibility, simplicity, reliability, and latency of broadcast services are desired, including for group calls among multiple UEs.

SUMMARY

The described techniques relate to improved methods, systems, devices, or apparatuses that support local broadcast for group calls. A user equipment (UE), which may be referred to as a source UE, may request a group call, and either a base station or a local server dedicated to the base station may determine whether to allow the group call based at least in part on an assessed level of interest for the group call. If the group call occurs, the UE may perform one or more aspects of user plane processing for the broadcast data—such as setting Internet protocol (IP) addresses in IP packets, encryption, compression, or media formatting—and may transmit the broadcast data to the base station. The base station may then transmit the broadcast data to one or more interested UEs via one or more multicast transmissions without routing the broadcast data through other network nodes, which may reduce latency and provide other benefits.

In some examples, the local server may implement group management and security-related functions for local broadcast of group calls such as authenticating UEs and allowing UEs to form, join, or leave groups (which may be public or private) or assigning keys for encryption/decryption of broadcast data content. The local server may include or be coupled with a database of group-related information (e.g., group identifiers, UE identifiers, membership information regarding which UEs belong to which group(s), etc.). The local server may handle aspects of control plane processing for group calls. In some examples, an application server, which may be remote from the base station (e.g., may be cloud-based) and may be associated with a client application installed on UEs, may implement group management and security-related functions.

The base station, or the local server if present, may perform other aspects of control plane processing for local broadcast of group calls. For example, either the base station or the local server may implement setup and release functions for an associated broadcast session such as receiving and granting or denying group call requests from the source UE, receiving and granting or denying requests from other UEs (which may be referred to as target UEs) to receive broadcasts, or establishing and communicating the protocols and transmission resources (e.g., time, frequency, radio bearer, channel, etc.) that will be used for the broadcast session.

A method of wireless communication is described. The method may include assessing, for a plurality of target UEs, a level of interest in a broadcast session associated with a source UE, determining, based on the level of interest in the broadcast session, whether to allow the broadcast session to occur, and transmitting data received from the source UE to one or more target UEs based at least in part on the determining.

An apparatus for wireless communication is described. The apparatus may include means for assessing, for a plurality of target UEs, a level of interest in a broadcast session associated with a source UE, means for determining, based on the level of interest in the broadcast session, whether to allow the broadcast session to occur, and means for transmitting data received from the source UE to one or more target UEs based at least in part on the determining.

Another apparatus for wireless communication is described. The apparatus may include a processor, memory in electronic communication with the processor, and instructions stored in the memory. The instructions may be operable to cause the processor to asses, for a plurality of target UEs, a level of interest in a broadcast session associated with a source UE, determine, based on the level of interest in the broadcast session, whether to allow the broadcast session to occur, and transmit data received from the source UE to one or more target UEs based at least in part on the determining.

A non-transitory computer-readable medium for wireless communication is described. The non-transitory computer-readable medium may include instructions operable to cause a processor to asses, for a plurality of target UEs, a level of interest in a broadcast session associated with a source UE, determine, based on the level of interest in the broadcast session, whether to allow the broadcast session to occur, and transmit data received from the source UE to one or more target UEs based at least in part on the determining.

In some examples of the method, apparatus, and non-transitory computer-readable medium described above, assessing, for the plurality of target UEs, the level of interest in the broadcast session comprises receiving an interest indication regarding the broadcast session from one or more target UEs.

In some examples of the method, apparatus, and non-transitory computer-readable medium described above, assessing, for the plurality of target UEs, the level of interest in the broadcast session comprises transmitting an interest query to one or more target UEs, the target UEs associated with a UE group identifier.

In some examples of the method, apparatus, and non-transitory computer-readable medium described above, transmitting the interest query to one or more target UEs, the target UEs associated with the UE group identifier comprises encoding the interest query with the UE group identifier. Some examples of the method, apparatus, and non-transitory computer-readable medium described above may further include processes, features, means, or instructions for transmitting the interest query via one or more system information blocks (SIBs), a physical multicast channel (PMCH), a physical downlink shared channel (PDSCH), or any combination thereof.

In some examples of the method, apparatus, and non-transitory computer-readable medium described above, assessing, for the plurality of target UEs, the level of interest in the broadcast session further comprises determining a number of affirmative interest indications regarding the broadcast session received within a preconfigured time duration after transmitting the interest query to one or more target UEs.

Some examples of the method, apparatus, and non-transitory computer-readable medium described above may further include processes, features, means, or instructions for determining to allow the broadcast session to occur. Some examples of the method, apparatus, and non-transitory computer-readable medium described above may further include processes, features, means, or instructions for transmitting a broadcast grant to the source UE.

Some examples of the method, apparatus, and non-transitory computer-readable medium described above may further include processes, features, means, or instructions for receiving, from the source UE, data encoded with one or more multicast transmission parameters. Some examples of the method, apparatus, and non-transitory computer-readable medium described above may further include processes, features, means, or instructions for transmitting the encoded data received from the source UE to the one or more target UEs via a multicast transmission.

Some examples of the method, apparatus, and non-transitory computer-readable medium described above may further include processes, features, means, or instructions for receiving, from the source UE, a request for the broadcast session comprising a group identifier corresponding to the plurality of target UEs, an indication of an amount of data for the broadcast session, an indication of a type of data for the broadcast session, information regarding content for the broadcast session, or any combination thereof.

In some examples of the method, apparatus, and non-transitory computer-readable medium described above, transmitting data received from the source UE to one or more target UEs based at least in part on the determining comprises transmitting the data associated with the broadcast session to a base station serving at least one of the one or more target UEs.

Some examples of the method, apparatus, and non-transitory computer-readable medium described above may further include processes, features, means, or instructions for determining one or more multicast transmission resources for the broadcast session. Some examples of the method, apparatus, and non-transitory computer-readable medium described above may further include processes, features, means, or instructions for transmitting information regarding the one or more multicast transmission resources for the broadcast session to the one or more target UEs via one or more SIBs, a PMCH, a PDSCH, or any combination thereof.

Some examples of the method, apparatus, and non-transitory computer-readable medium described above may further include processes, features, means, or instructions for receiving a request from a target UE to utilize a carrier corresponding to the one or more multicast transmission resources. Some examples of the method, apparatus, and non-transitory computer-readable medium described above may further include processes, features, means, or instructions for configuring the target UE to utilize the carrier corresponding to the one or more multicast transmission resources.

Some examples of the method, apparatus, and non-transitory computer-readable medium described above may further include processes, features, means, or instructions for receiving configuration information for the broadcast session from a local server, the local server dedicated to serving a localized area that includes the base station. Some examples of the method, apparatus, and non-transitory computer-readable medium described above may further include processes, features, means, or instructions for transmitting the configuration information for the broadcast session via one or more SIBs, a PMCH, a PDSCH, or any combination thereof.

Some examples of the method, apparatus, and non-transitory computer-readable medium described above may further include processes, features, means, or instructions for broadcasting an indication of support for UE-initiated broadcast via one or more SIBs, a PMCH, a PDSCH, or any combination thereof.

In some examples of the method, apparatus, and non-transitory computer-readable medium described above, transmitting data received from the source UE to one or more target UEs based at least in part on the determining comprises transmitting the data associated with the broadcast session to the one or more target UEs without transmitting the data associated with the broadcast session to any network node.

Some examples of the method, apparatus, and non-transitory computer-readable medium described above may further include processes, features, means, or instructions for determining a value metric for the broadcast session, wherein the value metric may be based at least in part on an amount of transmission resources associated with the broadcast session, a duration of the broadcast session, a number of target UEs associated with the broadcast session, an amount of data associated with the broadcast session, a geographic area associated with the broadcast session, a calendar day associated with the broadcast session, a time of day associated with the broadcast session, or any combination thereof. Some examples of the method, apparatus, and non-transitory computer-readable medium described above may further include processes, features, means, or instructions for transmitting the value metric to a network node.

Some examples of the method, apparatus, and non-transitory computer-readable medium described above may further include processes, features, means, or instructions for determining not to allow the broadcast session to occur. Some examples of the method, apparatus, and non-transitory computer-readable medium described above may further include processes, features, means, or instructions for transmitting a broadcast denial to the source UE.

A method of wireless communication is described. The method may include transmitting a request for a broadcast session, receiving an indication of permission for the broadcast session, the indication of permission being based at least in part on a level of interest in the broadcast session among one or more target UEs, encoding data associated with the broadcast session with one or more multicast transmission parameters, and transmitting the data associated with the broadcast session to a base station.

An apparatus for wireless communication is described. The apparatus may include means for transmitting a request for a broadcast session, means for receiving an indication of permission for the broadcast session, the indication of permission being based at least in part on a level of interest in the broadcast session among one or more target UEs, means for encoding data associated with the broadcast session with one or more multicast transmission parameters, and means for transmitting the data associated with the broadcast session to a base station.

Another apparatus for wireless communication is described. The apparatus may include a processor, memory in electronic communication with the processor, and instructions stored in the memory. The instructions may be operable to cause the processor to transmit a request for a broadcast session, receive an indication of permission for the broadcast session, the indication of permission being based at least in part on a level of interest in the broadcast session among one or more target UEs, encode data associated with the broadcast session with one or more multicast transmission parameters, and transmit the data associated with the broadcast session to a base station.

A non-transitory computer-readable medium for wireless communication is described. The non-transitory computer-readable medium may include instructions operable to cause a processor to transmit a request for a broadcast session, receive an indication of permission for the broadcast session, the indication of permission being based at least in part on a level of interest in the broadcast session among one or more target UEs, encode data associated with the broadcast session with one or more multicast transmission parameters, and transmit the data associated with the broadcast session to a base station.

In some examples of the method, apparatus, and non-transitory computer-readable medium described above, encoding the data associated with the broadcast session with one or more multicast transmission parameters comprises addressing the data associated with the broadcast session to one or more IP addresses, encoding the data associated with the broadcast session using a forward error correction encoding algorithm, encrypting the data associated with the broadcast session using an encryption key, encoding the data associated with the broadcast session in accordance with an audio or video codec, compressing one or more headers for the data associated with the broadcast session, or any combination thereof.

In some examples of the method, apparatus, and non-transitory computer-readable medium described above, transmitting the request for the broadcast session comprises transmitting a group identifier corresponding to a group of UEs, an indication of an amount of data for the broadcast session, an indication of a type of data for broadcast session, information regarding content for the broadcast session, or any combination thereof.

In some examples of the method, apparatus, and non-transitory computer-readable medium described above, transmitting the request for the broadcast session comprises transmitting the request for the broadcast session to a base station or to a local server dedicated to serving a localized area that includes the base station.

Some examples of the method, apparatus, and non-transitory computer-readable medium described above may further include processes, features, means, or instructions for receiving a broadcast release message from a base station or from a local server dedicated to serving a localized area that includes the base station, the broadcast release message based at least in part on an updated level of interest in the broadcast session among the one or more target UEs.

Some examples of the method, apparatus, and non-transitory computer-readable medium described above may further include processes, features, means, or instructions for determining completion of the broadcast release session.

Some examples of the method, apparatus, and non-transitory computer-readable medium described above may further include processes, features, means, or instructions for transmitting a broadcast release request to a base station or to a local server dedicated to serving a localized area that includes the base station.

Some examples of the method, apparatus, and non-transitory computer-readable medium described above may further include processes, features, means, or instructions for transmitting an authentication message to a base station or to a local server dedicated to serving a localized area that includes the base station.

A method of wireless communication is described. The method may include receiving information regarding a broadcast session, transmitting an affirmative interest indication regarding the broadcast session, and receiving data associated with the broadcast session via one or more multicast transmission resources.

An apparatus for wireless communication is described. The apparatus may include means for receiving information regarding a broadcast session, means for transmitting an affirmative interest indication regarding the broadcast session, and means for receiving data associated with the broadcast session via one or more multicast transmission resources.

Another apparatus for wireless communication is described. The apparatus may include a processor, memory in electronic communication with the processor, and instructions stored in the memory. The instructions may be operable to cause the processor to receive information regarding a broadcast session, transmit an affirmative interest indication regarding the broadcast session, and receive data associated with the broadcast session via one or more multicast transmission resources.

A non-transitory computer-readable medium for wireless communication is described. The non-transitory computer-readable medium may include instructions operable to cause a processor to receive information regarding a broadcast session, transmit an affirmative interest indication regarding the broadcast session, and receive data associated with the broadcast session via one or more multicast transmission resources.

Some examples of the method, apparatus, and non-transitory computer-readable medium described above may further include processes, features, means, or instructions for receiving an indication of a carrier corresponding to the one or more multicast transmission resources. Some examples of the method, apparatus, and non-transitory computer-readable medium described above may further include processes, features, means, or instructions for transmitting a request to utilize the carrier corresponding to the one or more multicast transmission resources.

In some examples of the method, apparatus, and non-transitory computer-readable medium described above, receiving information regarding the broadcast session comprises receiving an interest query, the interest query associated with a UE group identifier, via one or more SIBs, a PMCH, a PDSCH, or any combination thereof.

A method of wireless communication is described. The method may include receiving a setup request for a broadcast session from a source UE, transmitting to the source UE one or more multicast transmission parameters for the broadcast session, receiving a listen request for the broadcast session from one or more target UEs, and transmitting configuration information for the broadcast session to at least one base station, the at least one base station local to the network node.

An apparatus for wireless communication is described. The apparatus may include means for receiving a setup request for a broadcast session from a source UE, means for transmitting to the source UE one or more multicast transmission parameters for the broadcast session, means for receiving a listen request for the broadcast session from one or more target UEs, and means for transmitting configuration information for the broadcast session to at least one base station, the at least one base station local to the network node.

Another apparatus for wireless communication is described. The apparatus may include a processor, memory in electronic communication with the processor, and instructions stored in the memory. The instructions may be operable to cause the processor to receive a setup request for a broadcast session from a source UE, transmit to the source UE one or more multicast transmission parameters for the broadcast session, receive a listen request for the broadcast session from one or more target UEs, and transmit configuration information for the broadcast session to at least one base station, the at least one base station local to the network node.

A non-transitory computer-readable medium for wireless communication is described. The non-transitory computer-readable medium may include instructions operable to cause a processor to receive a setup request for a broadcast session from a source UE, transmit to the source UE one or more multicast transmission parameters for the broadcast session, receive a listen request for the broadcast session from one or more target UEs, and transmit configuration information for the broadcast session to at least one base station, the at least one base station local to the network node.

In some examples of the method, apparatus, and non-transitory computer-readable medium described above, transmitting to the source UE one or more multicast transmission parameters for the broadcast session comprises transmitting to the source UE a user service description (USD) for the broadcast session, one or more IP addresses corresponding to the one or more target UEs, transmitting to the source UE an encryption key for the broadcast session, or any combination thereof.

Some examples of the method, apparatus, and non-transitory computer-readable medium described above may further include processes, features, means, or instructions for transmitting to the source UE a broadcast release message based at least in part on an insufficient level of interest in the broadcast session 30.

A method of wireless communication is described. The method may include receiving, from each of a plurality UEs in a geographic area, an indication of interest in UE-initiated broadcast, selecting two or more UEs from the plurality of UEs for inclusion in a UE-initiated broadcast group, assigning a group UE identifier to the UE-initiated broadcast group, and transmitting to the selected UEs configuration information for use in UE-initiated broadcast associated with the group UE identifier.

An apparatus for wireless communication is described. The apparatus may include means for receiving, from each of a plurality UEs in a geographic area, an indication of interest in UE-initiated broadcast, means for selecting two or more UEs from the plurality of UEs for inclusion in a UE-initiated broadcast group, means for assigning a group UE identifier to the UE-initiated broadcast group, and means for transmitting to the selected UEs configuration information for use in UE-initiated broadcast associated with the group UE identifier.

Another apparatus for wireless communication is described. The apparatus may include a processor, memory in electronic communication with the processor, and instructions stored in the memory. The instructions may be operable to cause the processor to receive, from each of a plurality UEs in a geographic area, an indication of interest in UE-initiated broadcast, select two or more UEs from the plurality of UEs for inclusion in a UE-initiated broadcast group, assign a group UE identifier to the UE-initiated broadcast group, and transmit to the selected UEs configuration information for use in UE-initiated broadcast associated with the group UE identifier.

A non-transitory computer-readable medium for wireless communication is described. The non-transitory computer-readable medium may include instructions operable to cause a processor to receive, from each of a plurality UEs in a geographic area, an indication of interest in UE-initiated broadcast, select two or more UEs from the plurality of UEs for inclusion in a UE-initiated broadcast group, assign a group UE identifier to the UE-initiated broadcast group, and transmit to the selected UEs configuration information for use in UE-initiated broadcast associated with the group UE identifier.

In some examples of the method, apparatus, and non-transitory computer-readable medium described above, selecting two or more UEs from the plurality of UEs comprises identifying the indication of interest in UE-initiated broadcast as for private UE-initiated broadcast. Some examples of the method, apparatus, and non-transitory computer-readable medium described above may further include processes, features, means, or instructions for analyzing contact lists associated with the plurality of UEs to identify UEs common to each of the contact lists. Some examples of the method, apparatus, and non-transitory computer-readable medium described above may further include processes, features, means, or instructions for selecting UEs common to each of the contact lists for inclusion in the UE-initiated broadcast group.

Some examples of the method, apparatus, and non-transitory computer-readable medium described above may further include processes, features, means, or instructions for receiving an additional indication of interest in UE-initiated broadcast from an additional UE in the geographic area. Some examples of the method, apparatus, and non-transitory computer-readable medium described above may further include processes, features, means, or instructions for selecting the additional UE for inclusion in the UE-initiated broadcast group. Some examples of the method, apparatus, and non-transitory computer-readable medium described above may further include processes, features, means, or instructions for transmitting to the additional UE configuration information for use in a UE-initiated broadcast associated with the group UE identifier.

In some examples of the method, apparatus, and non-transitory computer-readable medium described above, the configuration information for use in UE-initiated broadcast associated with the group UE identifier comprises session description protocol (SDP) information, encryption information, or any combination thereof.

DETAILED DESCRIPTION

Figure 1:
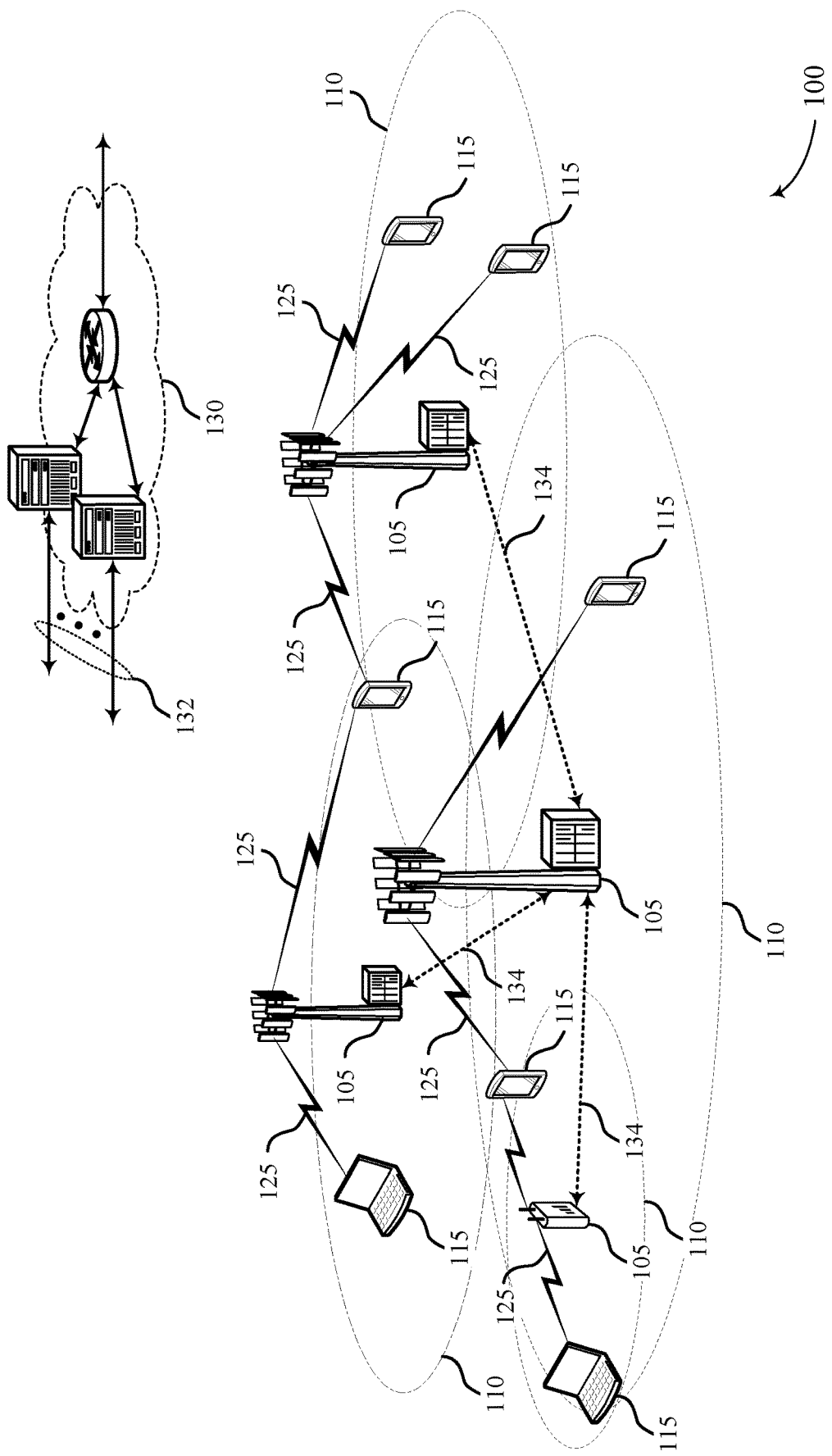
FIG. 1 illustrates an example of a system for wireless communication that supports local broadcast for group calls in accordance with aspects of the present disclosure.

Some wireless communications systems may support services by which a base station may simultaneously transmit the same data to multiple user equipments (UEs), which may be referred to as broadcast or multicast services. For example, some wireless communications systems may support multimedia broadcast multicast services (MBMS). In some cases, the broadcast data may originate from a core network node, such as an application server. In other cases, the broadcast data may originate at a UE, and the broadcast session may be referred to as a group call.

In a conventional group call, the uplink and downlink data paths for the broadcast data may involve multiple core network components. For example, the UE from which the broadcast data originates (which may be referred to as a source UE) may transmit the broadcast data via a unicast uplink to a base station; the base station may then send the broadcast data to a packet serving gateway (S-GW) and a packet data network (PDN) gateway (P-GW); the P-GW may then send the broadcast data to an application server; the application server may then perform user plane processing on the broadcast data—e.g., user plane processing such as encoding, encryption, compression—before sending the broadcast data to a broadcast multicast service center (BMSC); the BMSC may then send the broadcast data to an MBMS gateway (MBMS-GW); and the MBMS-GW may then send the broadcast data to the same or a different base station, which may then broadcast the data to multiple receiving UEs (which may also be referred to as target UEs).

Conventional broadcast solutions for group calls may introduce undesirable latency or end-to-end delay into the data path—e.g., due to core network components included in the uplink and downlink data paths for the broadcast data. Conventional broadcast solutions for group calls may also introduce undesirable complexity, as each interaction between different network nodes may involve a corresponding interface (e.g., the GC1 interface between a UE and an application server or the MB2 interface between the application server and the BMSC) along with corresponding protocols and procedures that may be required when establishing or terminating a broadcast session. Such undesirable complexity may further introduce unreliability and limit the flexibility with which a UE may initiate a group call. These and other shortcomings of conventional broadcast solutions for group calls may make them particularly unsuitable when a group call is limited to a localized geographic area (e.g., a geographic area served by one or only a handful of base stations).

The systems and methods described herein may provide improved simplicity, reliability, flexibility, and latency for group calls within a localized geographic area. Various aspects of processing related to a localized group call may be performed by a source UE, by a base station, by a local server dedicated to the localized area (e.g., dedicated to the base station or to a handful of base stations that includes the base station), or by an application server.

For example, a base station or a local server may perform aspects of control plane processing related to localized group calls—e.g., setup of a broadcast session (setting up network transport and over-the-air transmission resources for a broadcast) and release of the broadcast session, as opposed to, for example, a core network component that may perform such processing in a conventional system and method. In some examples, the local server may also perform aspects of processing related to group management (group IDs, group membership information, etc.) or security (encryption/decryption) for localized group calls, and in other cases such processing may be performed by an application server.

The source UE may perform aspects of user plane processing related to localized group calls—e.g., setting IP addresses in IP packets, forward error correction encoding, encryption, compression, media formatting, etc.—as opposed to, for example, an application server or other remote network entity that may perform such processing in a conventional broadcast solution. Thus, during a broadcast session, from a user plane perspective, the base station may act as a mere relay or reflector that receives uplink data from the source UE and broadcasts that data to one or more target UEs via a multicast transmission—e.g., the broadcast data may not pass through any network node other than the base station. Thus, the systems and methods described herein may improve the flexibility, simplicity, reliability, and latency of broadcast services for localized group calls.

In some cases, either a base station or a local server may assess a level of interest in a group call requested by a source UE, and may determine whether to allow the group call to occur based at least in part on the level of interest. This may further improve the efficiency with which system may support broadcast services for localized group calls.

Group calls, including localized group calls, may also provide enhanced revenue opportunities for a network operator. For example, an account associated with a source UE may be billed either on a fixed fee basis (e.g., per group call) or a dynamic amount based on one or more attributes of the group call (e.g., an amount of data broadcast as part of the group call). Alternatively or additionally, improved broadcast services for localized group calls may increase network usage generally and provide associated revenue opportunities for the network operator. Some localized group calls may correspond to advertisements for good and services—e.g., may provide an alternative or complement to other forms of advertisements, such as print, web, radio, or video advertisements—and may therefore provide opportunities for advertisement revenue for the network operator.

Aspects of the disclosure are initially described in the context of wireless communications systems and related processes. Aspects of the disclosure are further illustrated by and described with reference to apparatus diagrams, system diagrams, and flowcharts that relate to local broadcast for group calls.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions. In some cases, base stations 105 may support localized group calls in accordance with the techniques described herein.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105. In some cases, a UE 115 may provide processing (e.g., user plane processing) in support of localized group calls in accordance with the techniques described herein and may in some cases also receive data transmitted via localized group calls in accordance with the techniques described herein.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one S-GW, and at least one P-GW. The MME may manage non-access stratum (NAS) (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

In some cases, wireless communications system 100 may further include one or more local servers, which may be dedicated to one base station 105 or to some small number of base stations 105 within a localized geographic area. Local servers may support group management, security, and control plane functions for localized group calls in accordance with the techniques described herein.

In some cases, wireless communications system 100 may further include one or more application servers, which may be included in the core network 130 or may be coupled with the core network (e.g., through one or more IP connections). Application servers may support group management and security functions for localized group calls in accordance with the techniques described herein. In some cases, an application server may be associated with a client application that may be included in and executed by one or more UEs 115.

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

Figure 2:
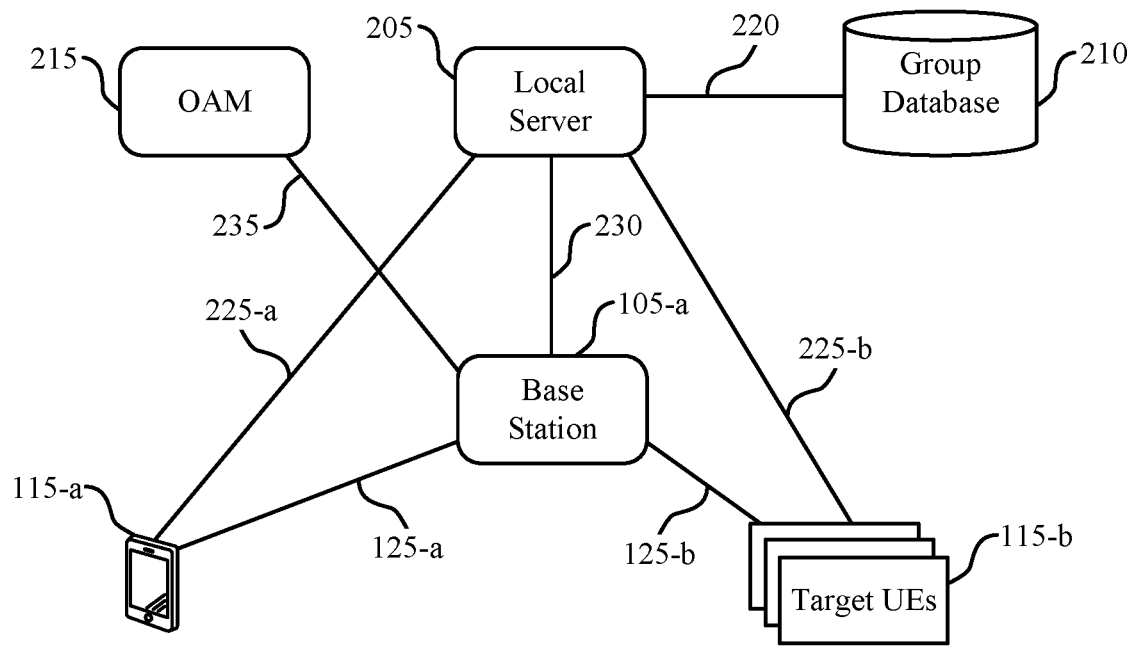
FIG. 2 illustrates an example of a system for wireless communication that supports local broadcast for group calls in accordance with aspects of the present disclosure.

FIG. 2 illustrates an example of a wireless communications system 200 that supports local broadcast for group calls in accordance with various aspects of the present disclosure. In some examples, wireless communications system 200 may implement aspects of wireless communication system 100. Wireless communications system may include a source UE 115-a, one or more target UEs 115-b, a base station 105-a, a local server 205, a group database 210, and an operations administration and management (OAM) component 215.

The group database 210 may be included in the local server 205 or may be coupled with the local server by a communication link 220. The group database 210 may store information regarding public or private groups for group calls. For example, the group database may store UE identifiers (e.g., cell radio network temporary identifiers (C-RNTIs) for UEs 115), UE group identifiers (Group IDs), group RNTIs (G-RNTIs) associated with different Group IDs, membership information regarding which UEs 115 belong to which group(s), privacy information regarding whether different groups are public or private groups, along with other group-related information.

The local server 205 may handle aspects of control plane processing related to group calls as described herein. For example, the local server 205 may implement group management and security functions (e.g., authenticating UEs, assigning keys for encryption/decryption of content, or allowing UEs to join or leave one or more groups) as well as broadcast setup and release functions for group calls (e.g., signaling between the local server 205 and UEs 115 or between the local server and the base station 105-a to coordinate broadcast setup and release). The local server 205 may coordinate among the group database 210, the source UE 115-a, the one or more target UEs 115-b, and the base station 105-a. For example, the local server 205 may include the group database 210 or exchange messages with the group database via communication link 220. The local server 205 may also exchange messages with the source UE 115-a via communication link 225-a and with the one or more target UEs 115-b via communication link 225-b, where communication link 225-a and communication link 225-b may be NAS communication links. The local server 205 may also exchange messages with the base station 105-a via communication link 230.

In some cases, the local server 205 may exchange authentication-related messages with UEs 115, such as the source UE 115-a and the one or more target UEs 115-b, to authenticate the UEs 115 as having access to private groups or other group call services. The local server 205 may also assign an encryption key to a group or to an individual group call; thus, the source UE 115-a may use an encryption key to encrypt broadcast data and the one or more target UEs 115-b may use the encryption key to decrypt the broadcast data. In some cases, the local server 205 may provide group management functions such as allowing UEs 115 to join or leave groups and managing the group database 210 (e.g., in a master/slave arrangement). For examples, the local server 205 may allow UEs 115 to join or leave a group based on entering or leaving a geographic area, such as one or more cells corresponding the base stations 105 to which the local server 205 is dedicated.

In some cases, the local server 205 may coordinate the setup and release of broadcast sessions for localized group calls, such as by exchanging related messages with the source UE 115-a, the one or more target UEs 115-b, or the base station 105. The local server 205 may in some cases provide floor control services by configuring or otherwise managing broadcast sessions for group calls such that only one UE 115 may talk (e.g., transmit data) at a time. In some cases, the local server 205 may exchange messages with the base station 105-a to setup broadcast sessions for group calls, such as MBMS sessions, and provide to the base station 105-a configuration information for the broadcast sessions; the base station 105-a may then communicate the configuration information to UEs 115 as described herein. The local server 205 may in some cases provide to the source UE 115-a one or more multicast transmission parameters for a broadcast session for a group call, such as a user service description (USD) for the broadcast session or one or more IP addresses corresponding to the one or more target UEs 115-b. The local server 205 may determine some or all of the one or more multicast transmission parameters based on attributes of the broadcast session that may be provided by the source UE as described herein (e.g., as part of a request by the source UE 115-a for the associated group call).

The source UE 115 may send a request for a group call to either the base station 105-a or the local server 205. In some cases, the request for the group call may indicate one or more attributes of the associated broadcast session or broadcast data. For example, the request for the group call may indicate a group identifier corresponding to a group of UEs, an amount of data for broadcast, a data rate, a type of data for broadcast (e.g., data, voice, or video), content for the broadcast data, a bandwidth for the broadcast data, a data rate for the broadcast data, or one or more other attributes of the requested group call.

The source UE 115-a may receive from either the local server 205 or the base station 105-a an indication of permission for the requested group call (e.g., a grant of a broadcast session or a denial of the broadcast session), which may be based at least in part on a level of interest among the target UEs 115-b in the requested group call. If the requested group call is granted, the source UE 115-a may handle various aspects of user plane processing for broadcast data as described herein (e.g., setting broadcast IP addresses in IP packets, forward error correction encoding, encryption, compression, media formatting, etc.) and transmit the processed broadcast data to the base station 105—via a unicast uplink transmission. If the requested group call is denied, the source UE 115-a may transmit another group call request at a later time, or may transmit the data subject to the group call request to an application server for processing in accord with a conventional broadcast.

The base station 105-a may be coupled with the local server 205 (e.g., via communication link 230), the OAM component 215 (e.g., via communication link 235), and with one or more UEs 115 (e.g., via wireless communication links 125, such as wireless communication link 125-a and wireless communication link 125-b). The base station 105-a may receive a request for a group call from the source UE 115-a or may receive a request from the local server 205 to establish a broadcast session (e.g., an MBMS session) for a group call. The base station 105-a may receive some or all configuration information for the broadcast session from the local server 205, or may determine some or all configuration information for the broadcast session, and may communicate the configuration information for the broadcast session to one or more UEs 115. Configuration information for the broadcast session may include, for example, multicast-broadcast single frequency network (MBSFN) area configuration information or single cell point-to-multipoint (SCPTM) configuration information. The base station 105-a may broadcast the configuration information as part of one or more system information blocks (SIBs) (e.g., as part of SIB13, SIB15, SIB20, or a combination thereof), as part of one or more configuration messages, such as MBSFN area configuration or SCPTM configuration messages, or via a physical multicast channel (PMCH) or physical downlink shared channel (PDSCH). In some cases, the base station 105-a may encode (e.g., scramble) the configuration information for the broadcast session with a group identifier (e.g., G-RNTI) for the group call, and UEs 115 may use the group identifier to identify and obtain the configuration information from the one or more related broadcasts by the base station 105-a.

The base station 105-a may assess a level of interest in a group call and determine whether to allow the related broadcast session to occur based at least in part on the level of interest. For example, the base station 105-a may receive interest indications from one or more of the target UEs 115, which may be affirmative interest indications or negative interest indications, and may in some cases determine a number of affirmative interest indications for the group call and whether the number is sufficient to allow the related broadcast session to occur. In some cases, the base station 105-a may probe the interest of one or more target UEs 115-b, which may include sending a unicast interest query to a target UE 115-b or broadcasting an interest query (e.g., including the interest query in one or more SIBs or other broadcast configuration messages, or sending the interest query via a PMCH or PDSCH) and encoding the interest query with a group identifier associated with the group call. If the base station 105-a determines to allow the related broadcast session to occur, during the group call, the base station 105-a may act as a mere relay or reflector that receives uplink data for broadcast from the source UE 115-a, the data for broadcast already processed as described herein by the source UE 115-a, and transmit the data for broadcast to the interested target UEs 115-b via one or more downlink multicast transmissions.

In some cases, wireless communications system 200 may support local broadcast for group calls in a pay-to-play manner—e.g., the source UE 115-a may be billed per group call or based on one or more attributes of the group call. The group call may include a localized advertisement (e.g., for an event of some kind, such as a concert or garage sale, or for a good or service, such as a lawn care or other kind of service), and an operator of the wireless communications system 200 may bill the source UE 115-a a flat rate per group call or a dynamic amount based at least in part on one or more attributes of the group call. The base station 105-a may determine one or more value metrics for the group call and transmit the value metrics to a network node within the wireless communications system 200—e.g., to OAM component 215 via communication link 235—for billing purposes. A value metric may include or be based at least in part on an amount of transmission resources associated with the broadcast session, a duration of the broadcast session, a number of target UEs associated with the broadcast session, an amount of data associated with the broadcast session, a geographic area associated with the broadcast session, a calendar day associated with the broadcast session, a time of day associated with the broadcast session, or any combination thereof.

A target UEs 115-b may authenticate itself to the local server 205 and may exchange one or more messages with the local server regarding affiliation with different groups. For example, the target UE 115-b may send a listen request for a group call, or any group call associated with a group ID, to the local server 205 and may receive approval to listen from the local server 205. The target UE 115-b may also receive configuration information for a group call, or any group call associated with a group ID, via one or more broadcasts by the base station 105-a and send to the base station a related affirmative or negative interest indication (or no interest indication, which may the base station 105-a may interpret as a negative interest indication). For group calls for which a target UE 115-*b* is authorized and interested, the target UE 115-*b* may receive broadcast data transmitted by the base station 105-*a* via a multicast transmission.

Figure 3:
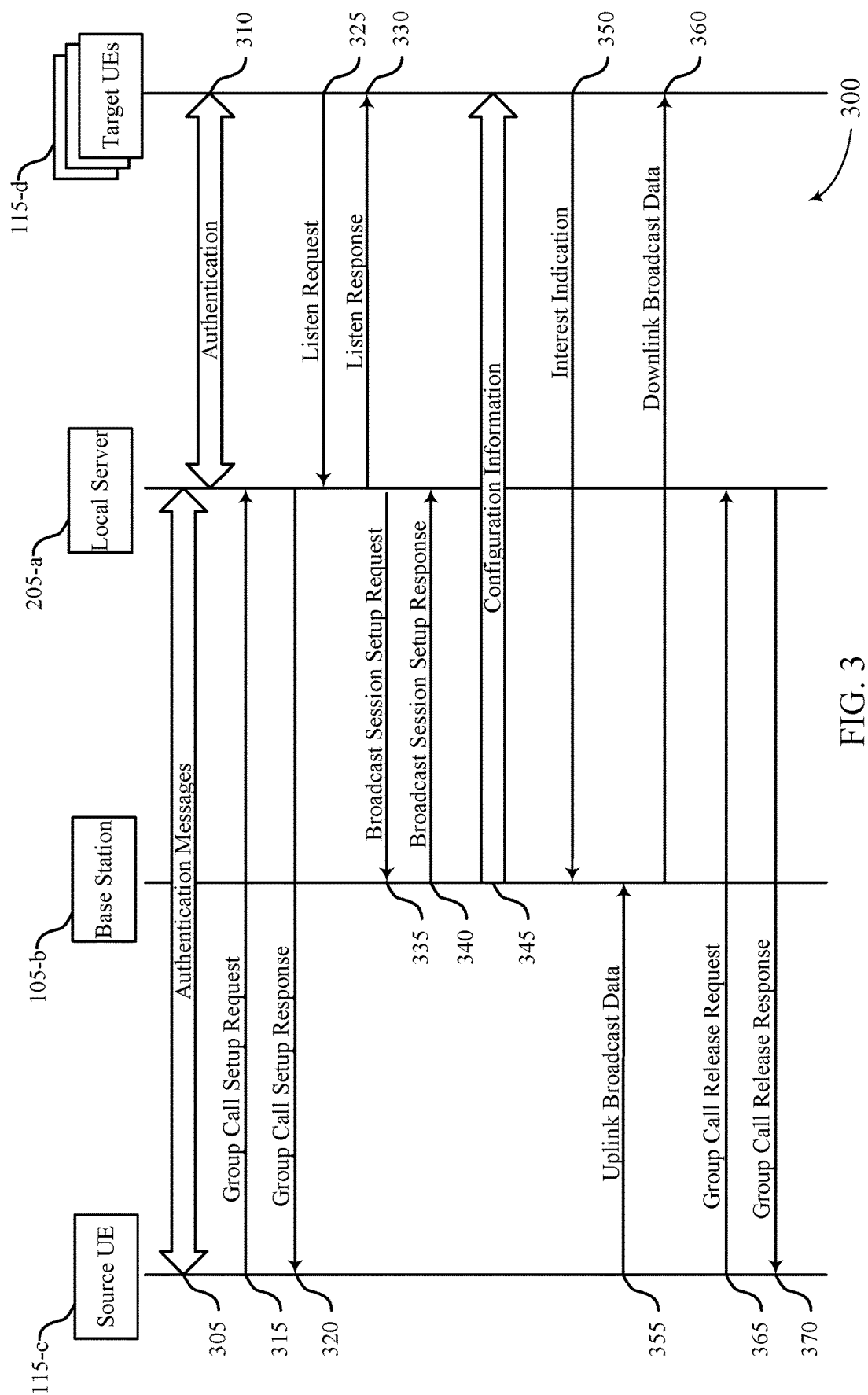
FIG. 3 illustrates an example of a process that supports local broadcast for group calls in accordance with aspects of the present disclosure.

FIG. 3 illustrates an example of a process 300 that supports local broadcast for group calls in accordance with various aspects of the present disclosure. In some examples, process 300 may be implemented by aspects of wireless communication system 100 or wireless communication system 200. For example, process 300 may be implemented by a source UE 115-*c*, a base station 105-*b*, a local server 205-*a*, and one or more target UEs 115-*d*, which may be examples of UEs 115, a base station 105, and a local server 205 as described in reference to wireless communication system 100 or wireless communication system 200.

The source UE 115-*c* and the local server 205-*a* may exchange one or more authentication messages 305. The local server 205-*a* may authenticate the source UE 115-*c* as authorized for on-demand UE-initiated group call services and as authorized for one or more UE groups (e.g., private groups) related to on-demand UE-initiated group call services.

The one or more target UEs 115-*d* and the local server 205-*a* may likewise exchange one or more authentication messages 310. The local server 205-*a* may authenticate the one or more target UEs 115-*d* as authorized for on-demand UE-initiated group call services and as authorized for one or more UE groups (e.g., private groups) related to on-demand UE-initiated group call services. The authentication messages 305 for the source UE 115-*c* and the authentication messages 310 for the one or more target UEs 115-*d* may occur in any temporal order.

The source UE 115-*c* may transmit to the local server 205-*a* a group call setup request 315 and receive from the local server 205-*a* a group call setup response 320. The group call setup request 315 may identify one or more corresponding UE groups (e.g., may include one or more Group IDs) as well as one or more attributes of the requested group call as described herein. For example, the group call setup request 315 may indicate an amount of data for broadcast, a type of data for broadcast (e.g., data, voice, or video), content for the broadcast data, a bandwidth for the broadcast data, a data rate for the broadcast data, or one or more other attributes of the requested group call. The local server 205-*a* may determine and include in the group call setup response 320 one or more multicast transmission parameters for a broadcast session, such as a USD for the broadcast session, one or more IP addresses corresponding to the one or more target UEs 115-*d*, an encryption key for the broadcast session, or any combination thereof or of other multicast transmission parameters that the source UE 115-*c* may use in preparing data for broadcast and transmitting it to the base station 105-*b* via an uplink transmission. In some cases, the group call setup response 320 may also include an indication of permission (e.g., a grant or denial) for the requested group call. In other cases, the source UE 115-*c* may receive a separate indication of permission (e.g., a grant or denial) for the requested group call, which may be transmitted by either the local server 205-*a* or the base station 105-*b*.

The local server 205-*a* may receive from one or more of the target UEs 115-*d* a listen request 325 and transmit to one or more of the target UEs 115-*d* a listen response 330. The listen request 325 may identify one or more corresponding UE groups (e.g., may include one or more Group IDs) and indicate to the local server 205-*a* that the associated target UE 115-*d* is interested in receiving group calls associated with an identified UE group. The local server 205-*a* may determine and include in the listen response 330 one or more multicast transmission parameters for a broadcast session, such as a USD for the broadcast session, an encryption key for the broadcast session, or any combination thereof or other multicast transmission parameters that a target UE 115-*d* may use in receiving and processing data received via a group call.

The local server 205-*a* may send to the base station 105-*b*, which may be a base station 105 to which the local server 205-*a* is dedicated, a broadcast session setup request 335 (e.g., an MBMS session request) and receive from the base station 105-*b* a broadcast session setup response 340 (e.g., an MBMS session setup response). The broadcast session setup request 335 may include configuration information for the group call, which the local server 205-*a* may have approved to occur based at least in part on an assessment of interest level for the group call (e.g., via a number of listen requests 325 or other messages indicating interest from one or more target UEs 115-*d*) or which may be subject to approval by the base station 105-*b*. The configuration information included in the broadcast session setup request 335 may include may include, for example, MBSFN area configuration information or SCPTM configuration information. The broadcast session setup response 340 may include a conformation that the base station 105-*b* will setup the requested broadcast session for the group call.

The base station 105-*b* may transmit configuration information 345, which may include configuration included in the broadcast session setup request 335 or configuration information determined by the base station 105-*b*. In some cases, the base station 105-*b* may transmit configuration information 345 as part of one or more SIBs (e.g., as part of SIB13, SIB15, SIB20, or a combination thereof), as part of one or more configuration messages, such as MBSFN area configuration or SCPTM configuration messages, or via a PMCH or a PDSCH, respectively. In some cases, the base station 105-*b* may encode (e.g., scramble) the configuration information 345 with a group identifier (e.g., G-RNTI) for the group call, and UEs 115, such as the one or more target UEs 115-*d*, may use the group identifier to identify and obtain the configuration information 345.

The base station 105-*b* may assess a level of interest in the group call and determine whether to allow the related broadcast session to occur based at least in part on the level of interest. For example, the base station 105-*b* may receive an interest indication 350 from one or more of the target UEs 115-*d*, which may be affirmative interest indications or negative interest indications, and may in some cases determine a number of affirmative interest indications 350 for the group call. In some cases, the base station 105-*b* may probe the interest of one or more target UEs 115-*d*, which may include sending a unicast interest query to one or more of the target UEs 115-*d* or broadcasting an interest query (e.g., including the interest query in one or more SIBs or other broadcast configuration messages, such as in configuration information 345, or sending the interest query via a PMCH or PDSCH) and encoding the interest query with a group identifier associated with the group call.

If the base station 105-*b* determines to allow the related broadcast session to occur, during the group call, the base station 105-*a* may act as a mere relay or reflector that receives uplink broadcast data 355 from the source UE 115-*c* and transmits corresponding downlink broadcast data 360 to the interested target UEs 115-*d* via one or more downlink multicast transmissions. Thus, the base station 105-*b* may deliver the downlink broadcast data 360 with decreased latency and complexity and increased efficiency and reliability compared to conventional systems and methods. For example, the broadcast data may not pass through any network entity other than the base station 105-*b*.

The source UE 115-*b* may perform user plane processing on the uplink broadcast data 355 that would otherwise be performed by a core network node (e.g., an application server) in a conventional system and method. For example, the source UE 115-*b* may address the uplink broadcast data 355 to one or more IP addresses, encode the uplink broadcast data 355 using a forward error correction encoding algorithm, encrypt the uplink broadcast data 355 using an encryption key, encode the uplink broadcast data 355 in accordance with an audio or video codec, compress one or more headers for the uplink broadcast data 355, or otherwise process the uplink broadcast data 355 to prepare it for multicast transmission to one or more target UEs 115-*d* by the base station 105-*b*.

One or more of the target UEs 115-*d* may receive the downlink broadcast data 360 via one or more downlink multicast transmissions.

In some cases, the source UE 115-*b* may determine to terminate the group call. For example, the source UE 115-*b* may determine to terminate the group call due to exhaustion of associated uplink broadcast data 355 or due to receiving from the base station 105-*b* or local server 205-*a* an indication of an updated interest level in the group call that the source UE 115-*b* determines to be insufficient (e.g., in view of a cost of the group call). After determining to terminate the group call, the source UE 115-*b* may transmit to the local server 205-*a* a group call release request 365 and receive from the local server 205-*a* a group call release response 370 confirming termination of the group call.

It should be understood that aspects of process 300 may in some examples occur in temporal order different than those shown in the example of process 300. It should also be understood that the local server 205-*a* may be included in the base station 105-*b* or that operations performed by the local server 205-*a* in the example of process 300 may be performed by the base station 105-*b* in other processes in accordance with various aspects of the present disclosure.

Figure 4:
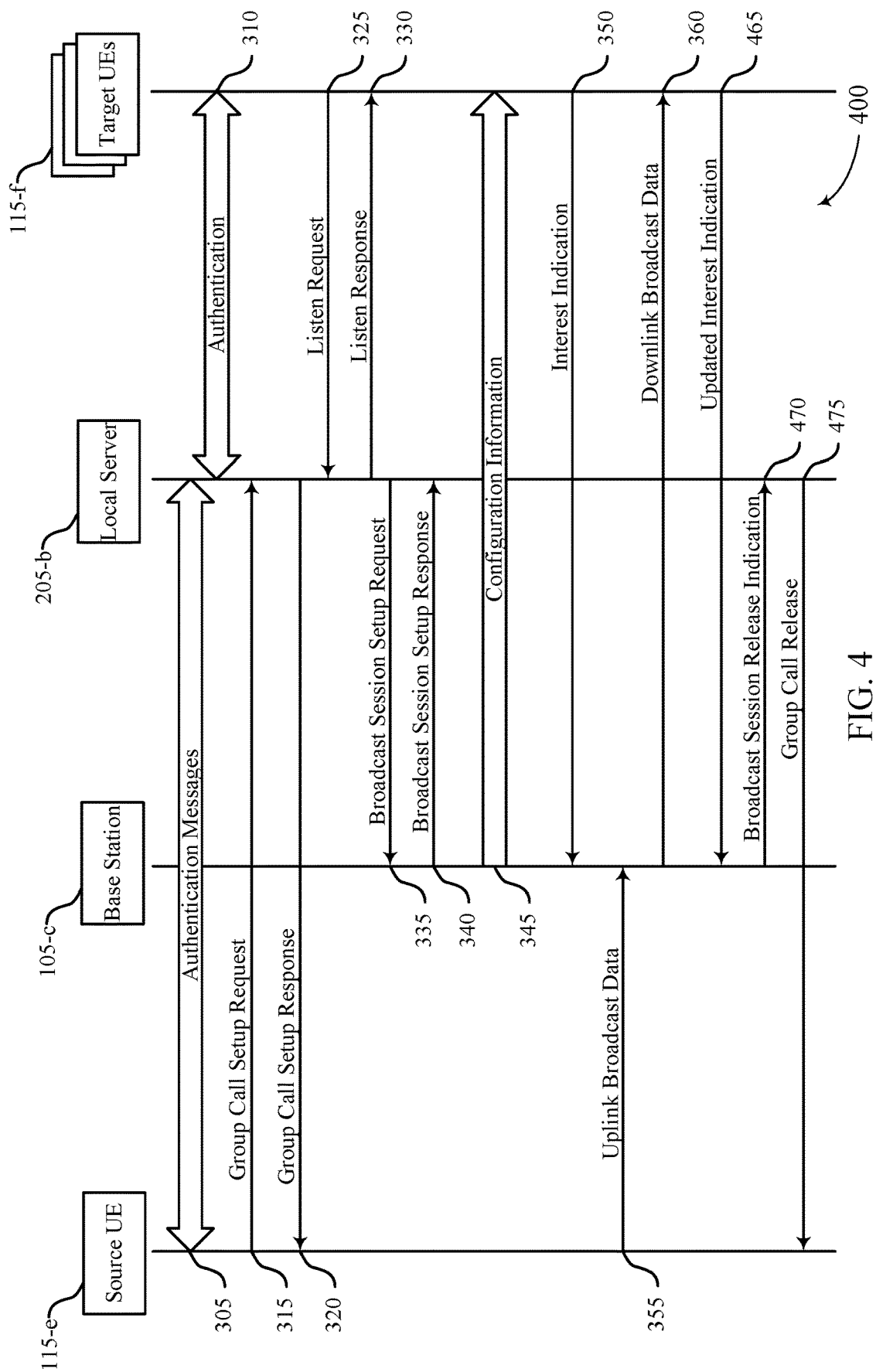
FIG. 4 illustrates an example of a process that supports local broadcast for group calls in accordance with aspects of the present disclosure.

FIG. 4 illustrates an example of a process 400 that supports local broadcast for group calls in accordance with various aspects of the present disclosure. In some examples, process 400 may be implemented by aspects of wireless communication system 100 or wireless communication system 200. For example, process 300 may be implemented by a source UE 115-*e*, a base station 105-*c*, a local server 205-*b*, and one or more target UEs 115-*f*, which may be examples of UEs 115, a base station 105, and a local server 205 as described in reference to wireless communication system 100 or wireless communication system 200.

Process 400 may proceed as described above for process 300 through the transmission of downlink broadcast data 360 by the base station 105-*c* to the one or more target UEs 115-*f*. One or more of the target UEs 115-*f* may transmit an updated interest indication 465 to the base station 105-*c*. The updated interest indication 465 may be a negative indication (e.g., an indication of a lack of interest), and the base station 105-*c* may determine not to allow the group call to continue based at least in part on an assessment of updated level of interest for the group call, which may be based at least in part on one or more updated interest indications 465. The base station 105-*c* may transmit to the local server 205-*b* a broadcast session release indication 470 (e.g., an MBMS session release indication), and the local server 205-*b* may transmit to the source UE 115-*e* a group call release 475 informing the source UE 115-*e* that the group call is terminated.

It should be understood that aspects of process 400 may in some examples occur in temporal order different than those shown in the example of process 400. It should also be understood that the local server 205-*b* may be included in the base station 105-*c* or that operations performed by the local server 205-*b* in the example of process 400 may be performed by the base station 105-*c* in other processes in accordance with various aspects of the present disclosure.

Figure 5:
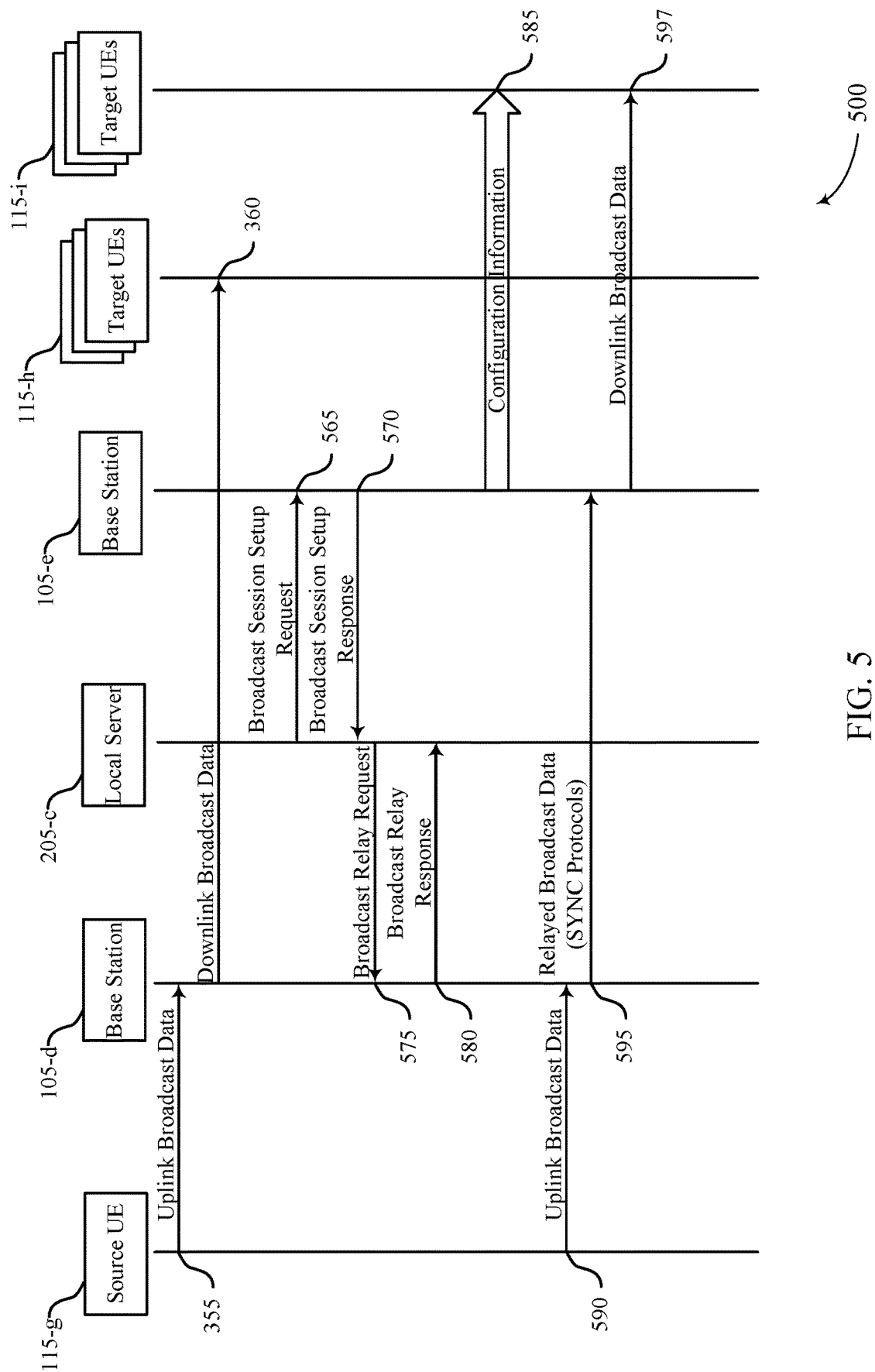
FIG. 5 illustrates an example of a process that supports local broadcast for group calls in accordance with aspects of the present disclosure.

FIG. 5 illustrates an example of a process 500 that supports local broadcast for group calls in accordance with various aspects of the present disclosure. In some examples, process 500 may be implemented by aspects of wireless communication system 100 or wireless communication system 200. For example, process 300 may be implemented by a source UE 115-*g*, a first base station 105-*d*, a local server 205-*c*, a first set of one or more target UEs 115-*h*, an additional base station 105-*e*, and a second set of one or more target UEs 115-*i*, which may be examples of UEs 115, base stations 105, and a local server 205 as described in reference to wireless communication system 100 or wireless communication system 200.

Process 400 may proceed as described above for process 300 through the transmission of downlink broadcast data 360 by the first base station 105-*d* to the first set of one or more target UEs 115-*h*.

In some cases, the local server 205-*c* may determine that the group call should be extended to the second set of one or more target UEs 115-I, which may be in a geographic area covered by the second base station 105-*e*, which may be one of the base stations 105 to which the local server 205-*c* may be dedicated. The local server 205-*c* may transmit to the second base station 105-*e* a broadcast session setup request 565 and receive from the second base station a broadcast session setup response 570, which may include content like that of the broadcast session setup request 335 and the broadcast session setup response 340 described above in reference to process 300.

The local server 205-*c* may also transmit to the first base station 105-*d* a broadcast relay request 575, which may include a request that the first base station 105-*d* transmit previously received uplink broadcast data 355 or subsequently received uplink broadcast data 590 to the second base station 105-*e*. The first base station 105-*d* may transmit to the local server 205-*c* a broadcast relay response 580, which may include a confirmation that the first base station 105-*d* will transmit previously received uplink broadcast data 355 or subsequently received uplink broadcast data 590 to the second base station 105-*e*.

The second base station 105-*e* may transmit to one or more of the second set of target UEs 115-*i* configuration information 585, which may include content like that of configuration information 345 and be transmitted by the second base station 105-*e* in like manner as described above in reference to process 300.

The source UE 115-*g* may in some cases transmit additional uplink broadcast data 590 to the first base station 105-*d*, which may include the same or different content as uplink broadcast data 355. The first base station 105-*d* may transmit the corresponding relayed uplink broadcast data 595 to the second base station 105-*e* (e.g., via an X2 interface), and the second base station 105-*e* may transmit the corresponding downlink broadcast data 397 to the interested target UEs 115-*d* via one or more downlink multicast transmissions. In some cases, synchronous broadcast (e.g., synchronous MBSFN) may be used, and the first base station 105-*d* may transmit to the second base station 105-*e* one or more synchronous timing commands or otherwise execute a synchronization protocol with the second base station 105-*e*. In some cases, the first base station 105-*d* may include synchronization commands in the transmission that includes the corresponding relayed uplink broadcast data 595.

It should be understood that aspects of process 500 may in some examples occur in temporal order different than those shown in the example of process 500. It should also be understood that the local server 205-*b* may be included in either the first base station 105-*d* or the second base station 105-*e*, or that operations performed by the local server 205-*b* in the example of process 500 may be performed by either the first base station 105-*d* or the second base station 105-*e* in other processes in accordance with various aspects of the present disclosure.

Figure 6:
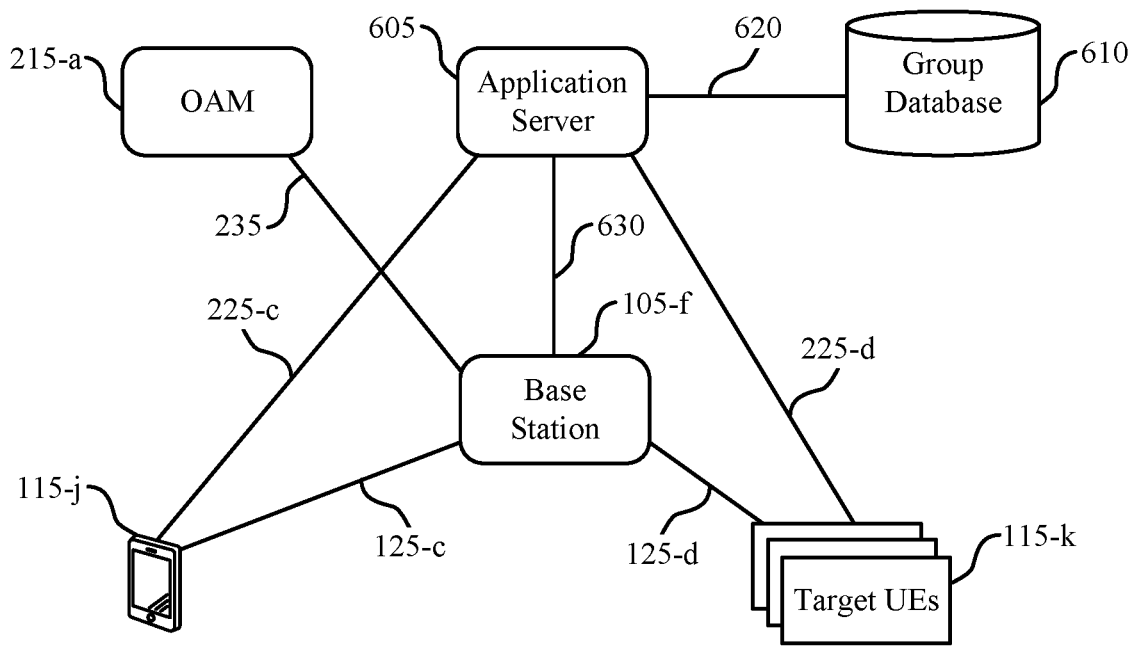
FIG. 6 illustrates an example of a system for wireless communication that supports local broadcast for group calls in accordance with aspects of the present disclosure.

FIG. 6 illustrates an example of a wireless communications system 600 that supports local broadcast for group calls in accordance with various aspects of the present disclosure. In some examples, wireless communications system 600 may implement aspects of wireless communication system 100. Wireless communications system may include a source UE 115-*j*, one or more target UEs 115-*k*, a base station 105-*f*, an application server 605, a group database 610, and an OAM component 215-*a*.

The application server 605 may correspond to a group communication application, such as a group messaging or group call application, installed on client devices, such as on UEs 115. In some cases, the application may include or be included in a social media application. The application server 605 may implement group management and security functions for groups calls such as those described above in reference to local server 205 in wireless communications system 200. The application server 605 may include or be coupled with (e.g., via communication link 620) a group database 610, which may store group-related information such as that as described above in reference to group database 210 in wireless communications system 200.

Unlike the local server 205, however, the application server 605 may be remote from the base station 105-*f* and may not be dedicated to either the base station 105-*f* or a localized group of base stations 105 that includes the base station 105-*f*. For example, the application server 605 may be cloud-based. The application server 605 may communicate with the base station 105-*f* via communication link 630 regarding group management and security for groups calls. Further, the base station 105-*f* may implement broadcast setup and release functions for group calls such as those described above in reference to local server 205 in wireless communications system 200.

Figure 7:
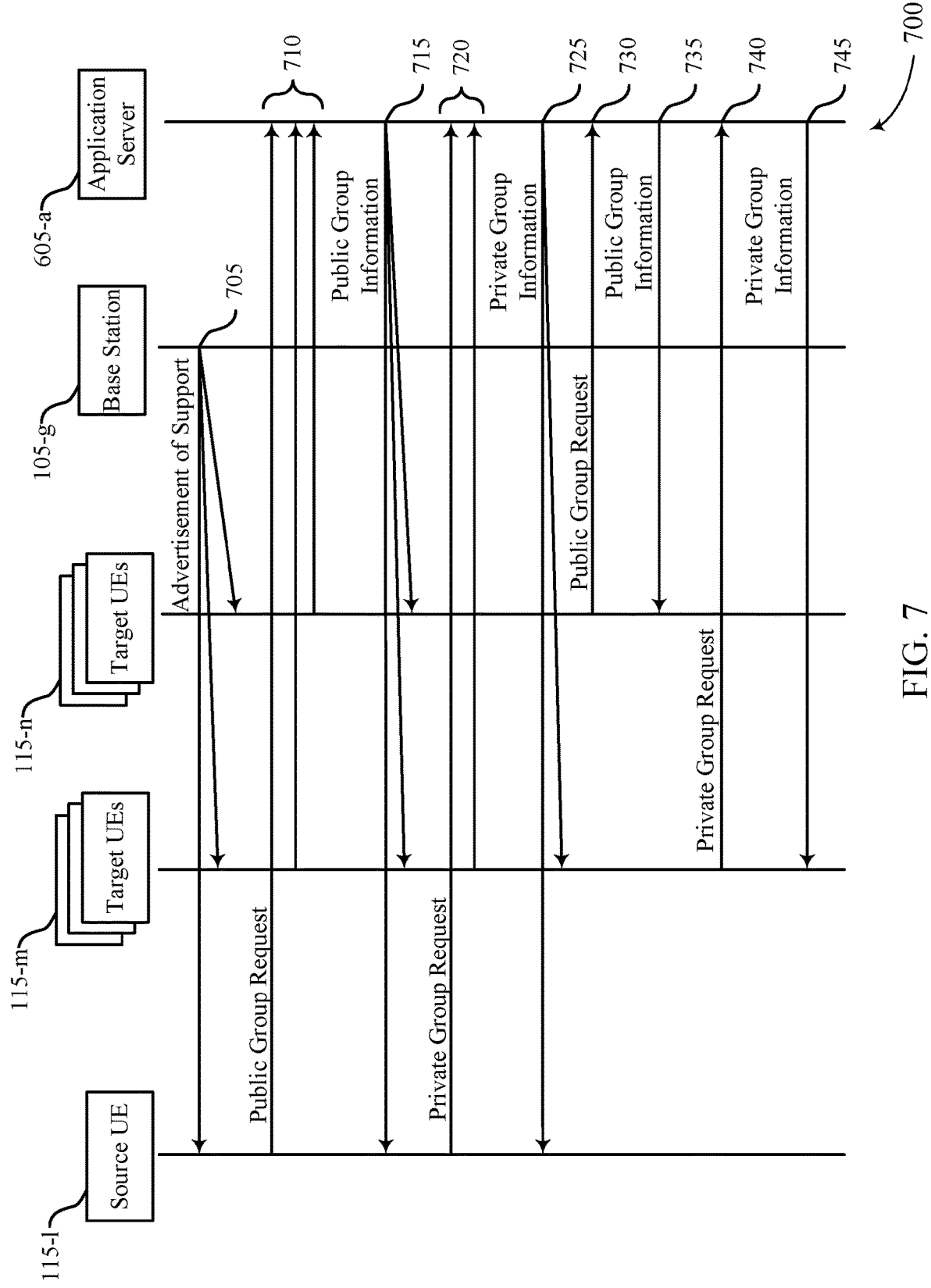
FIG. 7 illustrates an example of a process that supports local broadcast for group calls in accordance with aspects of the present disclosure.

FIG. 7 illustrates an example of a process 700 that supports local broadcast for group calls in accordance with various aspects of the present disclosure. In some examples, process 700 may be implemented by aspects of wireless communication system 100 or wireless communications system 600. For example, process 700 may be implemented by a source UE 115-*l*, a first set of one or more target UEs 115-*m*, a second set of one or more target UEs 115-*n*, a base station 105-*g*, and an application server 605-*a*, which may be examples of UEs 115, a base station 105, and an application server 605 as described in reference to wireless communication system 100 or wireless communications system 600.

The base station 105-*g* may broadcast (e.g., periodically) an advertisement of support 705 to inform UEs 115 within the geographic area served by the base station 105-*g* that the base station 105-*g* supports on-demand UE-initiated group calls. In some cases, the advertisement of support 705 may provide information regarding support of on-demand UE-initiated group calls in the cell in which the base station 105-*g* broadcasts the advertisement of support 705 as well as neighboring cells (e.g., neighboring geographically or in frequency). In some cases, the advertisement of support 705 may include one or more cell identifiers along with information regarding whether on-demand UE-initiated group calls are supported in the corresponding cells. In some cases, the base station 105-*g* may transmit the advertisement of support 705 as part of one or more SIBs (e.g., as part of SIB13, SIB15, SIB20, or a combination thereof, or sending the advertisement via a PMCH or PDSCH).

UEs 115, such as the source UE 115-*l* and one or more of the first set of target UEs 115-*m* and the second set of target UEs 115-*n*, may include an application client corresponding to the application server 605-*a* and may transmit to the application server 605-*a* public group request 710 indicating the interest of the corresponding UE 115, either affirmatively or negatively, in utilizing on-demand UE-initiated group calls. The interest indications may identify one or more cells in which the UE 115 is interested in utilizing on-demand UE-initiated group calls.

The application server 605-*a* may create one or more public groups that include the UEs 115 from which the application server has received a public group request 710. For example, the application server 605-*a* may determine that each of the source UE 115-*l*, the first set of target UEs 115-*m*, and the second set of target UEs 115-*n* are in the same geographic area and create a public group for that geographic area based on the cell identifiers included in the corresponding public group requests 710.

The application server 605-*a* may transmit public group information 715 to each UE 115 in the public group. In some cases, public group information 715 may identify some or all of the UEs 115 in the public group, though in some cases one or more UEs 115 may elect (e.g., as part of a corresponding public group request 710 or other message to the application server 605-*a*) to remain hidden (e.g., for privacy reasons). The application server 605-*a* may determine and public group information 715 may include session description protocol (SDP) information (e.g., SDPs for file delivery over unidirectional transport (FLUTE) transport, one or more SDPs for dynamic adaptive streaming over HTTP (DASH) streaming, one or more SDPs for real-time transport protocol (RTP) streaming, or one or more SDPs for non-streaming content) or encryption information (e.g., an encryption key for content sent or received via an SDP) or any combination thereof for use in transmitting or receiving content via a group call associated with the public group.

In some cases, two or more UEs 115 may transmit to the application server 605-*a* a private group request 720, requesting to form or join a private group. For example, in the example of process 700, the source UE 115-*l* and the first set of target UEs 115-*m* may transmit to the application server private group requests 720. The application server 605-*a* may create a private group (e.g., may assign a group ID, a G-RNTI, etc.) and include the source UE 115-*l* and the first set of target UEs 115-*m* in the private group. In some cases, the application server 605-*a* may check contact lists for the UEs 115 requesting to form or join a private group and constrain a private group to UEs 115 that are common to one another's contact lists. In some cases, the application server 605-*a* may check cell locations for the UEs 115 requesting to form or join a private group and constrain a private group to UEs 115 that are common to a cell or other geographic area. In some cases, the application server 605-*a* may give one of the UEs 115 in private group administrative privileges—for example, the application server may give administrative privileges to a UE 115 that initially requests the group (e.g., the source UE 115-*l*). Administrative privileges may include the ability to add or delete other UEs 115 (e.g., the first set of target UEs 115-*m*) from the private group, and UEs 115 without administrative privileges may be constrained to only adding or removing themselves from the private group.

The application server 605-*a* may determine and transmit private group information 725 to the source UE 115-*l* and the first set of target UEs 115-*m*. Private group information 725 may identify some or all of the UEs 115 in the private group, though in some cases one or more UEs 115 may elect (e.g., as part of a corresponding public group request 710, private group request 720, or other message to the application server 605-*a*) to remain hidden (e.g., for privacy reasons). Private group information 725 may include SDP and encryption information for use in transmitting or receiving content via a group call associated with the private group, like the SDP and encryption information described above in reference to public group information 715. In some cases, private group information 745 may also include the same content as public group information 715, as the source UE 115-*l* and the first set of target UEs 115-*m* may belong to the public group as well as the private group.

In some cases, an additional UE 115, such as an additional one of the second set of target UEs 115-*n* may send an additional public group request 730 to the application server 605-*a*, asking to join the existing public group, and the application server 605-*a* may transmit to the additional UE 115 public group information 735, which may include the same content as public group information 715.

Similarly, in some cases, an additional UE 115, such as an additional one of the first set of target UEs 115-*m* may send an additional private group request 740 to the application server 605-*a*, asking to join the existing private group, and the application server 605-*a* may transmit to the additional UE 115 private group information 745, which may include the same content as public group information 725. In some cases, private group information 745 may also include the same content as public group information 715

In some cases, a UE 115 may leave a geographic area associated with a public or private group and transmit to the application server 605-*a* a request (not shown) to be removed from the group. In response to such a request, the application server 605-*a* may remove the UE 115 from the group and update the group database 610 accordingly.

Figure 8:
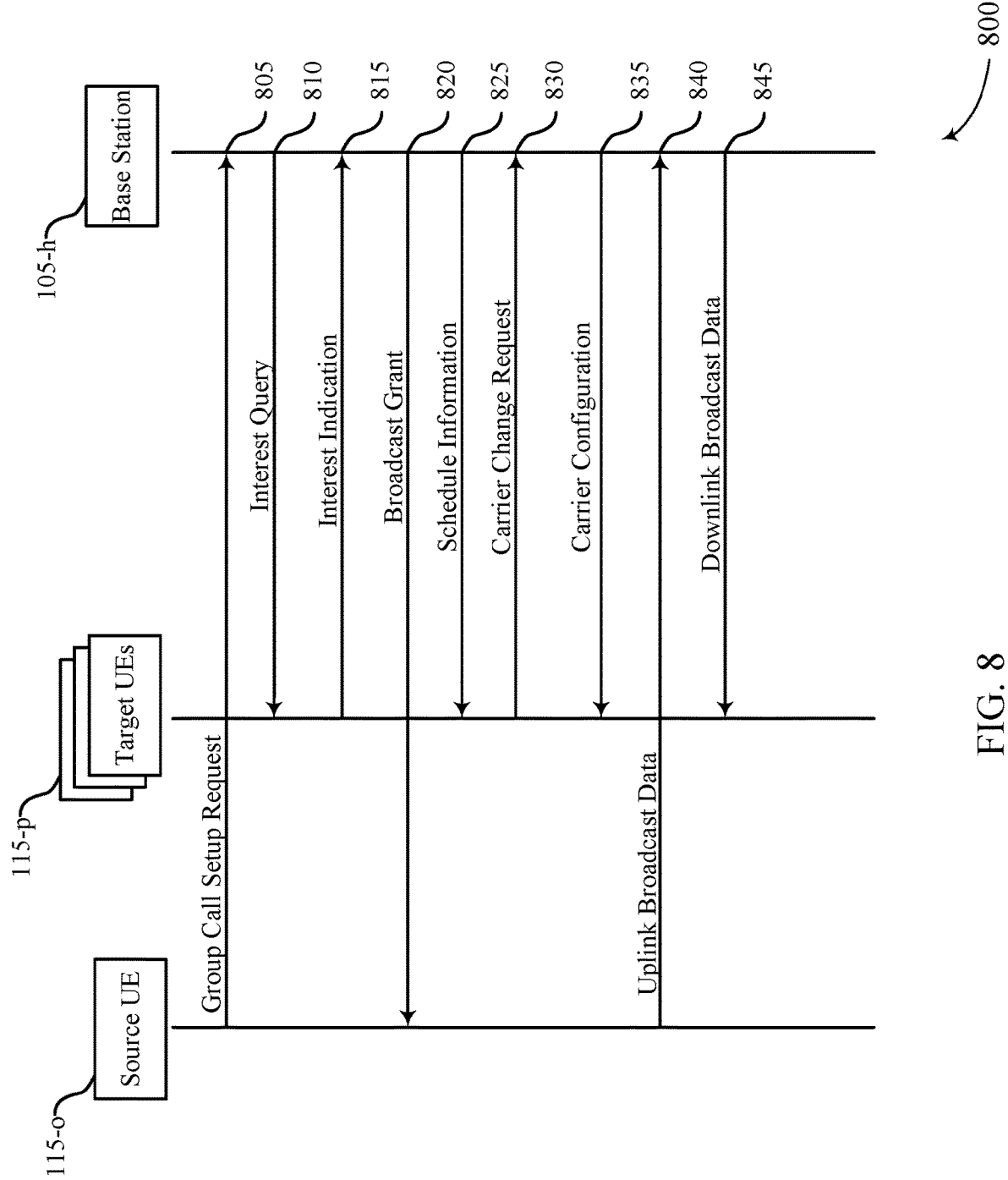
FIG. 8 illustrates an example of a process that supports local broadcast for group calls in accordance with aspects of the present disclosure.

FIG. 8 illustrates an example of a process 800 that supports local broadcast for group calls in accordance with various aspects of the present disclosure. In some examples, process 800 may be implemented by aspects of wireless communication system 100 or wireless communications system 600. For example, process 800 may be implemented by a source UE 115-*o*, a set of one or more target UEs 115-*p*, and a base station 105-*h*, which may be examples of UEs 115 and a base station 105 as described in reference to wireless communication system 100 or wireless communications system 600.

The source UE 115-*o* may transmit to the base station 105-*h* a group call setup request 805. The group call setup request 805 may identify one or more corresponding UE groups (e.g., may include one or more Group IDs) as well as one or more attributes of the requested group call as described herein. For example, the group call setup request 805 may indicate an amount of data for broadcast, a type of data for broadcast (e.g., data, voice, or video), content for the broadcast data, a bandwidth for the broadcast data, a data rate for the broadcast data, or one or more other attributes of the requested group call. In some cases, if the source UE 115-*o* is in an RRC idle state, the source UE 115-*o* may set up an RRC connection and then send the group call setup request 805.

The base station 105-*h* may assess a level of interest in the group call and determine whether to allow the related broadcast session to occur based at least in part on the level of interest. For example, the base station 105-*h* may probe the interest of one or more target UEs 115-*p*, which may include sending a unicast interest query 810 to one or more of the target UEs 115-*p* (e.g., via a PDSCH) or broadcasting an interest query (e.g., including the interest query in one or more SIBs or other broadcast configuration messages, such as in configuration information 345, or sending the interest query via a PMCH or PDSCH) and encoding the interest query with a group identifier associated with the group call.

The base station 105-*h* may receive an interest indication 815 from one or more of the target UEs 115-*p*, which may be affirmative interest indications or negative interest indications, and may in some cases determine a number of affirmative interest indications 815 for the group call. In some cases, all queried UEs 115 may transmit an interest indication 815; in other cases, some queried UEs 115 may not transmit an interest indication 815, which the base station 105-*h* may treat as a negative interest indication. One or more of the target UEs 115-*p* may be in an RRC connected state and may transmit an interest indication 815 via a physical uplink shared channel (PUSCH). If a target UE 115-*p* is in an RRC idle state, the target UE 115-*p* may set up an RRC connection and then send an interest indication 815, including, for example, resources indicated by the base station 105-*h* in the interest query 810.

If the base station 105-*h* determines there is a sufficient level of interest in the requested group call (e.g., determines a sufficient number of affirmative interest indications 815 within a predetermined time of transmitting the interest queries 810, the base station 105-*h* may determine to allow the requested group call to occur and may transmit a broadcast grant 820 to the source UE 115-*o*. The base station 105-*h* may encode the broadcast grant 820 with an identifier (e.g., a C-RNTI) of the source UE 115-*o*.

The base station 105-*h* may determine and include in the broadcast grant 820 one or more multicast transmission parameters for a broadcast session corresponding to the group call, such as a USD for the broadcast session, one or more IP addresses corresponding to the one or more target UEs 115-*p*, an encryption key for the broadcast session, or any combination thereof or of other multicast transmission parameters that the source UE 115-*l* may use in preparing data for broadcast and transmitting it to the base station 105-*h* via an uplink transmission.

The base station 105-*h* may also transmit (e.g., broadcast) schedule information 825 indicating when and upon which transmission resources (e.g., carriers and channels) the base station will broadcast the group call. The base station may transmit the schedule information 825 as part of one or more SIBs (e.g., as part of SIB13, SIB15, SIB20, or a combination thereof), as part of one or more configuration messages, such as MBSFN area configuration or SCPTM configuration messages, or via a PMCH or a PDSCH, respectively. In some cases, the base station 105-*b* may encode (e.g., scramble) the schedule information 825 with a group identifier (e.g., G-RNTI) for the group call, and UEs 115, such as the one or more target UEs 115-*p*, may use the group identifier to identify and obtain the schedule information 825.

In some cases, one or more target UE 115-*p* may transmit to the base station 105-*h* a carrier change request 830, requesting to utilize a carrier via which (e.g., as indicated by the schedule information 825) the base station 105-*h* will broadcast the group call. The base station 105-*h* may transmit to the target UE 115-*p* carrier configuration 835 to configure the target UE 115-*p* to utilize the requested carrier. The carrier change for the target UE 115-*p* may include a change to a different frequency band. In some cases, the base station 105-*h* may determine to broadcast the group call on multiple carriers or bands (e.g., if load balancing would be adversely impacted by allowing one or more target UEs 115-*p* to change carriers).

The source UE 115-*o* may use resources indicated in the broadcast grant 820 and process the data for broadcast and transmit the uplink broadcast data 840 to the base station 105-*h*. For example, the source UE 115-*o* may perform user plane processing on the uplink broadcast data 840 that would otherwise be performed by a core network node (e.g., an application server) in a conventional system and method. For example, the source UE 115-*o* may address the uplink broadcast data 840 to one or more IP addresses, encode the uplink broadcast data 840 using a forward error correction encoding algorithm, encrypt the uplink broadcast data 840 using an encryption key, encode the uplink broadcast data 840 in accordance with an audio or video codec, compress one or more headers for the uplink broadcast data 840, or otherwise process the uplink broadcast data 840 to prepare it for multicast transmission to one or more target UEs 115-*p* by the base station 105-*h*.

Thus, during the group call, the base station 105-*h* may act as a mere relay or reflector that receives uplink broadcast data 840 from the source UE 115-*a* and transmits corresponding downlink broadcast data 845 to the interested target UEs 115-*p* via one or more downlink multicast transmissions. Thus, the base station 105-*h* may deliver the downlink broadcast data 845 with decreased latency and complexity and increased efficiency and reliability compared to conventional systems and methods. For example, the broadcast data may not pass through any network entity other than the base station 105-*h*.

It should be understood that aspects of process 800 may in some examples occur in temporal order different than those shown in the example of process 800.

Figure 9:
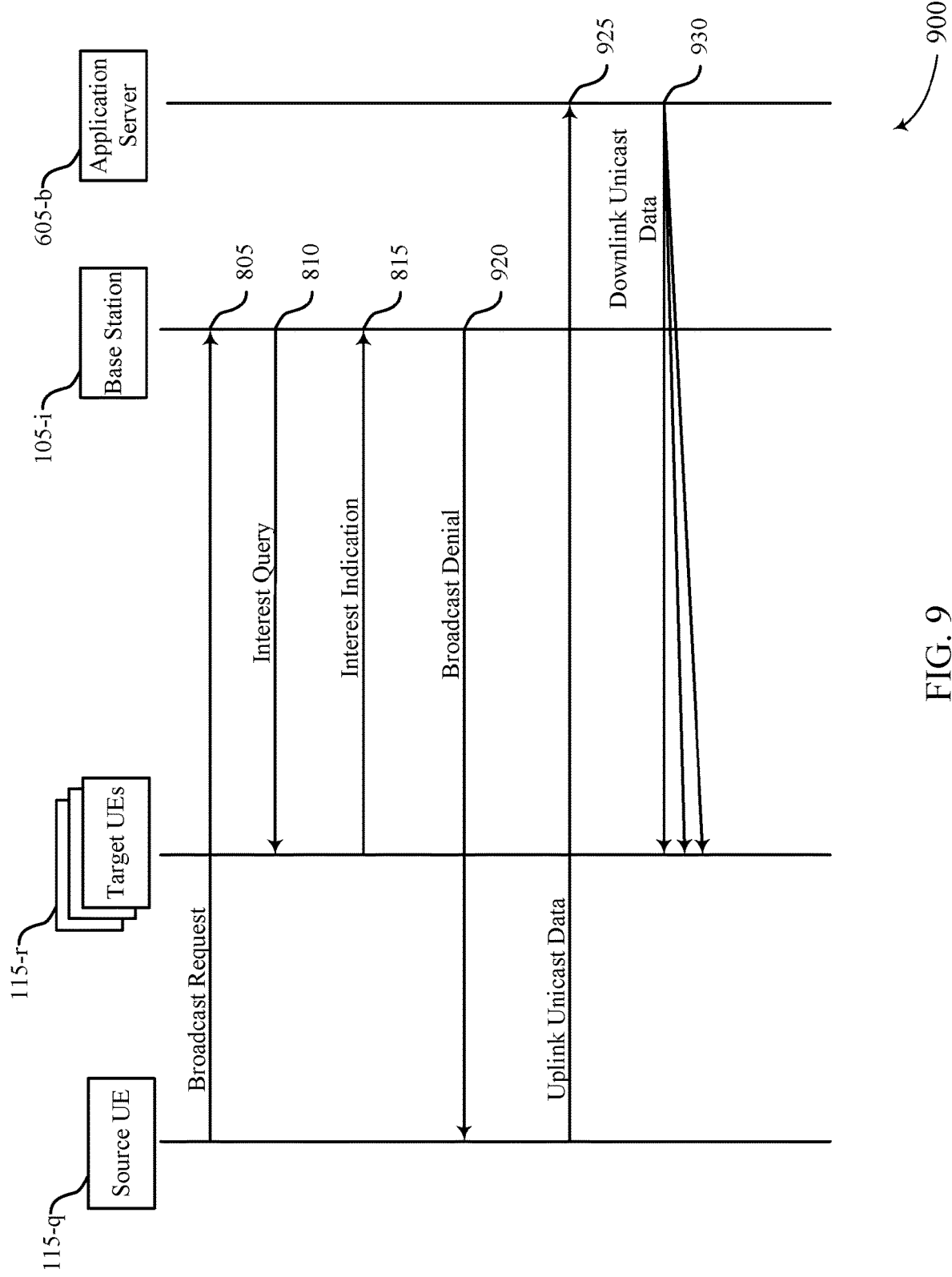
FIG. 9 illustrates an example of a process that supports local broadcast for group calls in accordance with aspects of the present disclosure.

FIG. 9 illustrates an example of a process 900 that supports local broadcast for group calls in accordance with various aspects of the present disclosure. In some examples, process 900 may be implemented by aspects of wireless communication system 100 or wireless communications system 600. For example, process 900 may be implemented by a source UE 115-*q*, a set of one or more target UEs 115-*r*, a base station 105-*i*, and an application server 605-*b*, which may be examples of UEs 115, a base station 105, and an application server 605 as described in reference to wireless communication system 100 or wireless communications system 600.

Process 400 may proceed as described above for process 800 through the receipt of interest indications 815 by the base station 105-*h*. In some cases, the base station 105-*i* may determine that there is insufficient interest for the group call (e.g., based at least in part on a number of affirmative interest indications 815 received) and transmit to the source UE 115-*q* a broadcast denial 920. The base station 105-*q* may encode the broadcast denial 920 with an identifier of the source UE 115-*q* (e.g., a C-RNTI).

In some cases, the source UE 115-*q* may choose to restart the process by transmitting to the base station 105-*h* another broadcast request at some later time. In other cases, the source UE 115-*q* may determine to transmit uplink unicast data 925 (e.g., data that the source UE 115-*q* has not processed for multicast transmission) to the application server 605-*b*. The application server may perform user plane processing on the uplink unicast data 925 and transmit corresponding downlink unicast data 930 to each interested target UE 115-*r* in unicast fashion (or, in some cases, via a conventional multicast transmission).

It should be understood that aspects of process 900 may in some examples occur in temporal order different than those shown in the example of process 400.

Figure 10:
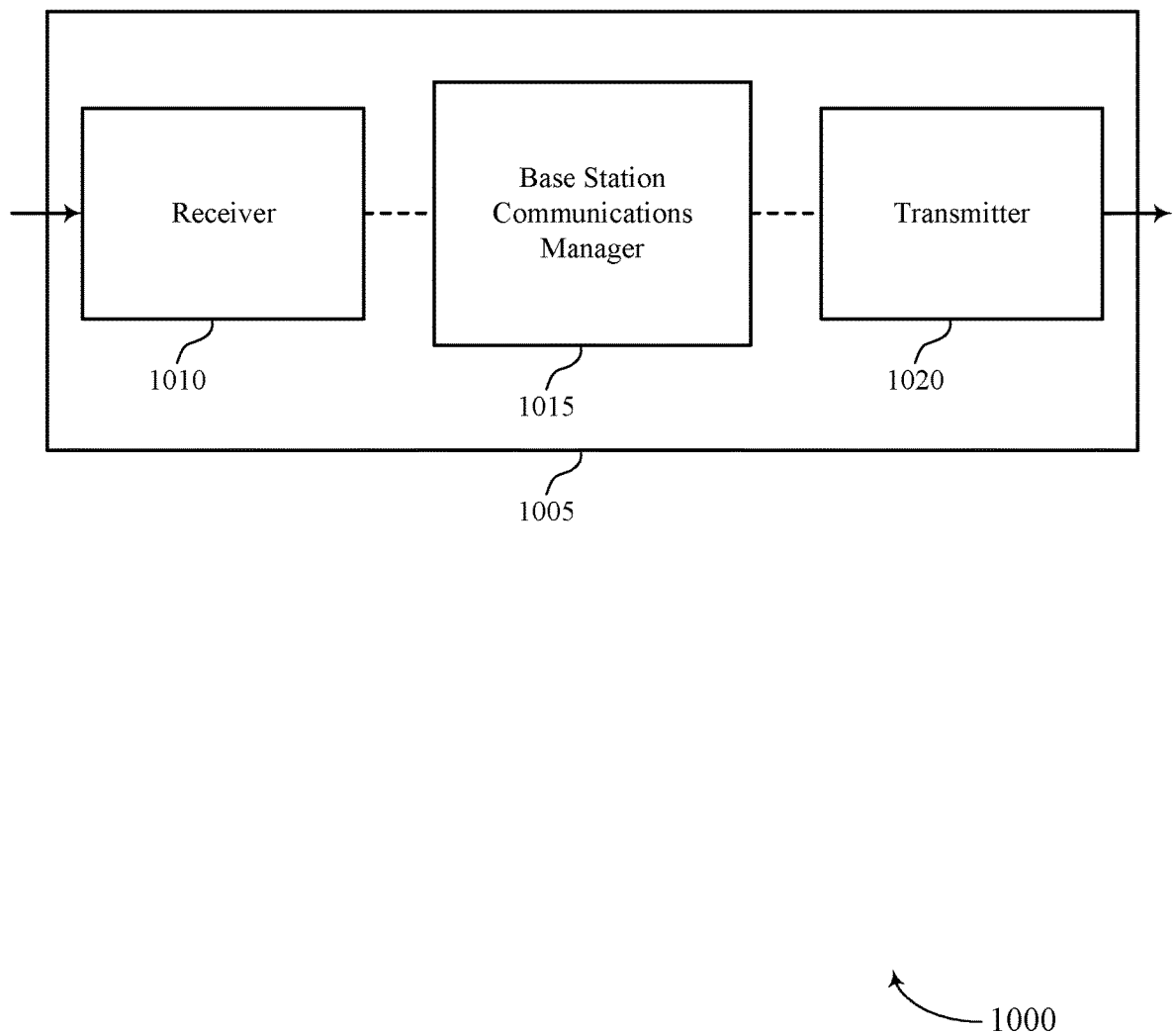
FIGS. 10 through 12 show block diagrams of a device that supports local broadcast for group calls in accordance with aspects of the present disclosure.

FIG. 10 shows a block diagram 1000 of a wireless device 1005 that supports local broadcast for group calls in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to local broadcast for group calls, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may assess, for a set of target UEs, a level of interest in a broadcast session associated with a source UE, determine, based on the level of interest in the broadcast session, whether to allow the broadcast session to occur, and transmit data received from the source UE to one or more target UEs based on the determining.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
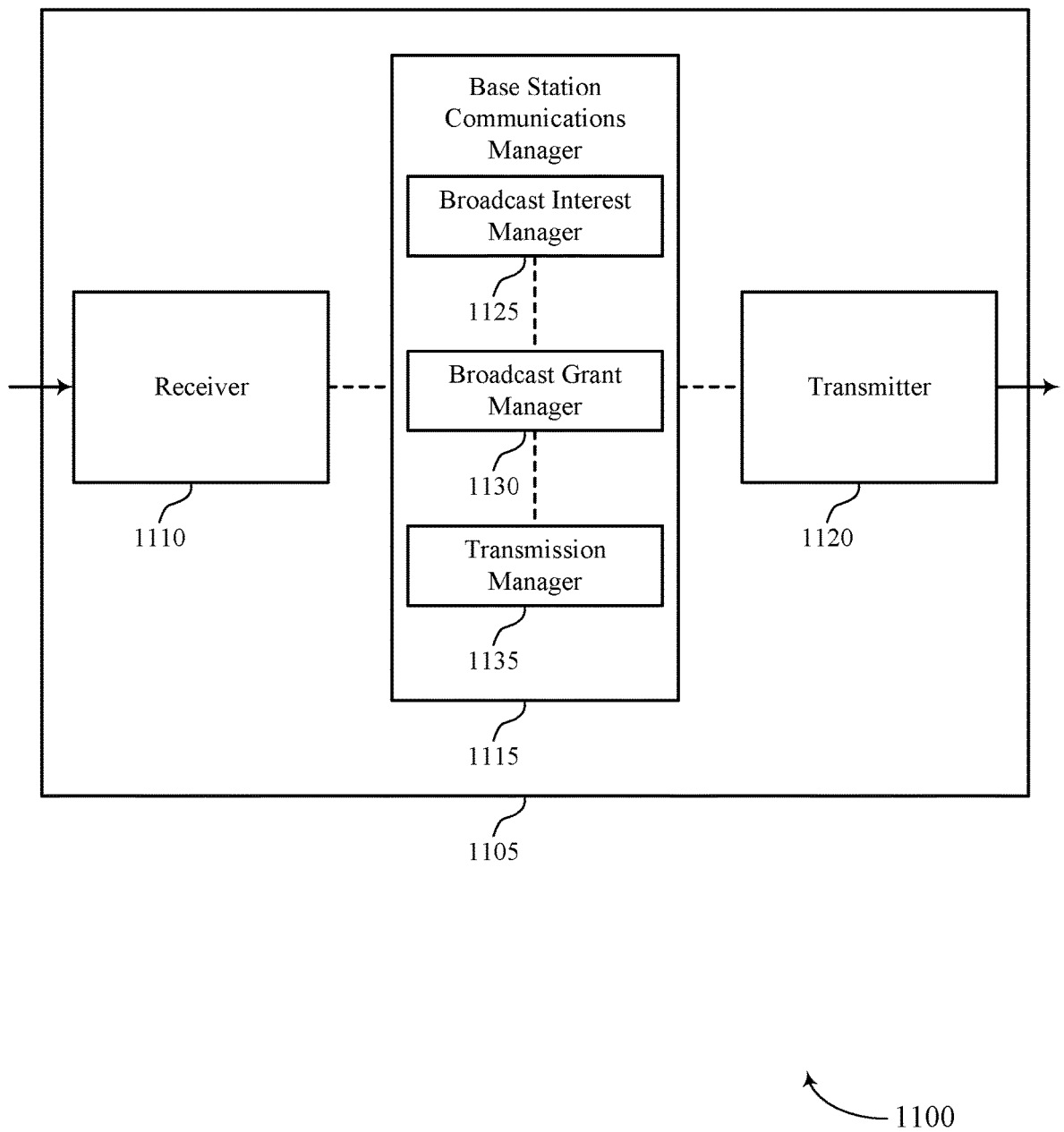

FIG. 11 shows a block diagram 1100 of a wireless device 1105 that supports local broadcast for group calls in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to local broadcast for group calls, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13. Base station communications manager 1115 may also include broadcast interest manager 1125, broadcast grant manager 1130, and transmission manager 1135.

Broadcast interest manager 1125 may assess, for a set of target UEs, a level of interest in a broadcast session associated with a source UE.

Broadcast grant manager 1130 may determine, based on the level of interest in the broadcast session, whether to allow the broadcast session to occur. In some cases, broadcast grant manager 1130 may determine to allow the broadcast session to occur and transmit a broadcast grant to the source UE. In other cases, broadcast grant manager 1130 may determine not to allow the broadcast session to occur and transmit a broadcast denial to the source UE.

Transmission manager 1135 may transmit data received from the source UE to one or more target UEs based on the determining. In some cases, transmitting data received from the source UE to one or more target UEs based on the determining includes transmitting the data associated with the broadcast session to the one or more target UEs without transmitting the data associated with the broadcast session to any network node.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
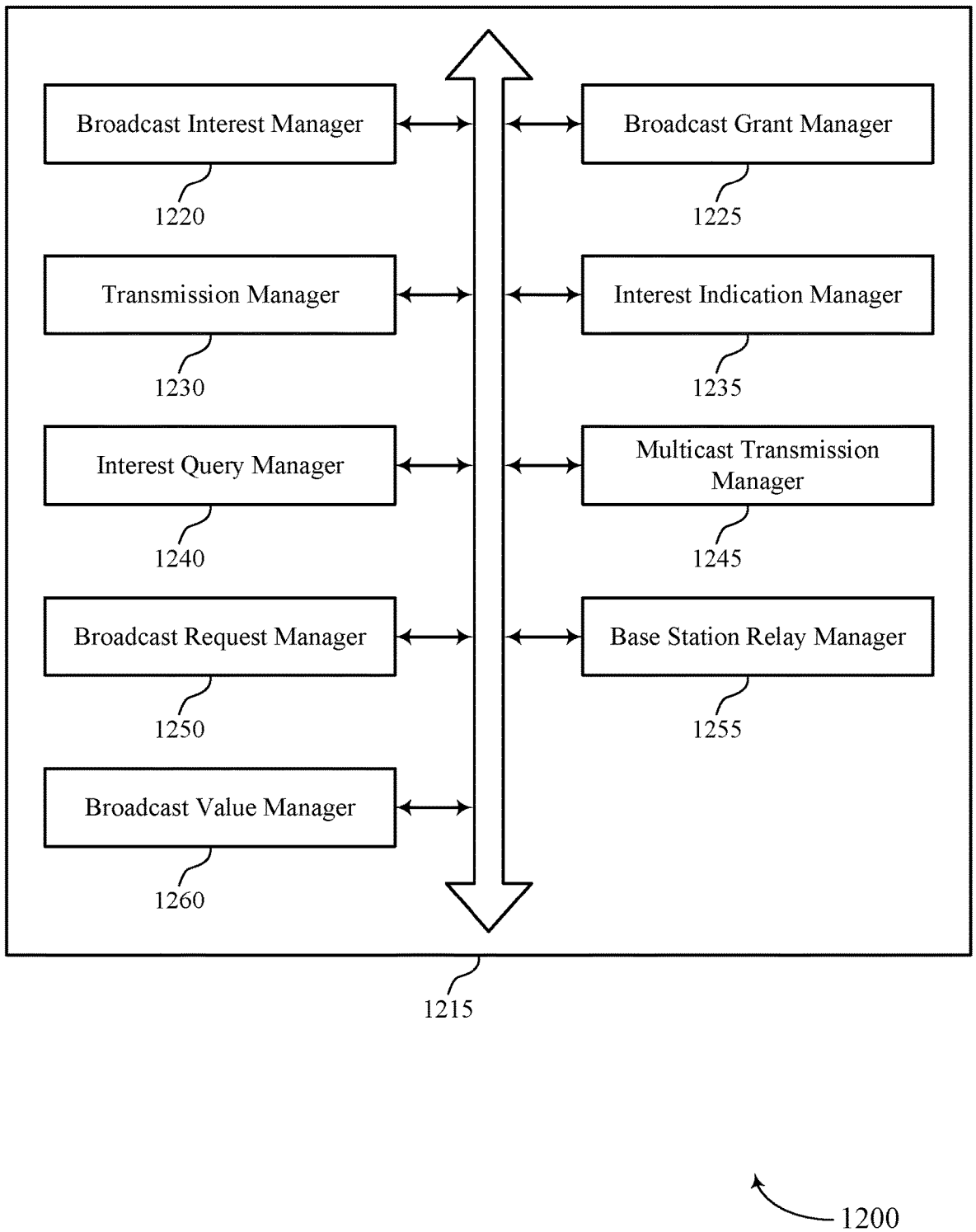

FIG. 12 shows a block diagram 1200 of a base station communications manager 1215 that supports local broadcast for group calls in accordance with aspects of the present disclosure. The base station communications manager 1215 may be an example of aspects of a base station communications manager 1015, a base station communications manager 1115, or a base station communications manager 1315 described with reference to FIGS. 10, 11, and 13. The base station communications manager 1215 may include broadcast interest manager 1220, broadcast grant manager 1225, transmission manager 1230, interest indication manager 1235, interest query manager 1240, multicast transmission manager 1245, broadcast request manager 1250, base station relay manager 1255, and broadcast value manager 1260. Each of these modules may communicate, directly or indirectly, with one another (e.g., via one or more buses).

Broadcast interest manager 1220 may assess, for a set of target UEs, a level of interest in a broadcast session associated with a source UE.

Broadcast grant manager 1225 may determine, based on the level of interest in the broadcast session, whether to allow the broadcast session to occur. In some cases, broadcast grant manager 1225 may determine to allow the broadcast session to occur and transmit a broadcast grant to the source UE. In other cases, broadcast grant manager 1225 may determine not to allow the broadcast session to occur and transmit a broadcast denial to the source UE.

Transmission manager 1230 may transmit data received from the source UE to one or more target UEs based on the determining. In some cases, transmitting data received from the source UE to one or more target UEs based on the determining includes transmitting the data associated with the broadcast session to the one or more target UEs without transmitting the data associated with the broadcast session to any network node.

In some cases, assessing, for the set of target UEs, the level of interest in the broadcast session includes receiving an interest indication regarding the broadcast session from one or more target UEs. In some cases, interest indication manager 1235 may determine a number of affirmative interest indications regarding the broadcast session received within a preconfigured time duration after transmission of an interest query to one or more target UEs.

Interest query manager 1240 may transmit the interest query via one or more SIBs, a PMCH, a PDSCH, or any combination thereof. In some cases, assessing, for the set of target UEs, the level of interest in the broadcast session includes transmitting an interest query to one or more target UEs, the target UEs associated with a UE group identifier. In some cases, transmitting the interest query to one or more target UEs, the target UEs associated with the UE group identifier includes encoding the interest query with the UE group identifier.

Multicast transmission manager 1245 may receive, from the source UE, data encoded with one or more multicast transmission parameters, and transmit the encoded data received from the source UE to the one or more target UEs via a multicast transmission. In some cases, multicast transmission manager 1245 may determine one or more multicast transmission resources for the broadcast session and transmit information regarding the one or more multicast transmission resources for the broadcast session to the one or more target UEs via one or more SIBs, a PMCH, a PDSCH, or any combination thereof. In some cases, multicast transmission manager 1245 may receive a request from a target UE to utilize a carrier corresponding to the one or more multicast transmission resources and configure the target UE to utilize the carrier corresponding to the one or more multicast transmission resources. In some cases, multicast transmission manager 1245 may receive configuration information for the broadcast session from a local server, the local server dedicated to serving a localized area that includes the base station and transmit the configuration information for the broadcast session via one or more SIBs, a PMCH, or a PDSCH, or any combination thereof. In some cases, multicast transmission manager 1245 may broadcast an indication of support for UE-initiated broadcast via one or more SIBs, a PMCH, or a PDSCH, or any combination thereof.

Broadcast request manager 1250 may receive, from the source UE, a request for the broadcast session including a group identifier corresponding to the set of target UEs, an indication of an amount of data for the broadcast session, an indication of a type of data for broadcast session, information regarding content for the broadcast session, or any combination thereof.

In some cases, base station relay manager 1255 may transmit the data associated with the broadcast session to a base station serving at least one of the one or more target UEs.

Broadcast value manager 1260 may determine a value metric for the broadcast session, where the value metric is based on an amount of transmission resources associated with the broadcast session, a duration of the broadcast session, a number of target UEs associated with the broadcast session, an amount of data associated with the broadcast session, a data rate associated with the broadcast session, a geographic area associated with the broadcast session, a calendar day associated with the broadcast session, a time of day associated with the broadcast session, or any combination thereof and transmit the value metric to a network node.

Figure 13:
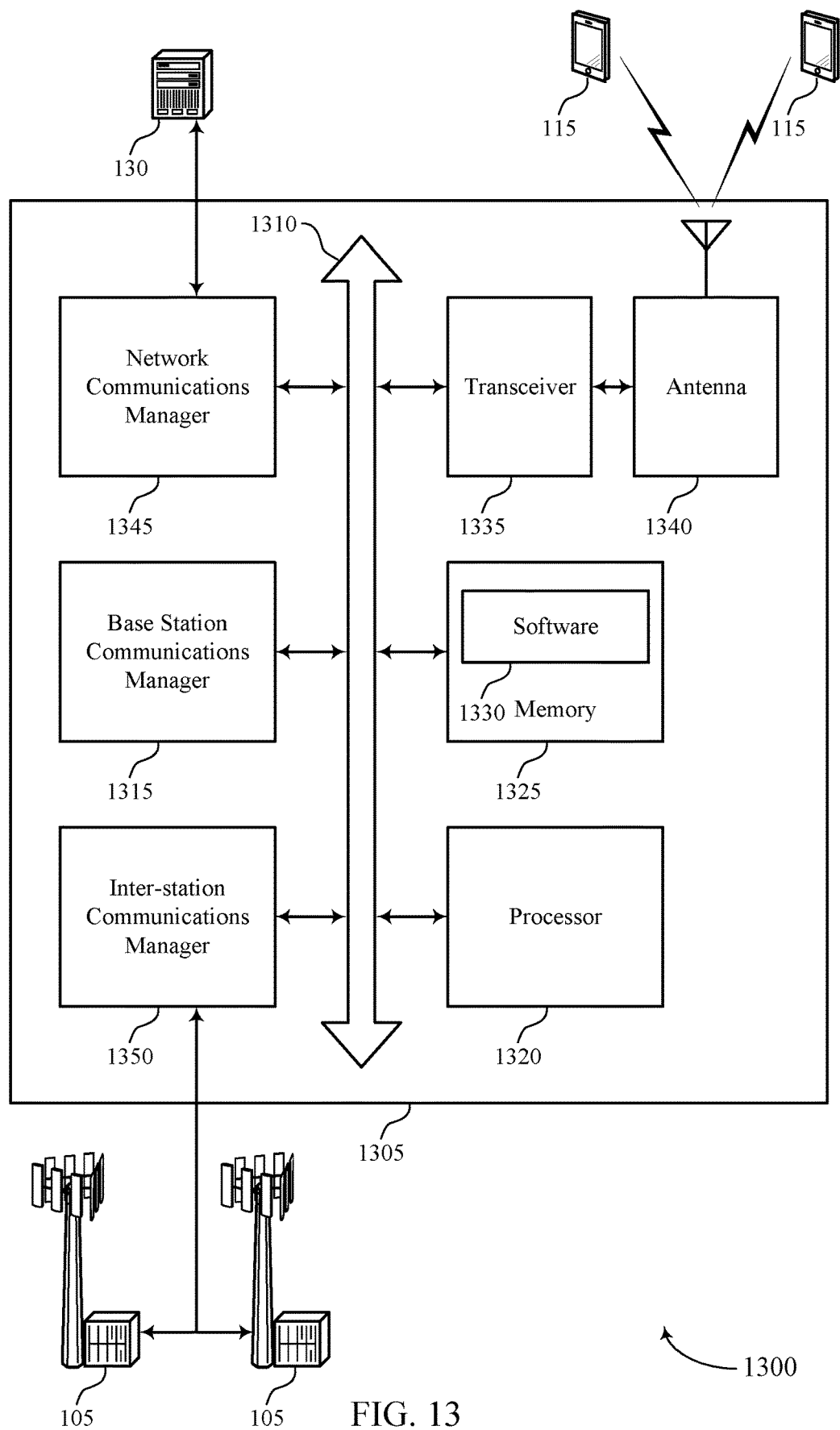
FIG. 13 illustrates a block diagram of a system including a base station that supports local broadcast for group calls in accordance with aspects of the present disclosure.

FIG. 13 shows a diagram of a system 1300 including a device 1305 that supports local broadcast for group calls in accordance with aspects of the present disclosure. Device 1305 may be an example of or include the components of wireless device 1005, wireless device 1105, or a base station 105 as described above, e.g., with reference to FIGS. 10 and 11. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting local broadcast for group calls).

Memory 1325 may include random access memory (RAM) and read only memory (ROM). The memory 1325 may store computer-readable, computer-executable software 1330 including instructions that, when executed, cause the processor to perform various functions described herein. In some cases, the memory 1325 may contain, among other things, a basic input/output system (BIOS) which may control basic hardware or software operation such as the interaction with peripheral components or devices.

Software 1330 may include code to implement aspects of the present disclosure, including code to support local broadcast for group calls. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105, and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an Long Term Evolution (LTE)/LTE-A wireless communication network technology to provide communication between base stations 105.

Figure 14:
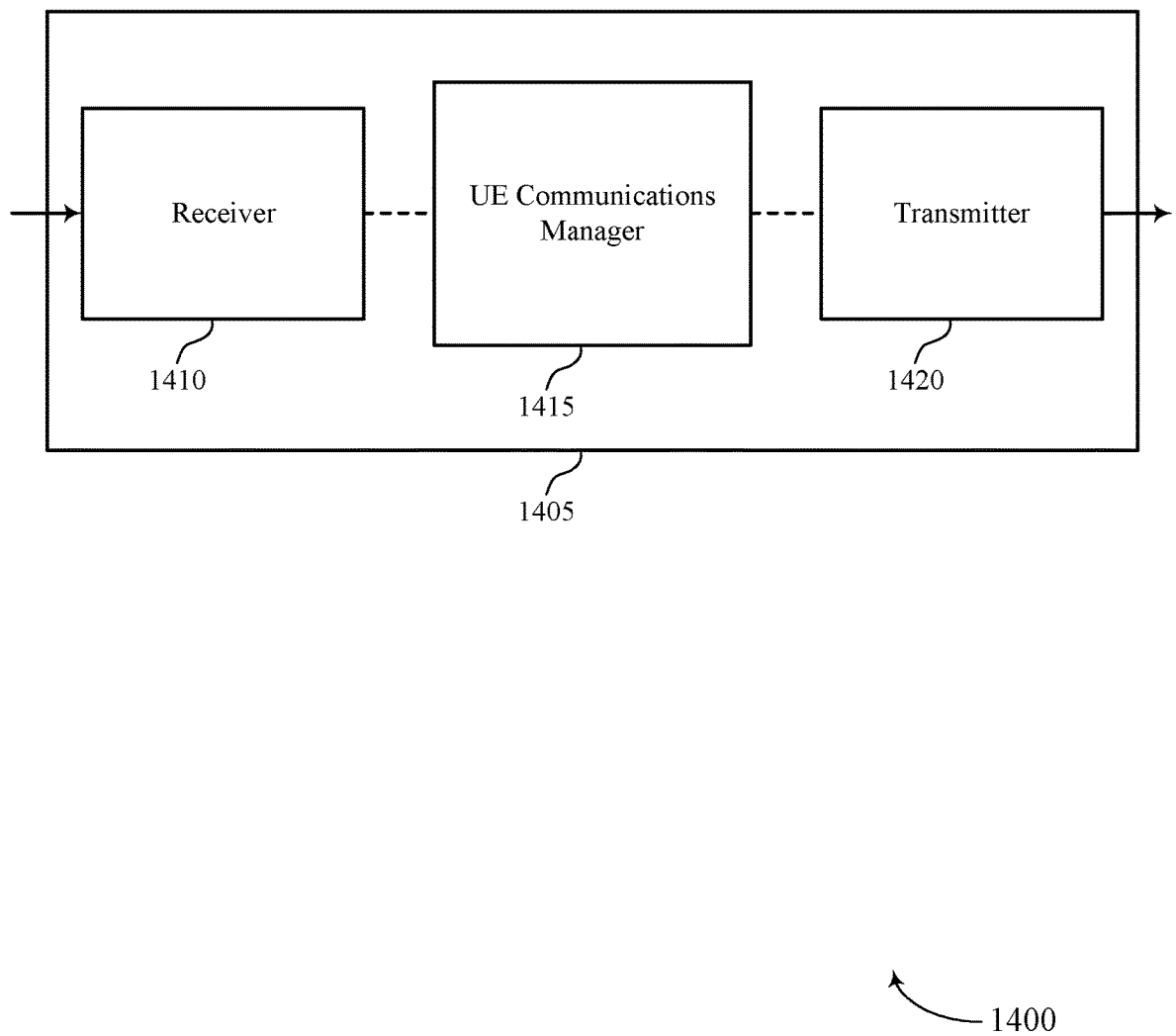
FIGS. 14 through 16 show block diagrams of a device that supports local broadcast for group calls in accordance with aspects of the present disclosure.

FIG. 14 shows a block diagram 1400 of a wireless device 1405 that supports local broadcast for group calls in accordance with aspects of the present disclosure. Wireless device 1405 may be an example of aspects of a UE 115 as described herein. Wireless device 1405 may include receiver 1410, UE communications manager 1415, and transmitter 1420. Wireless device 1405 may also include a processor. Each of these components may be in communication with one another (e.g., via one or more buses).

Receiver 1410 may receive information such as packets, user data, or control information associated with various information channels (e.g., control channels, data channels, and information related to local broadcast for group calls, etc.). Information may be passed on to other components of the device. The receiver 1410 may be an example of aspects of the transceiver 1735 described with reference to FIG. 17. The receiver 1410 may utilize a single antenna or a set of antennas.

UE communications manager 1415 may be an example of aspects of the UE communications manager 1715 described with reference to FIG. 17.

UE communications manager 1415 and/or at least some of its various sub-components may be implemented in hardware, software executed by a processor, firmware, or any combination thereof. If implemented in software executed by a processor, the functions of the UE communications manager 1415 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE communications manager 1415 and/or at least some of its various sub-components may be physically located at various positions, including being distributed such that portions of functions are implemented at different physical locations by one or more physical devices. In some examples, UE communications manager 1415 and/or at least some of its various sub-components may be a separate and distinct component in accordance with various aspects of the present disclosure. In other examples, UE communications manager 1415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

When wireless device 1405 acts as a source UE 115, the UE communications manager 1415 may transmit a request for a broadcast session, receive an indication of permission for the broadcast session, the indication of permission being based on a level of interest in the broadcast session among one or more target UEs, encode data associated with the broadcast session with one or more multicast transmission parameters, and transmit the data associated with the broadcast session to a base station. In other instances, when wireless device 1405 acts as a target UE 115, the UE communications manager 1415 may receive information regarding a broadcast session, transmit an affirmative interest indication regarding the broadcast session, and receive data associated with the broadcast session via one or more multicast transmission resources.

Transmitter 1420 may transmit signals generated by other components of the device. In some examples, the transmitter 1420 may be collocated with a receiver 1410 in a transceiver module. For example, the transmitter 1420 may be an example of aspects of the transceiver 1735 described with reference to FIG. 17. The transmitter 1420 may utilize a single antenna or a set of antennas.

Figure 15:
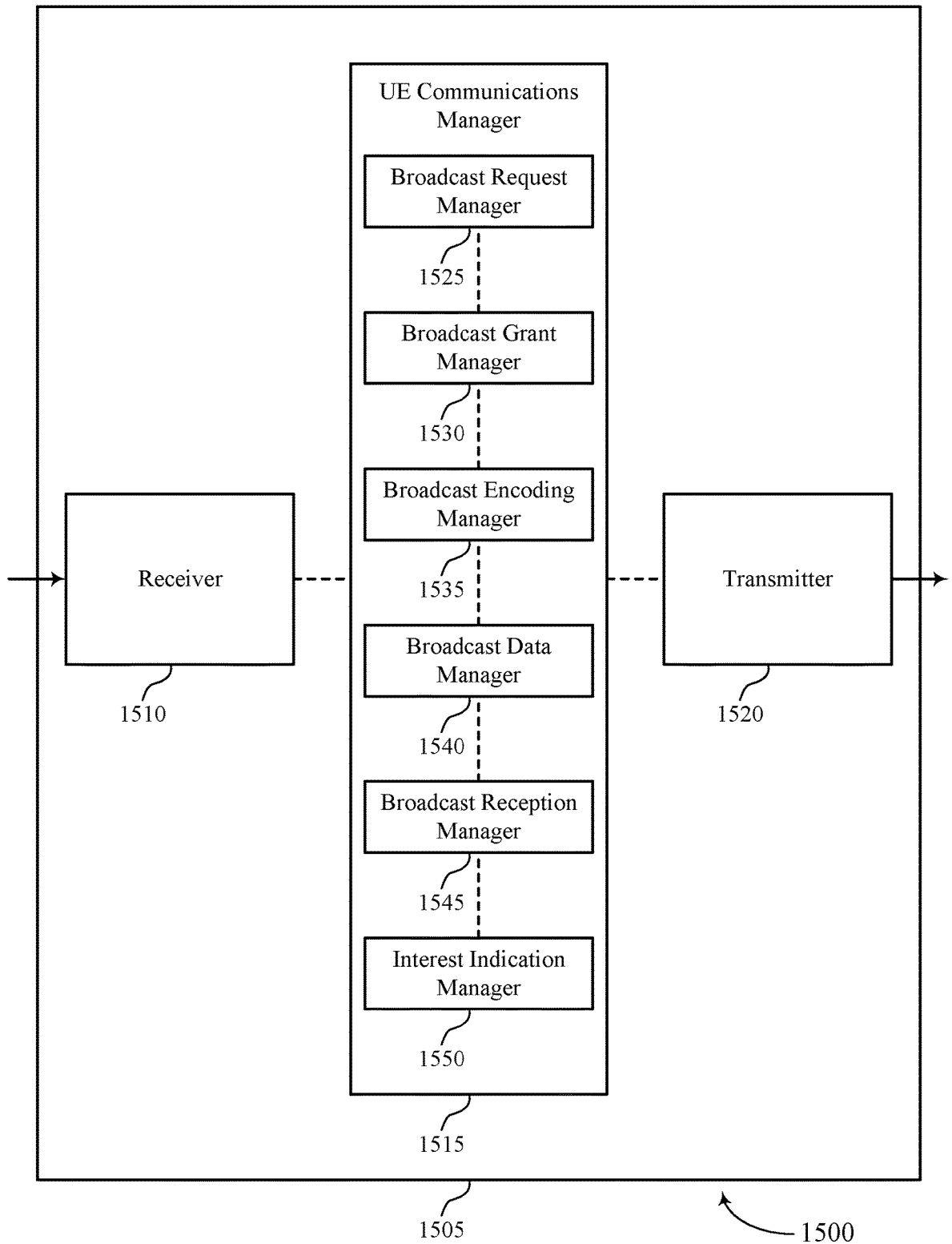

FIG. 15 shows a block diagram 1500 of a wireless device 1505 that supports local broadcast for group calls in accordance with aspects of the present disclosure. Wireless device 1505 may be an example of aspects of a wireless device 1405 or a UE 115 as described with reference to FIG. 14. Wireless device 1505 may include receiver 1510, UE communications manager 1515, and transmitter 1520. Wireless device 1505 may also include a processor. Each of these components may be in communication with one another (e.g., via one or more buses).

Receiver 1510 may receive information such as packets, user data, or control information associated with various information channels (e.g., control channels, data channels, and information related to local broadcast for group calls, etc.). Information may be passed on to other components of the device. The receiver 1510 may be an example of aspects of the transceiver 1735 described with reference to FIG. 17. The receiver 1510 may utilize a single antenna or a set of antennas.

UE communications manager 1515 may be an example of aspects of the UE communications manager 1715 described with reference to FIG. 17. UE communications manager 1515 may also include broadcast request manager 1525, broadcast grant manager 1530, broadcast encoding manager 1535, broadcast data manager 1540, broadcast reception manager 1545, and interest indication manager 1550.

Broadcast request manager 1525 may transmit a request for a broadcast session. In some cases, transmitting the request for the broadcast session includes transmitting the request for the broadcast session to a base station or to a local server dedicated to serving a localized area that includes the base station.

When wireless device 1505 acts as a source UE 115, broadcast grant manager 1530 may receive an indication of permission for the broadcast session, the indication of permission being based on a level of interest in the broadcast session among one or more target UEs. Broadcast encoding manager 1535 may encode data associated with the broadcast session with one or more multicast transmission parameters. In some cases, encoding the data associated with the broadcast session with one or more multicast transmission parameters includes addressing the data associated with the broadcast session to one or more IP addresses, encoding the data associated with the broadcast session using a forward error correction encoding algorithm, encrypting the data associated with the broadcast session using an encryption key, encoding the data associated with the broadcast session in accordance with an audio or video codec, compressing one or more headers for the data associated with the broadcast session, or any combination thereof. Broadcast data manager 1540 may transmit the data associated with the broadcast session to a base station.

When wireless device 1505 acts as a target UE 115, broadcast reception manager 1545 may receive information regarding a broadcast session, receive data associated with the broadcast session via one or more multicast transmission resources, receive an indication of a carrier corresponding to the one or more multicast transmission resources, and transmit a request to utilize the carrier corresponding to the one or more multicast transmission resources. In some cases, receiving information regarding the broadcast session includes receiving an interest query, the interest query associated with a UE group identifier, via one or more SIBs, a PMCH, a PDSCH, or any combination thereof. Interest indication manager 1550 may transmit an affirmative interest indication regarding the broadcast session.

Transmitter 1520 may transmit signals generated by other components of the device. In some examples, the transmitter 1520 may be collocated with a receiver 1510 in a transceiver module. For example, the transmitter 1520 may be an example of aspects of the transceiver 1735 described with reference to FIG. 17. The transmitter 1520 may utilize a single antenna or a set of antennas.

Figure 16:
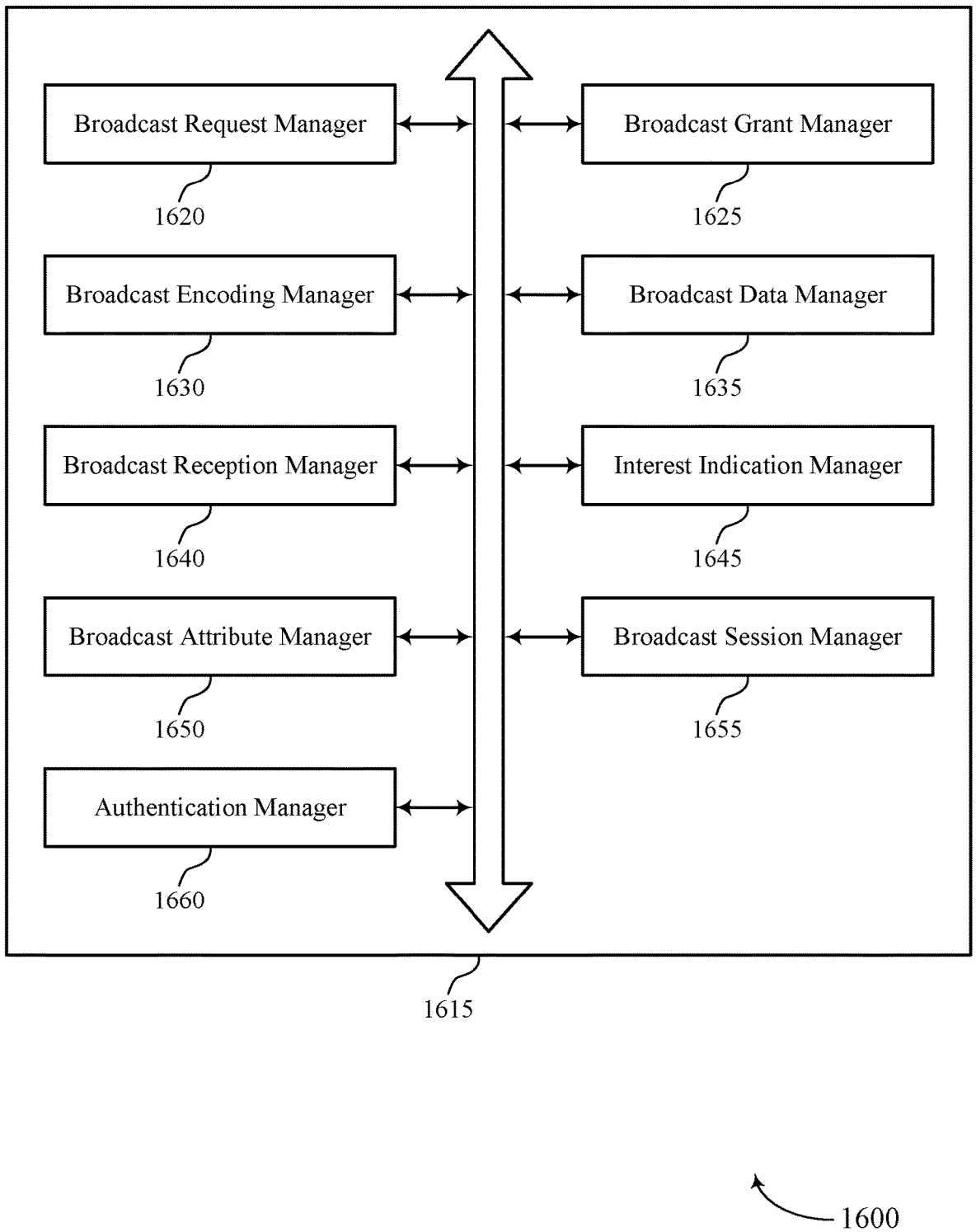

FIG. 16 shows a block diagram 1600 of a UE communications manager 1615 that supports local broadcast for group calls in accordance with aspects of the present disclosure. The UE communications manager 1615 may be an example of aspects of a UE communications manager 1715 described with reference to FIGS. 14, 15, and 17. The UE communications manager 1615 may include broadcast request manager 1620, broadcast grant manager 1625, broadcast encoding manager 1630, broadcast data manager 1635, broadcast reception manager 1640, interest indication manager 1645, broadcast attribute manager 1650, broadcast session manager 1655, and authentication manager 1660. Each of these modules may communicate, directly or indirectly, with one another (e.g., via one or more buses).

When a device that includes UE communications manager 1615 acts as a source UE 115, broadcast request manager 1620 may transmit a request for a broadcast session. In some cases, transmitting the request for the broadcast session includes transmitting the request for the broadcast session to a base station or to a local server dedicated to serving a localized area that includes the base station. In some cases, for inclusion in the request for the broadcast session, broadcast attribute manager 1650 may determine a group identifier corresponding to a group of UEs, an indication of an amount of data for the broadcast session, an indication of a type of data for broadcast session, an indication of a data rate for the broadcast session, information regarding content for the broadcast session, or any combination thereof.

Broadcast grant manager 1625 may receive an indication of permission for the broadcast session, the indication of permission being based on a level of interest in the broadcast session among one or more target UEs.

Broadcast encoding manager 1630 may encode data associated with the broadcast session with one or more multicast transmission parameters. In some cases, encoding the data associated with the broadcast session with one or more multicast transmission parameters includes addressing the data associated with the broadcast session to one or more IP addresses, encoding the data associated with the broadcast session using a forward error correction encoding algorithm, encrypting the data associated with the broadcast session using an encryption key, encoding the data associated with the broadcast session in accordance with an audio or video codec, compressing one or more headers for the data associated with the broadcast session, or any combination thereof.

Broadcast data manager 1635 may transmit the data associated with the broadcast session to a base station.

Broadcast session manager 1655 may receive a broadcast release message from a base station or from a local server dedicated to serving a localized area that includes the base station, the broadcast release message based on an updated level of interest in the broadcast session among the one or more target UEs, determine completion of the broadcast release session, and transmit a broadcast release request to a base station or to a local server dedicated to serving a localized area that includes the base station.

When a device that includes UE communications manager 1615 acts as a source UE 115, broadcast reception manager 1640 may receive information regarding a broadcast session, receive data associated with the broadcast session via one or more multicast transmission resources, receive an indication of a carrier corresponding to the one or more multicast transmission resources, and transmit a request to utilize the carrier corresponding to the one or more multicast transmission resources. In some cases, receiving information regarding the broadcast session includes receiving an interest query, the interest query associated with a UE group identifier, via one or more SIBs, a PMCH, a PDSCH, or any combination thereof. Interest indication manager 1645 may transmit an affirmative interest indication regarding the broadcast session.

Authentication manager 1660 may transmit an authentication message to a base station or to a local server dedicated to serving a localized area that includes the base station.

Figure 17:
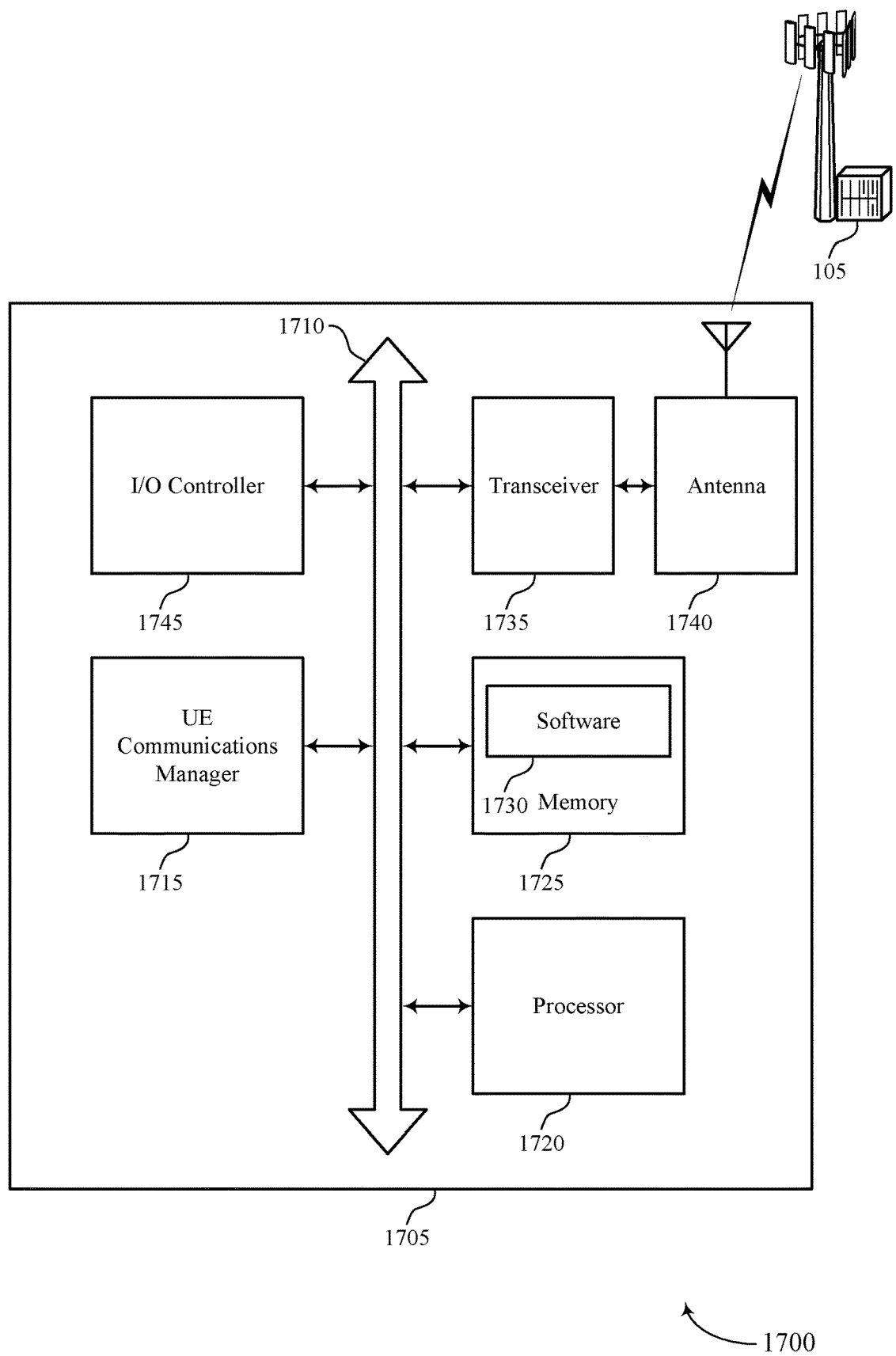
FIG. 17 illustrates a block diagram of a system including a UE that supports local broadcast for group calls in accordance with aspects of the present disclosure.

FIG. 17 shows a diagram of a system 1700 including a device 1705 that supports local broadcast for group calls in accordance with aspects of the present disclosure. Device 1705 may be an example of or include the components of UE 115 as described above, e.g., with reference to FIG. 1. Device 1705 may include components for bi-directional voice and data communications including components for transmitting and receiving communications, including UE communications manager 1715, processor 1720, memory 1725, software 1730, transceiver 1735, antenna 1740, and I/O controller 1745. These components may be in electronic communication via one or more buses (e.g., bus 1710). Device 1705 may communicate wirelessly with one or more base stations 105.

Processor 1720 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1720 may be configured to operate a memory array using a memory controller. In other cases, a memory controller may be integrated into processor 1720. Processor 1720 may be configured to execute computer-readable instructions stored in a memory to perform various functions (e.g., functions or tasks supporting local broadcast for group calls).

Memory 1725 may include RAM and ROM. The memory 1725 may store computer-readable, computer-executable software 1730 including instructions that, when executed, cause the processor to perform various functions described herein. In some cases, the memory 1725 may contain, among other things, a BIOS which may control basic hardware or software operation such as the interaction with peripheral components or devices.

Software 1730 may include code to implement aspects of the present disclosure, including code to support local broadcast for group calls. Software 1730 may be stored in a non-transitory computer-readable medium such as system memory or other memory. In some cases, the software 1730 may not be directly executable by the processor but may cause a computer (e.g., when compiled and executed) to perform functions described herein.

Transceiver 1735 may communicate bi-directionally, via one or more antennas, wired, or wireless links as described above. For example, the transceiver 1735 may represent a wireless transceiver and may communicate bi-directionally with another wireless transceiver. The transceiver 1735 may also include a modem to modulate the packets and provide the modulated packets to the antennas for transmission, and to demodulate packets received from the antennas.

In some cases, the wireless device may include a single antenna 1740. However, in some cases the device may have more than one antenna 1740, which may be capable of concurrently transmitting or receiving multiple wireless transmissions.

I/O controller 1745 may manage input and output signals for device 1705. I/O controller 1745 may also manage peripherals not integrated into device 1705. In some cases, I/O controller 1745 may represent a physical connection or port to an external peripheral. In some cases, I/O controller 1745 may utilize an operating system such as iOS®, ANDROID®, MS-DOS®, MS-WINDOWS®, OS/2®, UNIX®, LINUX®, or another known operating system. In other cases, I/O controller 1745 may represent or interact with a modem, a keyboard, a mouse, a touchscreen, or a similar device. In some cases, I/O controller 1745 may be implemented as part of a processor. In some cases, a user may interact with device 1705 via I/O controller 1745 or via hardware components controlled by I/O controller 1745.

Figure 18:
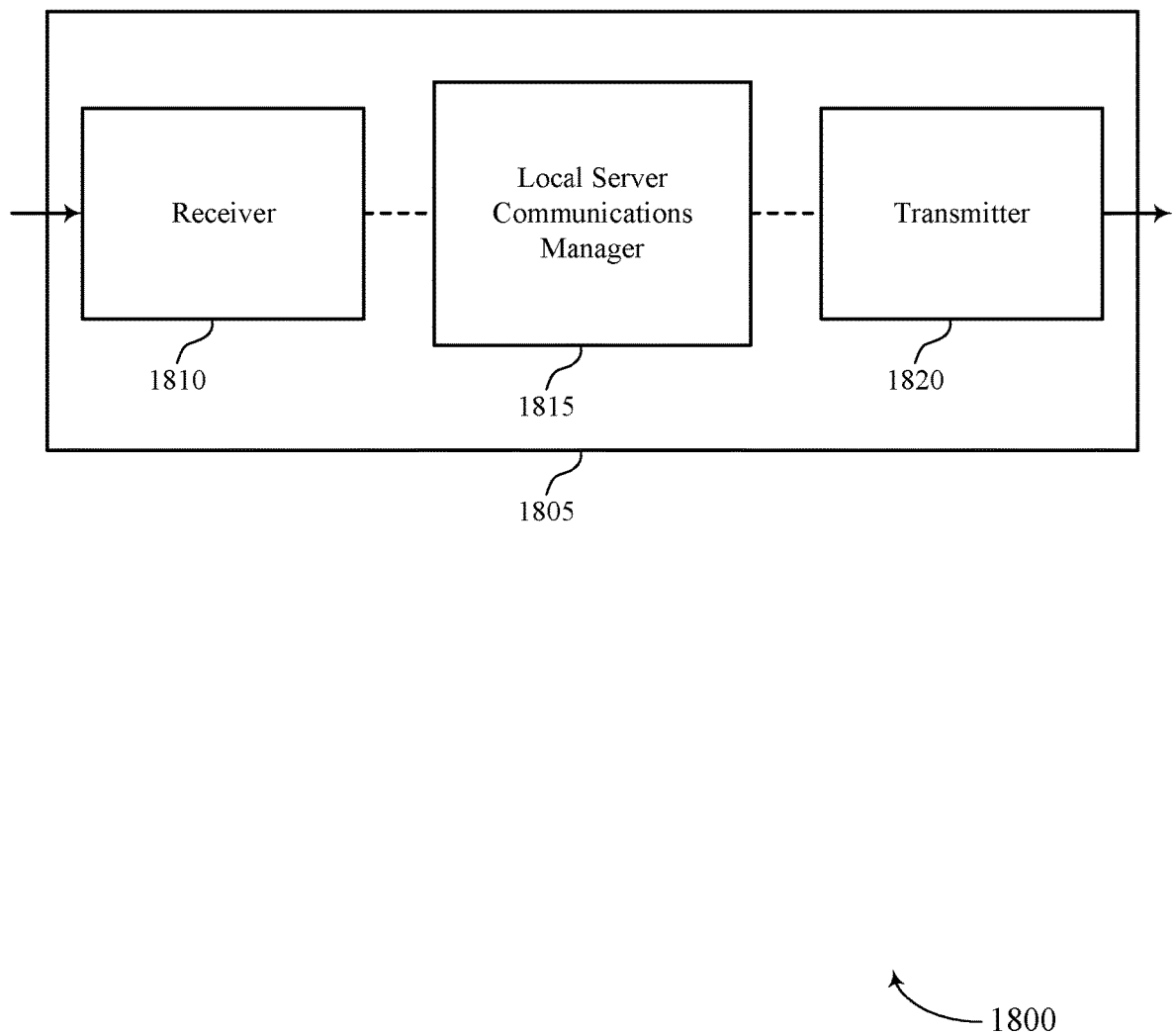
FIGS. 18 through 20 show block diagrams of a device that supports local broadcast for group calls in accordance with aspects of the present disclosure.

FIG. 18 shows a block diagram 1800 of a wireless device 1805 that supports local broadcast for group calls in accordance with aspects of the present disclosure. Wireless device 1805 may be an example of aspects of a local server 205 as described herein. Wireless device 1805 may include receiver 1810, local server communications manager 1815, and transmitter 1820. Wireless device 1805 may also include a processor. Each of these components may be in communication with one another (e.g., via one or more buses).

Receiver 1810 may receive information such as packets, user data, or control information associated with various information channels (e.g., control channels, data channels, and information related to local broadcast for group calls, etc.). Information may be passed on to other components of the device. The receiver 1810 may be an example of aspects of the transceiver 2135 described with reference to FIG. 21. The receiver 1810 may utilize a wired interface or utilize a single antenna or a set of antennas.

Local server communications manager 1815 may be an example of aspects of the local server communications manager 2115 described with reference to FIG. 21.

Local server communications manager 1815 and/or at least some of its various sub-components may be implemented in hardware, software executed by a processor, firmware, or any combination thereof. If implemented in software executed by a processor, the functions of the local server communications manager 1815 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The local server communications manager 1815 and/or at least some of its various sub-components may be physically located at various positions, including being distributed such that portions of functions are implemented at different physical locations by one or more physical devices. In some examples, local server communications manager 1815 and/or at least some of its various sub-components may be a separate and distinct component in accordance with various aspects of the present disclosure. In other examples, local server communications manager 1815 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Local server communications manager 1815 may receive a setup request for a broadcast session from a source UE, transmit to the source UE one or more multicast transmission parameters for the broadcast session, receive a listen request for the broadcast session from one or more target UEs, and transmit configuration information for the broadcast session to at least one base station, the at least one base station local to the network node.

Transmitter 1820 may transmit signals generated by other components of the device. In some examples, the transmitter 1820 may be collocated with a receiver 1810 in a transceiver module. For example, the transmitter 1820 may be an example of aspects of the transceiver 2135 described with reference to FIG. 21. The transmitter 1820 may utilize a wired interface or utilize a single antenna or a set of antennas.

Figure 19:
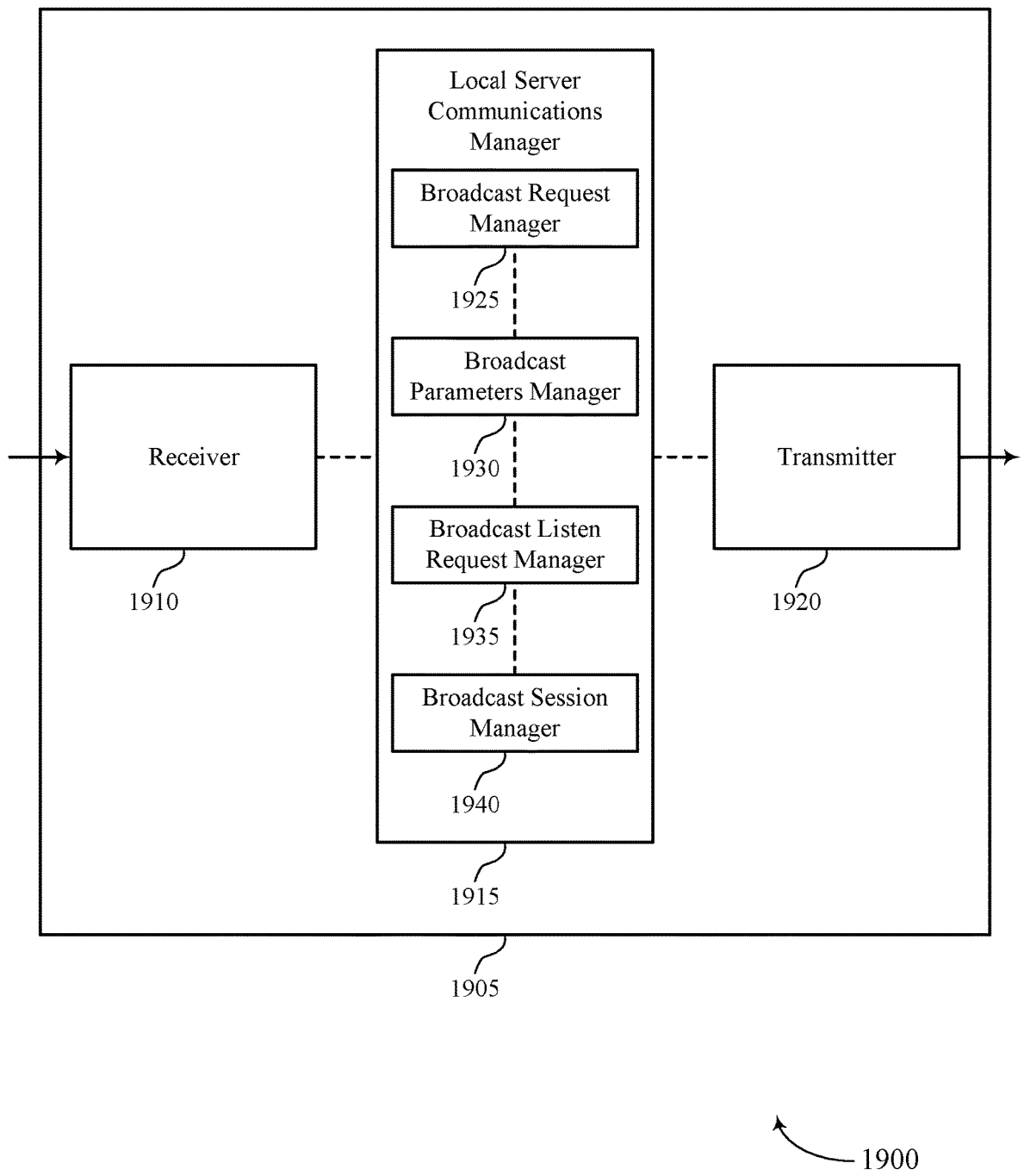

FIG. 19 shows a block diagram 1900 of a wireless device 1905 that supports local broadcast for group calls in accordance with aspects of the present disclosure. Wireless device 1905 may be an example of aspects of a wireless device 1805 or a local server 205 as described with reference to FIG. 18. Wireless device 1905 may include receiver 1910, local server communications manager 1915, and transmitter 1920. Wireless device 1905 may also include a processor. Each of these components may be in communication with one another (e.g., via one or more buses).

Receiver 1910 may receive information such as packets, user data, or control information associated with various information channels (e.g., control channels, data channels, and information related to local broadcast for group calls, etc.). Information may be passed on to other components of the device. The receiver 1910 may be an example of aspects of the transceiver 2135 described with reference to FIG. 21. The receiver 1910 may utilize a wired interface or utilize a single antenna or a set of antennas.

Local server communications manager 1915 may be an example of aspects of the local server communications manager 2115 described with reference to FIG. 21. Local server communications manager 1915 may also include broadcast request manager 1925, broadcast parameters manager 1930, broadcast listen request manager 1935, and broadcast session manager 1940.

Broadcast request manager 1925 may receive a setup request for a broadcast session from a source UE.

Broadcast parameters manager 1930 may transmit to the source UE one or more multicast transmission parameters for the broadcast session. In some cases, transmitting to the source UE one or more multicast transmission parameters for the broadcast session includes transmitting to the source UE a USD for the broadcast session, one or more IP addresses corresponding to the one or more target UEs, transmitting to the source UE an encryption key for the broadcast session, or any combination thereof.

Broadcast listen request manager 1935 may receive a listen request for the broadcast session from one or more target UEs.

Broadcast session manager 1940 may transmit configuration information for the broadcast session to at least one base station, the at least one base station local to the network node and transmit to the source UE a broadcast release message based on an insufficient level of interest in the broadcast session 30.

Transmitter 1920 may transmit signals generated by other components of the device. In some examples, the transmitter 1920 may be collocated with a receiver 1910 in a transceiver module. For example, the transmitter 1920 may be an example of aspects of the transceiver 2135 described with reference to FIG. 21. The transmitter 1920 may utilize a wired interface or utilize a single antenna or a set of antennas.

Figure 20:
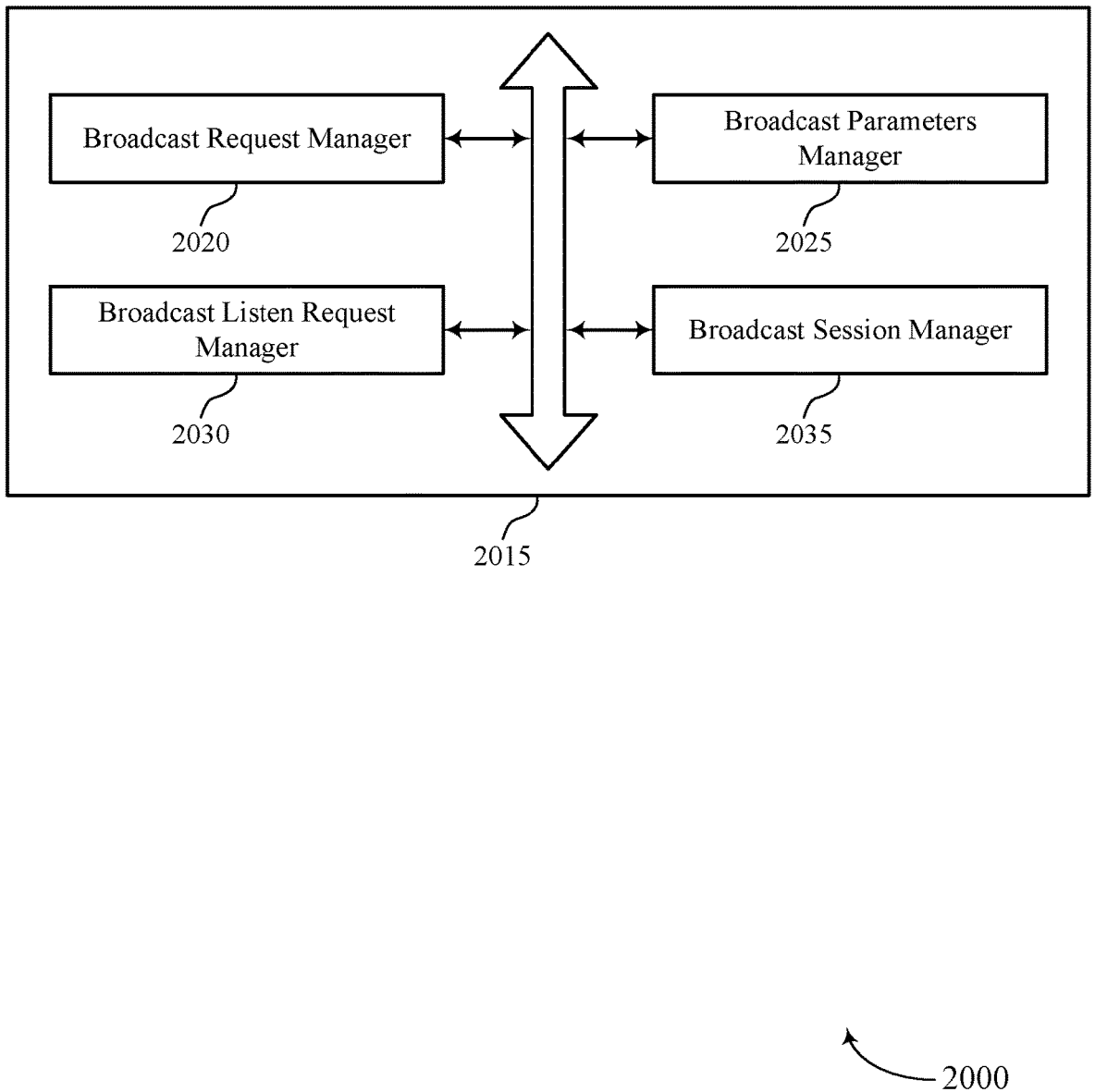

FIG. 20 shows a block diagram 2000 of a local server communications manager 2015 that supports local broadcast for group calls in accordance with aspects of the present disclosure. The local server communications manager 2015 may be an example of aspects of a local server communications manager 2115 described with reference to FIGS. 18, 19, and 21. The local server communications manager 2015 may include broadcast request manager 2020, broadcast parameters manager 2025, broadcast listen request manager 2030, and broadcast session manager 2035. Each of these modules may communicate, directly or indirectly, with one another (e.g., via one or more buses).

Broadcast request manager 2020 may receive a setup request for a broadcast session from a source UE.

Broadcast parameters manager 2025 may transmit to the source UE one or more multicast transmission parameters for the broadcast session. In some cases, transmitting to the source UE one or more multicast transmission parameters for the broadcast session includes transmitting to the source UE a USD for the broadcast session, one or more IP addresses corresponding to the one or more target UEs, transmitting to the source UE an encryption key for the broadcast session, or any combination thereof.

Broadcast listen request manager 2030 may receive a listen request for the broadcast session from one or more target UEs.

Broadcast session manager 2035 may transmit configuration information for the broadcast session to at least one base station, the at least one base station local to the network node and transmit to the source UE a broadcast release message based on an insufficient level of interest in the broadcast session 30.

Figure 21:
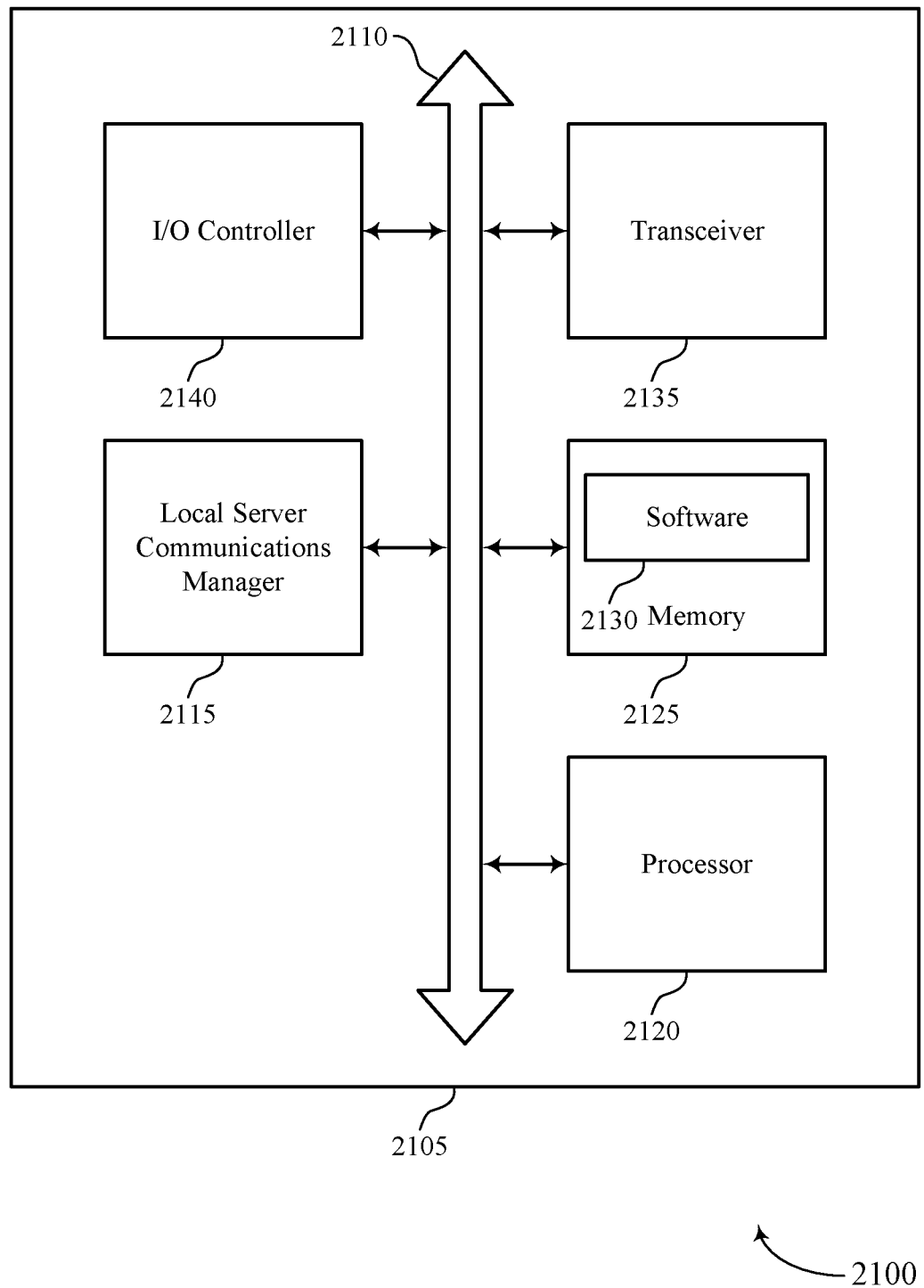
FIG. 21 illustrates a block diagram of a system including a local server that supports local broadcast for group calls in accordance with aspects of the present disclosure.

FIG. 21 shows a diagram of a system 2100 including a device 2105 that supports local broadcast for group calls in accordance with aspects of the present disclosure. Device 2105 may be an example of or include the components of a local server 205 as described above, e.g., with reference to FIG. 1. Device 2105 may include components for bi-directional voice and data communications including components for transmitting and receiving communications, including local server communications manager 2115, processor 2120, memory 2125, software 2130, transceiver 2135, and I/O controller 2140. These components may be in electronic communication via one or more buses (e.g., bus 2110).

Processor 2120 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2120 may be configured to operate a memory array using a memory controller. In other cases, a memory controller may be integrated into processor 2120. Processor 2120 may be configured to execute computer-readable instructions stored in a memory to perform various functions (e.g., functions or tasks supporting local broadcast for group calls).

Memory 2125 may include RAM and ROM. The memory 2125 may store computer-readable, computer-executable software 2130 including instructions that, when executed, cause the processor to perform various functions described herein. In some cases, the memory 2125 may contain, among other things, a BIOS which may control basic hardware or software operation such as the interaction with peripheral components or devices.

Software 2130 may include code to implement aspects of the present disclosure, including code to support local broadcast for group calls. Software 2130 may be stored in a non-transitory computer-readable medium such as system memory or other memory. In some cases, the software 2130 may not be directly executable by the processor but may cause a computer (e.g., when compiled and executed) to perform functions described herein.

Transceiver 2135 may communicate bi-directionally, via one or more antennas, wired, or wireless links as described above. For example, the transceiver 2135 may represent a wireless transceiver and may communicate bi-directionally with another wireless transceiver or may represent a wired transceiver and may communicate bi-directionally with another wired transceiver. The transceiver 2135 may also include a modem to modulate the packets and provide the modulated packets to the antennas or a wired interface for transmission, and to demodulate packets received from the antennas or the wired interface.

I/O controller 2140 may manage input and output signals for device 2105. I/O controller 2140 may also manage peripherals not integrated into device 2105. In some cases, I/O controller 2140 may represent a physical connection or port to an external peripheral. In some cases, I/O controller 2140 may utilize an operating system such as iOS®, ANDROID®, MS-DOS®, MS-WINDOWS®, OS/2®, UNIX®, LINUX®, or another known operating system. In other cases, I/O controller 2140 may represent or interact with a modem, a keyboard, a mouse, a touchscreen, or a similar device. In some cases, I/O controller 2140 may be implemented as part of a processor. In some cases, a user may interact with device 2105 via I/O controller 2140 or via hardware components controlled by I/O controller 2140.

Figure 22:
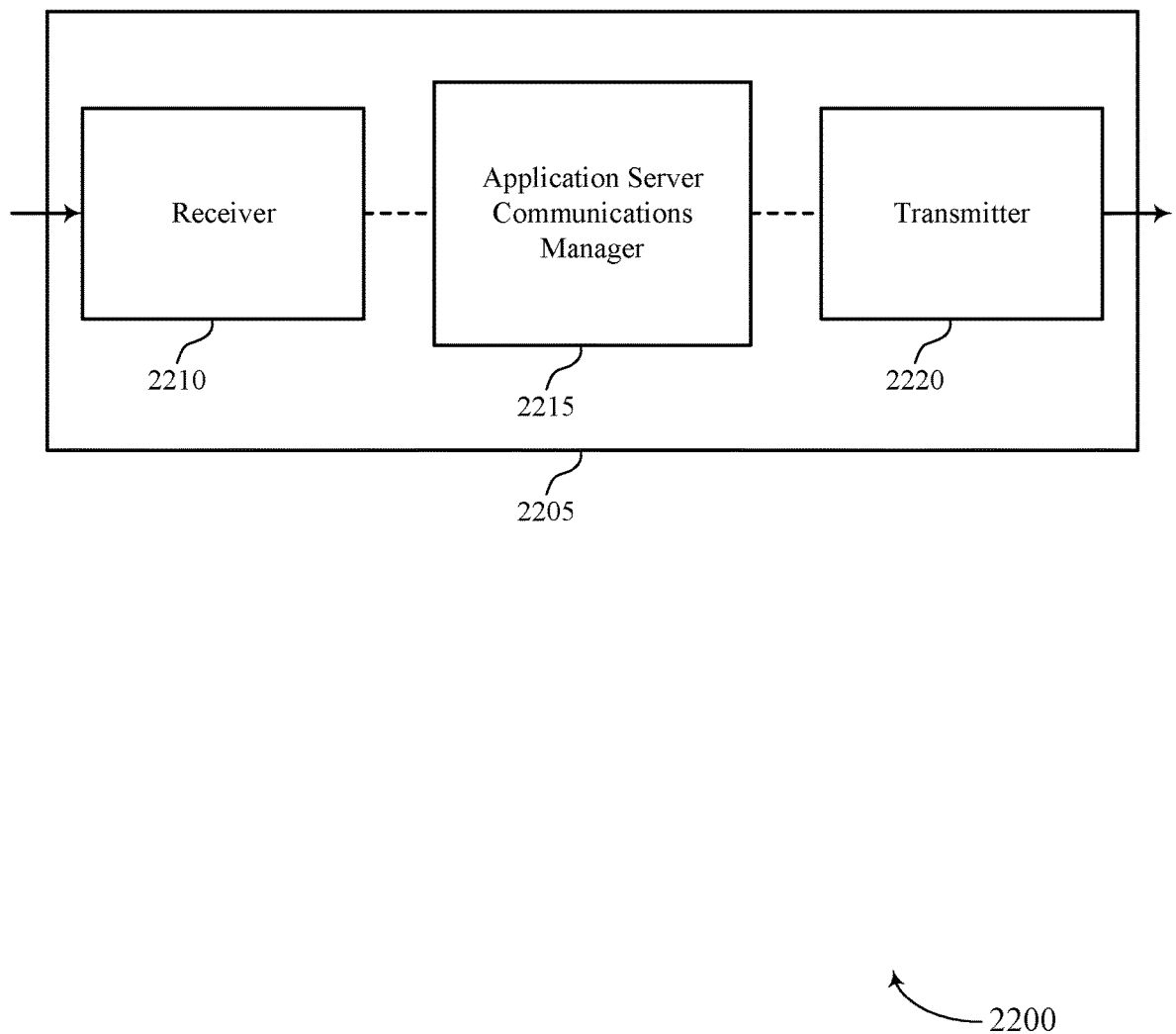
FIGS. 22 through 24 show block diagrams of a device that supports local broadcast for group calls in accordance with aspects of the present disclosure.

FIG. 22 shows a block diagram 2200 of a wireless device 2205 that supports local broadcast for group calls in accordance with aspects of the present disclosure. Wireless device 2205 may be an example of aspects of an application server 605 as described herein. Wireless device 2205 may include receiver 2210, application server communications manager 2215, and transmitter 2220. Wireless device 2205 may also include a processor. Each of these components may be in communication with one another (e.g., via one or more buses).

Receiver 2210 may receive information such as packets, user data, or control information associated with various information channels (e.g., control channels, data channels, and information related to local broadcast for group calls, etc.). Information may be passed on to other components of the device. The receiver 2210 may be an example of aspects of the transceiver 2535 described with reference to FIG. 25. The receiver 2210 may utilize a wired interface or utilize a single antenna or a set of antennas.

Application server communications manager 2215 may be an example of aspects of the application server communications manager 2515 described with reference to FIG. 25.

Application server communications manager 2215 and/or at least some of its various sub-components may be implemented in hardware, software executed by a processor, firmware, or any combination thereof. If implemented in software executed by a processor, the functions of the application server communications manager 2215 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The application server communications manager 2215 and/or at least some of its various sub-components may be physically located at various positions, including being distributed such that portions of functions are implemented at different physical locations by one or more physical devices. In some examples, application server communications manager 2215 and/or at least some of its various sub-components may be a separate and distinct component in accordance with various aspects of the present disclosure. In other examples, application server communications manager 2215 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Application server communications manager 2215 may receive, from each of a set UEs in a geographic area, an indication of interest in UE-initiated broadcast, select two or more UEs from the set of UEs for inclusion in a UE-initiated broadcast group, assign a group UE identifier to the UE-initiated broadcast group, and transmit to the selected UEs configuration information for use in UE-initiated broadcast associated with the group UE identifier.

Transmitter 2220 may transmit signals generated by other components of the device. In some examples, the transmitter 2220 may be collocated with a receiver 2210 in a transceiver module. For example, the transmitter 2220 may be an example of aspects of the transceiver 2535 described with reference to FIG. 25. The transmitter 2220 may utilize a wired interface or utilize a single antenna or a set of antennas.

Figure 23:
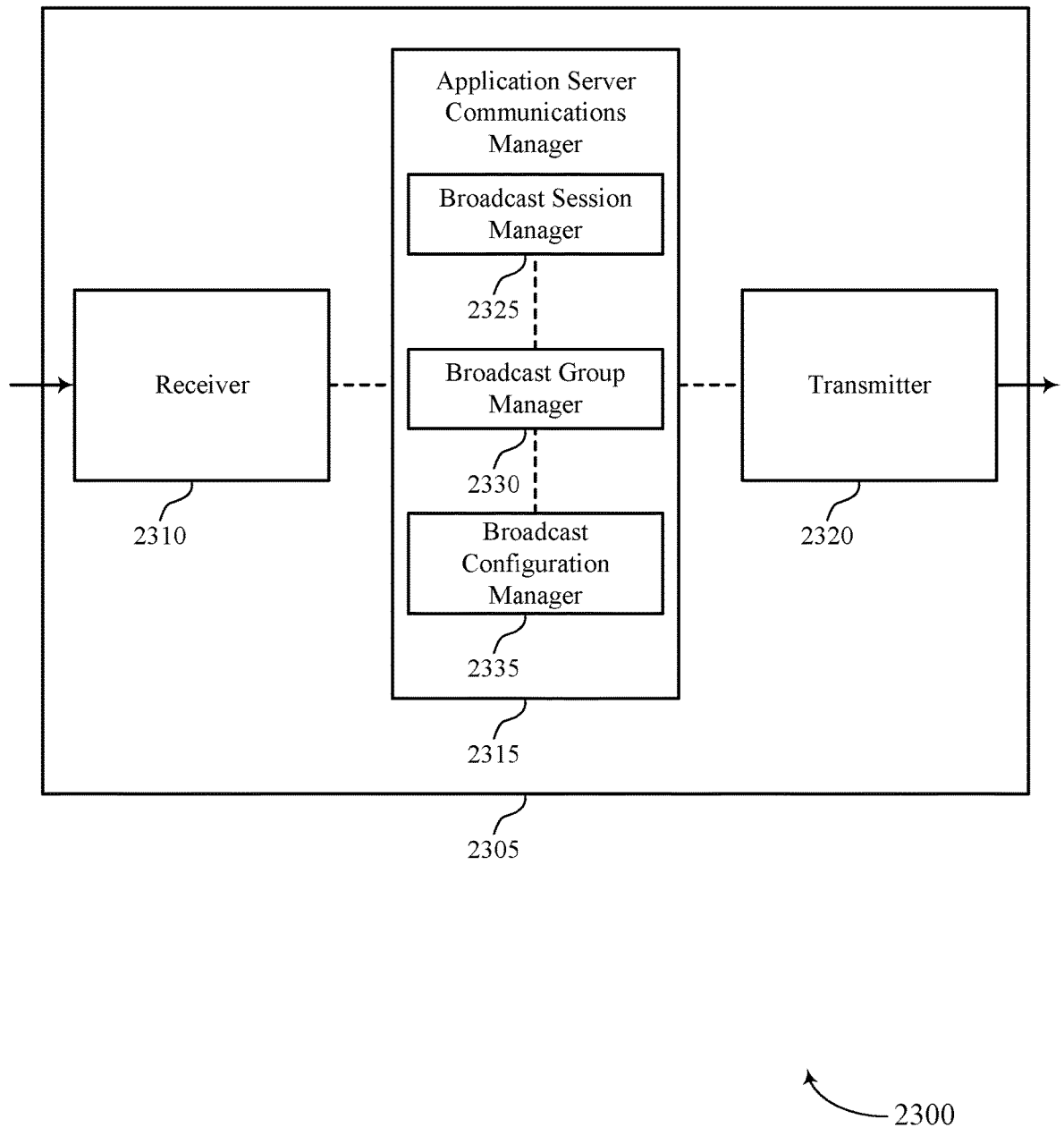

FIG. 23 shows a block diagram 2300 of a wireless device 2305 that supports local broadcast for group calls in accordance with aspects of the present disclosure. Wireless device 2305 may be an example of aspects of a wireless device 2205 or an application server 605 as described with reference to FIG. 22. Wireless device 2305 may include receiver 2310, application server communications manager 2315, and transmitter 2320. Wireless device 2305 may also include a processor. Each of these components may be in communication with one another (e.g., via one or more buses).

Receiver 2310 may receive information such as packets, user data, or control information associated with various information channels (e.g., control channels, data channels, and information related to local broadcast for group calls, etc.). Information may be passed on to other components of the device. The receiver 2310 may be an example of aspects of the transceiver 2535 described with reference to FIG. 25. The receiver 2310 may utilize a wired interface or utilize a single antenna or a set of antennas.

Application server communications manager 2315 may be an example of aspects of the application server communications manager 2515 described with reference to FIG. 25. Application server communications manager 2315 may also include broadcast session manager 2325, broadcast group manager 2330, and broadcast configuration manager 2335.

Broadcast session manager 2325 may receive, from each of a set UEs in a geographic area, an indication of interest in UE-initiated broadcast.

Broadcast group manager 2330 may select two or more UEs from the set of UEs for inclusion in a UE-initiated broadcast group, assign a group UE identifier to the UE-initiated broadcast group, receive an additional indication of interest in UE-initiated broadcast from an additional UE in the geographic area, select the additional UE for inclusion in the UE-initiated broadcast group, and transmit to the additional UE configuration information for use in a UE-initiated broadcast associated with the group UE identifier.

Broadcast configuration manager 2335 may transmit to the selected UEs configuration information for use in UE-initiated broadcast associated with the group UE identifier. In some cases, the configuration information for use in UE-initiated broadcast associated with the group UE identifier includes SDP information, encryption information, or any combination thereof.

Transmitter 2320 may transmit signals generated by other components of the device. In some examples, the transmitter 2320 may be collocated with a receiver 2310 in a transceiver module. For example, the transmitter 2320 may be an example of aspects of the transceiver 2535 described with reference to FIG. 25. The transmitter 2320 may utilize a wired interface or utilize a single antenna or a set of antennas.

Figure 24:
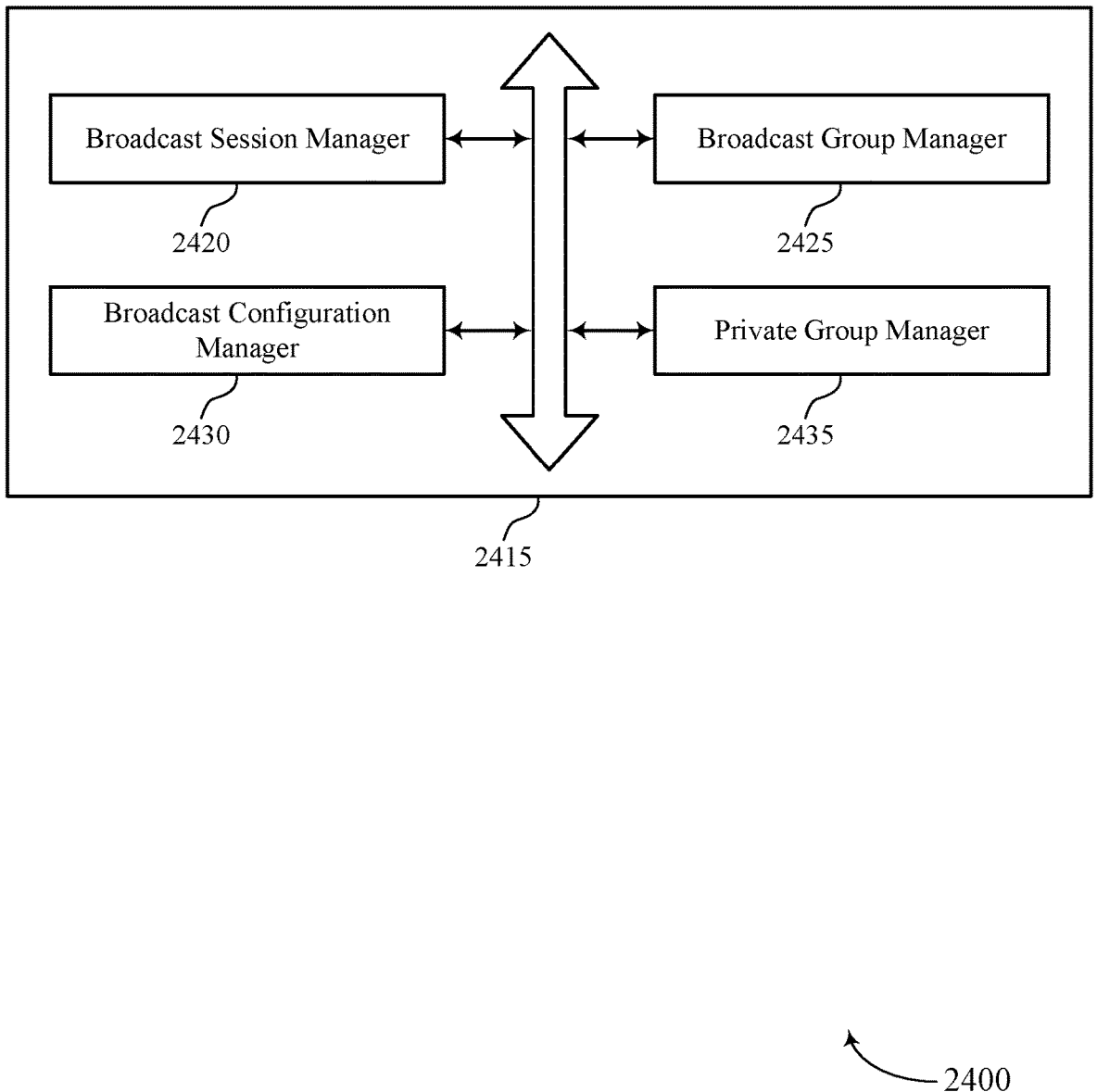

FIG. 24 shows a block diagram 2400 of an application server communications manager 2415 that supports local broadcast for group calls in accordance with aspects of the present disclosure. The application server communications manager 2415 may be an example of aspects of an application server communications manager 2515 described with reference to FIGS. 22, 23, and 25. The application server communications manager 2415 may include broadcast session manager 2420, broadcast group manager 2425, broadcast configuration manager 2430, and private group manager 2435. Each of these modules may communicate, directly or indirectly, with one another (e.g., via one or more buses).

Broadcast session manager 2420 may receive, from each of a set UEs in a geographic area, an indication of interest in UE-initiated broadcast.

Broadcast group manager 2425 may select two or more UEs from the set of UEs for inclusion in a UE-initiated broadcast group, assign a group UE identifier to the UE-initiated broadcast group, receive an additional indication of interest in UE-initiated broadcast from an additional UE in the geographic area, select the additional UE for inclusion in the UE-initiated broadcast group, and transmit to the additional UE configuration information for use in a UE-initiated broadcast associated with the group UE identifier.

Broadcast configuration manager 2430 may transmit to the selected UEs configuration information for use in UE-initiated broadcast associated with the group UE identifier. In some cases, the configuration information for use in UE-initiated broadcast associated with the group UE identifier includes SDP information, encryption information, or any combination thereof.

Private group manager 2435 may analyze contact lists associated with the set of UEs to identify UEs common to each of the contact lists and select UEs common to each of the contact lists for inclusion in the UE-initiated broadcast group. In some cases, selecting two or more UEs from the set of UEs includes identifying the indication of interest in UE-initiated broadcast as for private UE-initiated broadcast.

Figure 25:
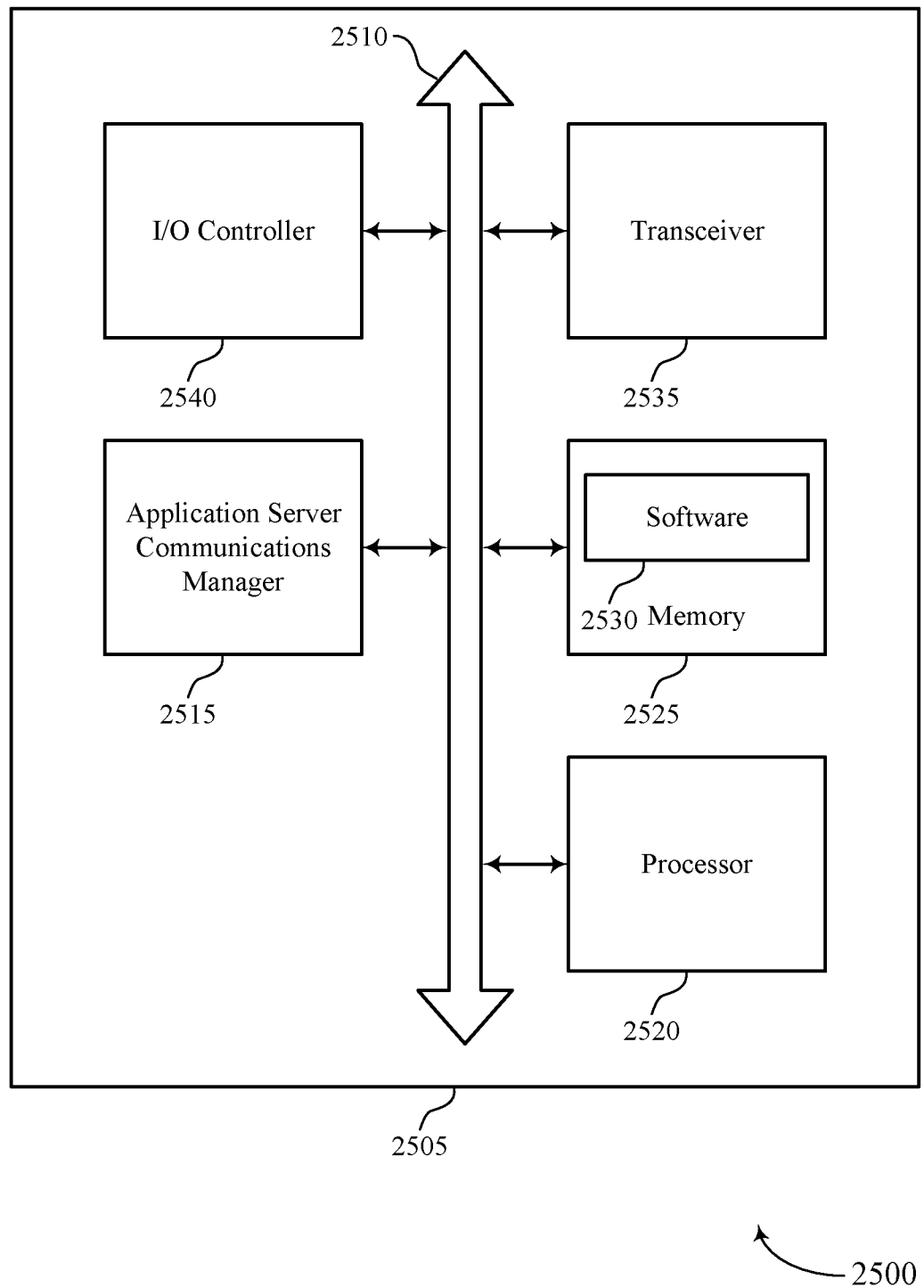
FIG. 25 illustrates a block diagram of a system including an application server that supports local broadcast for group calls in accordance with aspects of the present disclosure.

FIG. 25 shows a diagram of a system 2500 including a device 2505 that supports local broadcast for group calls in accordance with aspects of the present disclosure. Device 2505 may be an example of or include the components of an application server 605 as described above, e.g., with reference to FIG. 1. Device 2505 may include components for bi-directional voice and data communications including components for transmitting and receiving communications, including application server communications manager 2515, processor 2520, memory 2525, software 2530, transceiver 2535, and I/O controller 2540. These components may be in electronic communication via one or more buses (e.g., bus 2510).

Processor 2520 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 2520 may be configured to operate a memory array using a memory controller. In other cases, a memory controller may be integrated into processor 2520. Processor 2520 may be configured to execute computer-readable instructions stored in a memory to perform various functions (e.g., functions or tasks supporting local broadcast for group calls).

Memory 2525 may include RAM and ROM. The memory 2525 may store computer-readable, computer-executable software 2530 including instructions that, when executed, cause the processor to perform various functions described herein. In some cases, the memory 2525 may contain, among other things, a BIOS which may control basic hardware or software operation such as the interaction with peripheral components or devices.

Software 2530 may include code to implement aspects of the present disclosure, including code to support local broadcast for group calls. Software 2530 may be stored in a non-transitory computer-readable medium such as system memory or other memory. In some cases, the software 2530 may not be directly executable by the processor but may cause a computer (e.g., when compiled and executed) to perform functions described herein.

Transceiver 2535 may communicate bi-directionally, via one or more antennas, wired, or wireless links as described above. For example, the transceiver 2535 may represent a wireless transceiver and may communicate bi-directionally with another wireless transceiver or may represent a wired transceiver and may communicate bi-directionally with another wired transceiver. The transceiver 2535 may also include a modem to modulate the packets and provide the modulated packets to the antennas or a wired interface for transmission, and to demodulate packets received from the antennas or the wired interface.

I/O controller 2540 may manage input and output signals for device 2505. I/O controller 2540 may also manage peripherals not integrated into device 2505. In some cases, I/O controller 2540 may represent a physical connection or port to an external peripheral. In some cases, I/O controller 2540 may utilize an operating system such as iOS®, ANDROID®, MS-DOS®, MS-WINDOWS®, OS/2®, UNIX®, LINUX®, or another known operating system. In other cases, I/O controller 2540 may represent or interact with a modem, a keyboard, a mouse, a touchscreen, or a similar device. In some cases, I/O controller 2540 may be implemented as part of a processor. In some cases, a user may interact with device 2505 via I/O controller 2540 or via hardware components controlled by I/O controller 2540.

Figure 26:
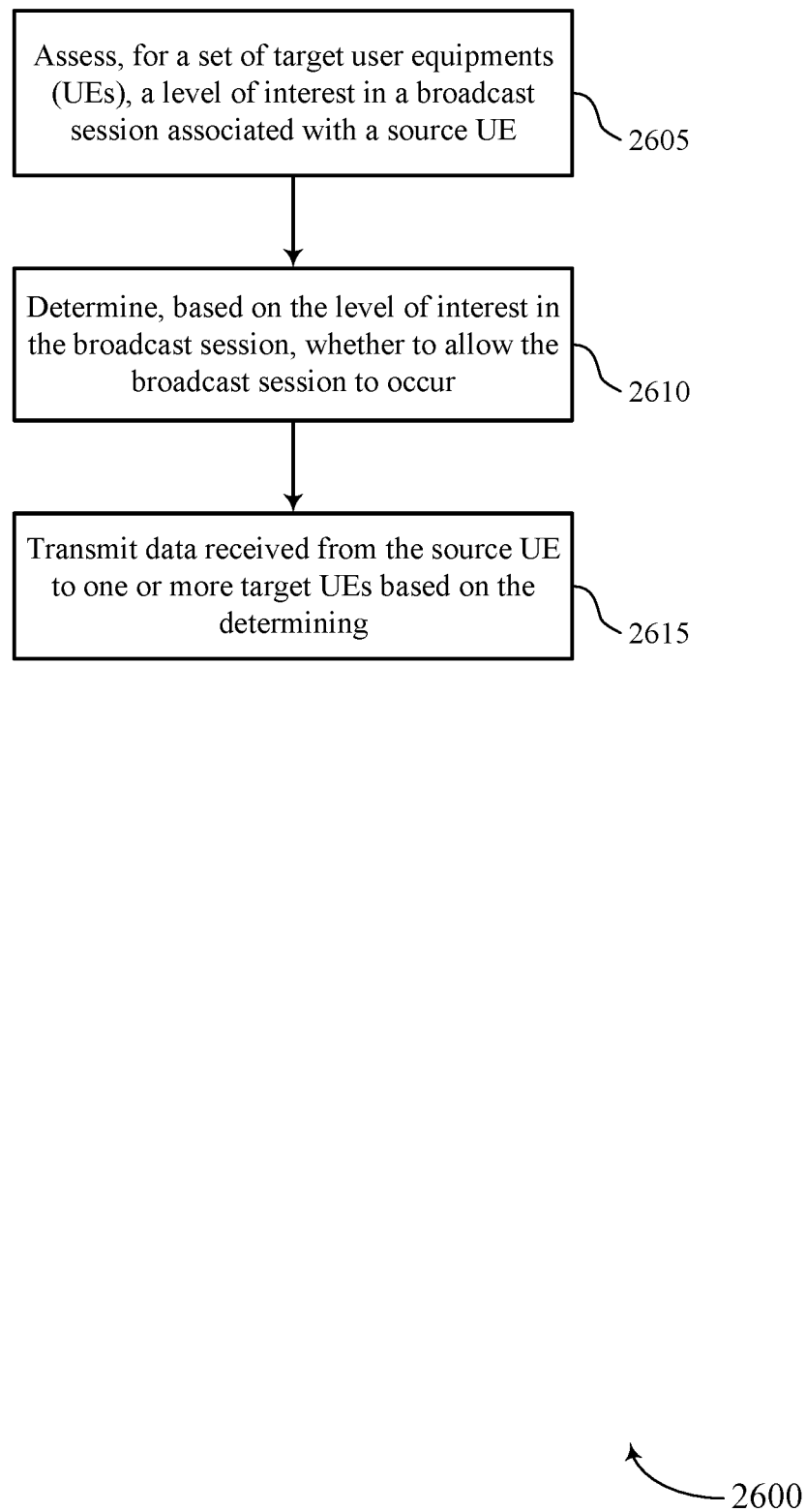
FIGS. 26 through 30 illustrate methods for local broadcast for group calls in accordance with aspects of the present disclosure.

FIG. 26 shows a flowchart illustrating a method 2600 for local broadcast for group calls in accordance with aspects of the present disclosure. The operations of method 2600 may be implemented by a base station 105 or its components as described herein. For example, the operations of method 2600 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 2605 the base station 105 may assess, for a plurality of target UEs, a level of interest in a broadcast session associated with a source UE. The operations of 2605 may be performed according to the methods described herein. In certain examples, aspects of the operations of 2605 may be performed by a broadcast interest manager as described with reference to FIGS. 10 through 13.

At 2610 the base station 105 may determine, based on the level of interest in the broadcast session, whether to allow the broadcast session to occur. The operations of 2610 may be performed according to the methods described herein. In certain examples, aspects of the operations of 2610 may be performed by a broadcast grant manager as described with reference to FIGS. 10 through 13.

At 2615 the base station 105 may transmit data received from the source UE to one or more target UEs based at least in part on the determining. The operations of 2615 may be performed according to the methods described herein. In certain examples, aspects of the operations of 2615 may be performed by a transmission manager as described with reference to FIGS. 10 through 13.

Figure 27:
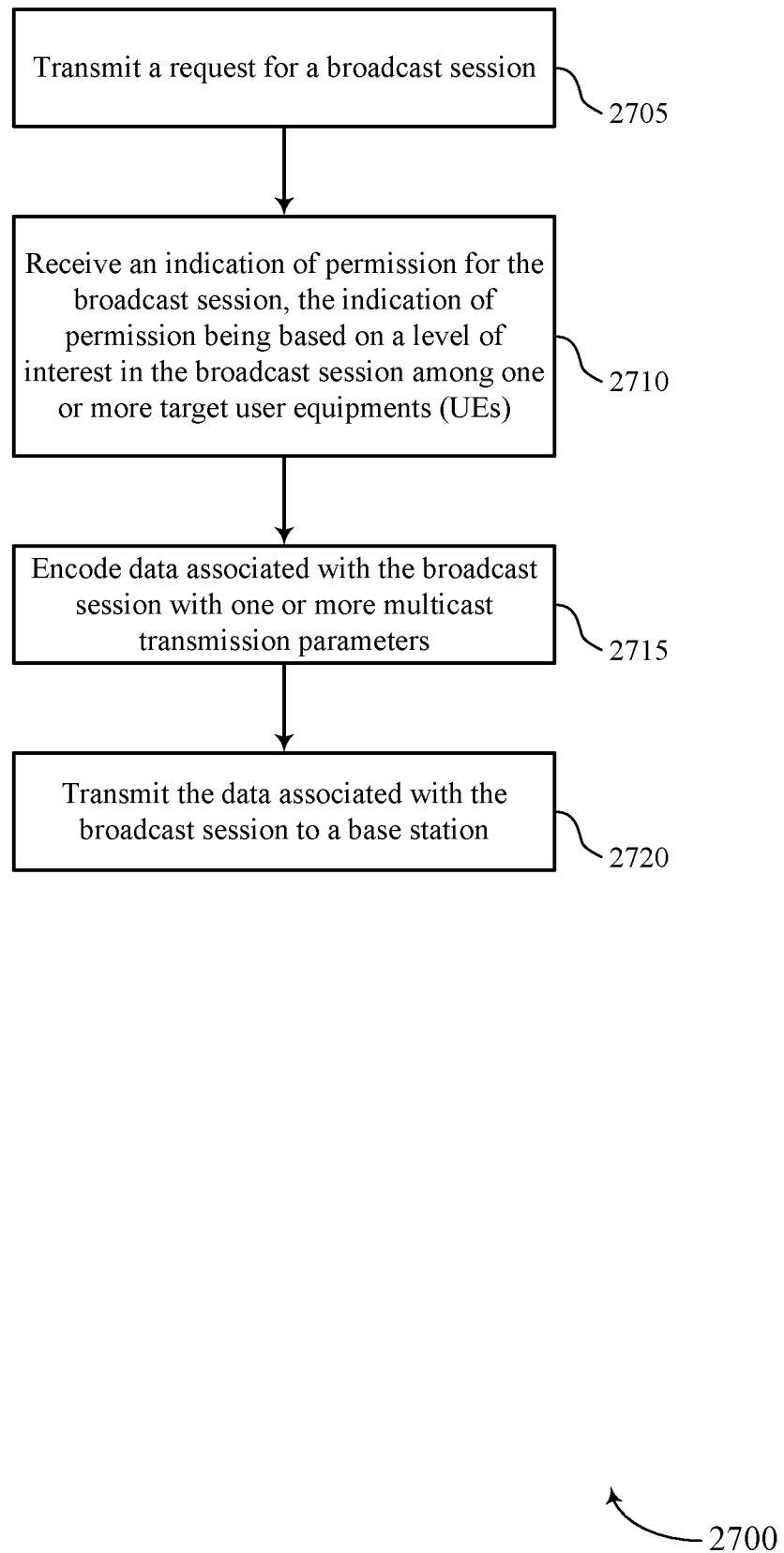

FIG. 27 shows a flowchart illustrating a method 2700 for local broadcast for group calls in accordance with aspects of the present disclosure. The operations of method 2700 may be implemented by a UE 115 or its components as described herein. For example, the operations of method 2700 may be performed by a UE communications manager as described with reference to FIGS. 14 through 17. In some examples, a UE 115 may execute a set of codes to control the functional elements of the device to perform the functions described below. Additionally or alternatively, the UE 115 may perform aspects of the functions described below using special-purpose hardware.

At 2705 the UE 115 may transmit a request for a broadcast session. The operations of 2705 may be performed according to the methods described herein. In certain examples, aspects of the operations of 2705 may be performed by a broadcast request manager as described with reference to FIGS. 14 through 17.

At 2710 the UE 115 may receive an indication of permission for the broadcast session, the indication of permission being based at least in part on a level of interest in the broadcast session among one or more target UEs. The operations of 2710 may be performed according to the methods described herein. In certain examples, aspects of the operations of 2710 may be performed by a broadcast grant manager as described with reference to FIGS. 14 through 17.

At 2715 the UE 115 may encode data associated with the broadcast session with one or more multicast transmission parameters. The operations of 2715 may be performed according to the methods described herein. In certain examples, aspects of the operations of 2715 may be performed by a broadcast encoding manager as described with reference to FIGS. 14 through 17.

At 2720 the UE 115 may transmit the data associated with the broadcast session to a base station. The operations of 2720 may be performed according to the methods described herein. In certain examples, aspects of the operations of 2720 may be performed by a broadcast data manager as described with reference to FIGS. 14 through 17.

Figure 28:
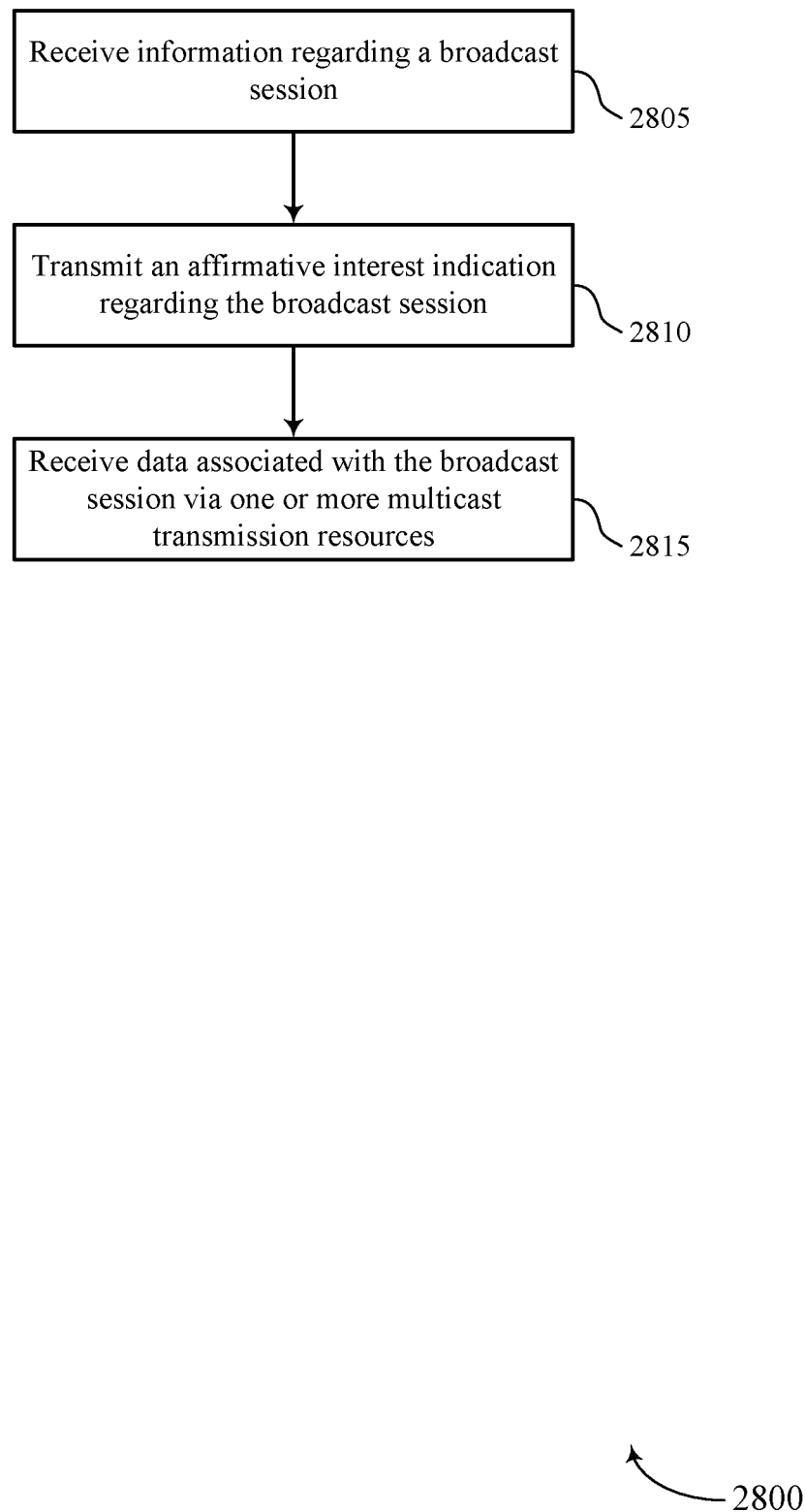

FIG. 28 shows a flowchart illustrating a method 2800 for local broadcast for group calls in accordance with aspects of the present disclosure. The operations of method 2800 may be implemented by a UE 115 or its components as described herein. For example, the operations of method 2800 may be performed by a UE communications manager as described with reference to FIGS. 14 through 17. In some examples, a UE 115 may execute a set of codes to control the functional elements of the device to perform the functions described below. Additionally or alternatively, the UE 115 may perform aspects of the functions described below using special-purpose hardware.

At 2805 the UE 115 may receive information regarding a broadcast session. The operations of 2805 may be performed according to the methods described herein. In certain examples, aspects of the operations of 2805 may be performed by a broadcast reception manager as described with reference to FIGS. 14 through 17.

At 2810 the UE 115 may transmit an affirmative interest indication regarding the broadcast session. The operations of 2810 may be performed according to the methods described herein. In certain examples, aspects of the operations of 2810 may be performed by an interest indication manager as described with reference to FIGS. 14 through 17.

At 2815 the UE 115 may receive data associated with the broadcast session via one or more multicast transmission resources. The operations of 2815 may be performed according to the methods described herein. In certain examples, aspects of the operations of 2815 may be performed by a broadcast reception manager as described with reference to FIGS. 14 through 17.

Figure 29:
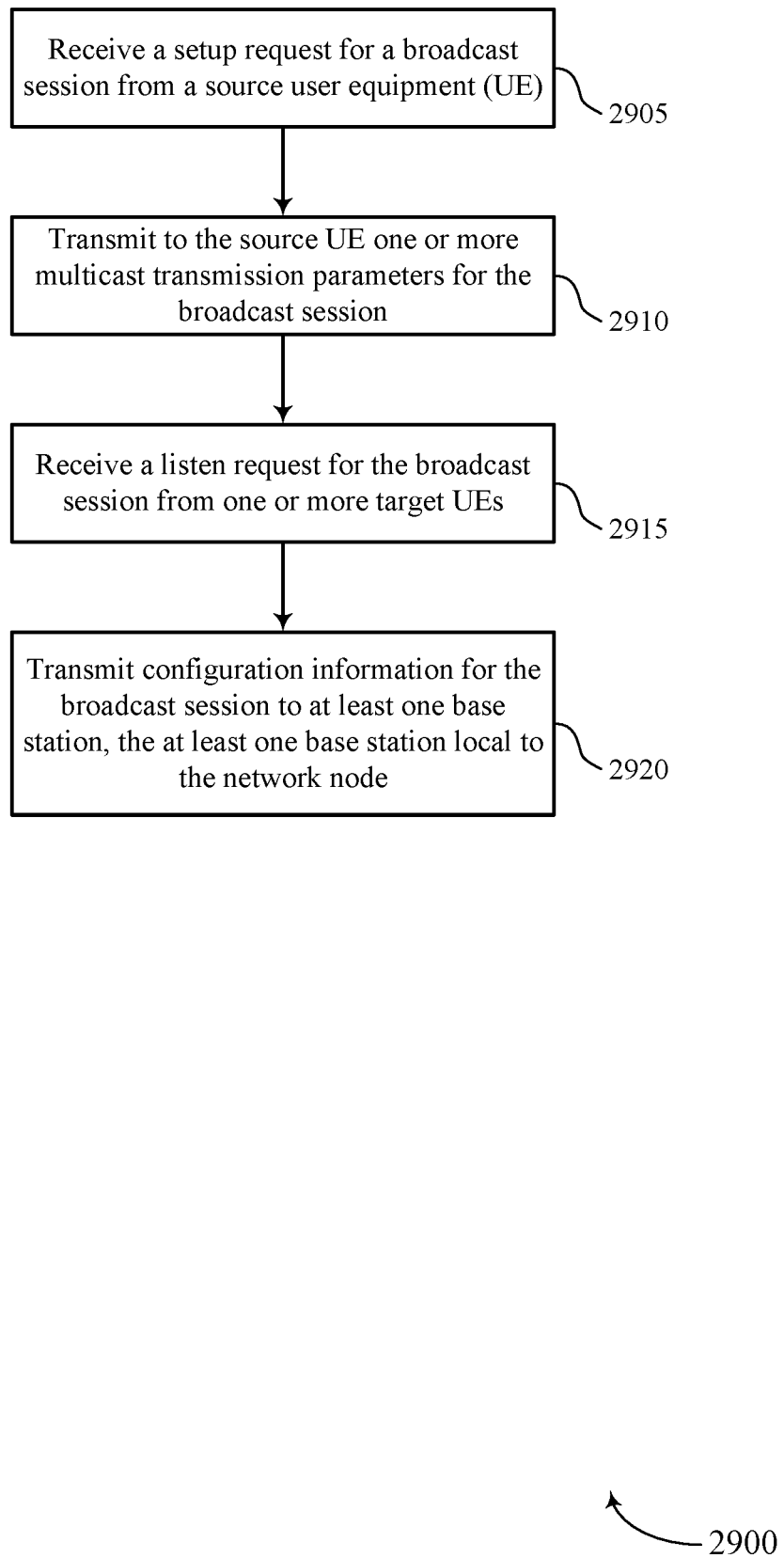

FIG. 29 shows a flowchart illustrating a method 2900 for local broadcast for group calls in accordance with aspects of the present disclosure. The operations of method 2900 may be implemented by a local server 205 or its components as described herein. For example, the operations of method 2900 may be performed by a local server communications manager as described with reference to FIGS. 18 through 21. In some examples, a local server 205 may execute a set of codes to control the functional elements of the device to perform the functions described below. Additionally or alternatively, the local server 205 may perform aspects of the functions described below using special-purpose hardware.

At 2905 the local server 205 may receive a setup request for a broadcast session from a source user equipment (UE). The operations of 2905 may be performed according to the methods described herein. In certain examples, aspects of the operations of 2905 may be performed by a broadcast request manager as described with reference to FIGS. 18 through 21.

At 2910 the local server 205 may transmit to the source UE one or more multicast transmission parameters for the broadcast session. The operations of 2910 may be performed according to the methods described herein. In certain examples, aspects of the operations of 2910 may be performed by a broadcast parameters manager as described with reference to FIGS. 18 through 21.

At 2915 the local server 205 may receive a listen request for the broadcast session from one or more target UEs. The operations of 2915 may be performed according to the methods described herein. In certain examples, aspects of the operations of 2915 may be performed by a broadcast listen request manager as described with reference to FIGS. 18 through 21.

At 2920 the local server 205 may transmit configuration information for the broadcast session to at least one base station, the at least one base station local to the network node. The operations of 2920 may be performed according to the methods described herein. In certain examples, aspects of the operations of 2920 may be performed by a broadcast session manager as described with reference to FIGS. 18 through 21.

Figure 30:
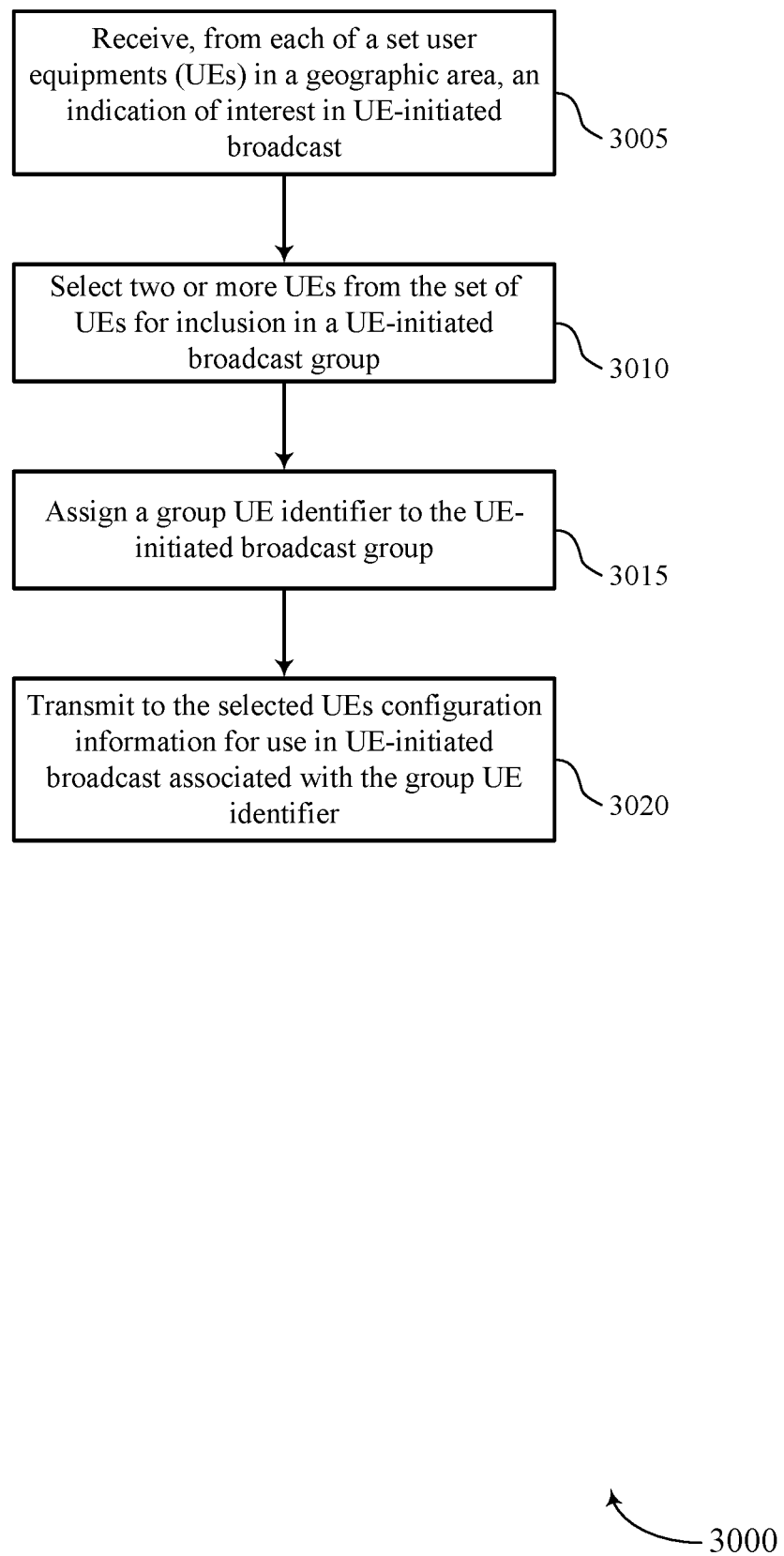

FIG. 30 shows a flowchart illustrating a method 3000 for local broadcast for group calls in accordance with aspects of the present disclosure. The operations of method 3000 may be implemented by an application server 605 or its components as described herein. For example, the operations of method 3000 may be performed by an application server communications manager as described with reference to FIGS. 22 through 25. In some examples, an application server 605 may execute a set of codes to control the functional elements of the device to perform the functions described below. Additionally or alternatively, the application server 605 may perform aspects of the functions described below using special-purpose hardware.

At 3005 the application server 605 may receive, from each of a plurality UEs in a geographic area, an indication of interest in UE-initiated broadcast. The operations of 3005 may be performed according to the methods described herein. In certain examples, aspects of the operations of 3005 may be performed by a broadcast session manager as described with reference to FIGS. 22 through 25.

At 3010 the application server 605 may select two or more UEs from the plurality of UEs for inclusion in a UE-initiated broadcast group. The operations of 3010 may be performed according to the methods described herein. In certain examples, aspects of the operations of 3010 may be performed by a broadcast group manager as described with reference to FIGS. 22 through 25.

At 3015 the application server 605 may assign a group UE identifier to the UE-initiated broadcast group. The operations of 3015 may be performed according to the methods described herein. In certain examples, aspects of the operations of 3015 may be performed by a broadcast group manager as described with reference to FIGS. 22 through 25.

At 3020 the application server 605 may transmit to the selected UEs configuration information for use in UE-initiated broadcast associated with the group UE identifier. The operations of 3020 may be performed according to the methods described herein. In certain examples, aspects of the operations of 3020 may be performed by a broadcast configuration manager as described with reference to FIGS. 22 through 25.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a base station, comprising:
assessing, by the base station and for a plurality of target user equipments (UEs), a level of interest in a broadcast session associated with a source UE, wherein the assessing comprises:
transmitting an interest query regarding the broadcast session to one or more target UEs, the one or more target UEs associated with a UE group identifier, and the interest query encoded with the UE group identifier; and
receiving, by the base station, an interest indication regarding the broadcast session from one or more target UEs;
determining, by the base station and based on the level of interest in the broadcast session, whether to allow the broadcast session to occur; and
transmitting, by the base station, data received from the source UE to one or more target UEs based at least in part on the determining.

2. The method of claim 1, wherein transmitting the interest query to one or more target UEs, the one or more target UEs associated with the UE group identifier comprises:
transmitting the interest query via one or more system information blocks (SIBs), a physical multicast channel (PMCH), a physical downlink shared channel (PDSCH), or any combination thereof.

3. The method of claim 1, wherein assessing, for the plurality of target UEs, the level of interest in the broadcast session further comprises:
determining a number of affirmative interest indications regarding the broadcast session received within a preconfigured time duration after transmitting the interest query to one or more target UEs.

4. The method of claim 1, further comprising:
determining to allow the broadcast session to occur; and
transmitting a broadcast grant to the source UE.

5. The method of claim 4, further comprising:
receiving, from the source UE, data encoded with one or more multicast transmission parameters; and
transmitting the encoded data received from the source UE to the one or more target UEs via a multicast transmission.

6. The method of claim 1, further comprising:
receiving, from the source UE, a request for the broadcast session comprising a group identifier corresponding to the plurality of target UEs, an indication of an amount of data for the broadcast session, an indication of a data rate for the broadcast session, an indication of a type of data for the broadcast session, information regarding content for the broadcast session, or any combination thereof.

7. The method of claim 1, wherein transmitting data received from the source UE to one or more target UEs based at least in part on the determining comprises:
transmitting the data associated with the broadcast session to a base station serving at least one of the one or more target UEs.

8. The method of claim 1, further comprising:
determining one or more multicast transmission resources for the broadcast session; and
transmitting information regarding the one or more multicast transmission resources for the broadcast session to the one or more target UEs via one or more system information blocks (SIBs), a physical multicast channel (PMCH), a physical downlink shared channel (PDSCH), or any combination thereof.

9. The method of claim 8, further comprising:
receiving a request from a target UE to utilize a carrier corresponding to the one or more multicast transmission resources; and
configuring the target UE to utilize the carrier corresponding to the one or more multicast transmission resources.

10. The method of claim 1, further comprising:
receiving configuration information for the broadcast session from a local server, the local server dedicated to serving a localized area that includes a base station; and
transmitting the configuration information for the broadcast session via one or more system information blocks (SIBs), a physical multicast channel (PMCH), a physical downlink shared channel (PDSCH), or any combination thereof.

11. The method of claim 1, further comprising:
broadcasting an indication of support for UE-initiated broadcast via one or more system information blocks (SIBs), a physical multicast channel (PMCH), a physical downlink shared channel (PDSCH), or any combination thereof.

12. The method of claim 1, wherein transmitting data received from the source UE to one or more target UEs based at least in part on the determining comprises:
transmitting the data associated with the broadcast session to the one or more target UEs without transmitting the data associated with the broadcast session to any network node.

13. The method of claim 1, further comprising:
determining a value metric for the broadcast session, wherein the value metric is based at least in part on an amount of transmission resources associated with the broadcast session, a duration of the broadcast session, a number of target UEs associated with the broadcast session, an amount of data associated with the broadcast session, a data rate associated with the broadcast session, a geographic area associated with the broadcast session, a calendar day associated with the broadcast session, a time of day associated with the broadcast session, or any combination thereof; and
transmitting the value metric to a network node.

14. The method of claim 1, further comprising:
determining not to allow the broadcast session to occur; and
transmitting a broadcast denial to the source UE.

15. A method for wireless communication at a source user equipment (UE), comprising:
transmitting, by the source UE, a request for a broadcast session;
receiving, by the source UE, an indication of permission for the broadcast session, the indication of permission being based at least in part on a level of interest in the broadcast session among one or more target UEs;
encoding, by the source UE, data associated with the broadcast session with one or more multicast transmission parameters;
transmitting, by the source UE, the data associated with the broadcast session to a base station; and
receiving a broadcast release message from the base station or from a local server dedicated to serving a localized area that includes the base station, the broadcast release message based at least in part on an updated level of interest in the broadcast session among the one or more target UEs.

16. The method of claim 15, wherein encoding the data associated with the broadcast session with one or more multicast transmission parameters comprises:
addressing the data associated with the broadcast session to one or more Internet protocol (IP) addresses, encoding the data associated with the broadcast session using a forward error correction encoding algorithm, encrypting the data associated with the broadcast session using an encryption key, encoding the data associated with the broadcast session in accordance with an audio or video codec, compressing one or more headers for the data associated with the broadcast session, or any combination thereof.

17. The method of claim 15, wherein transmitting the request for the broadcast session comprises:
transmitting a group identifier corresponding to a group of UEs, an indication of an amount of data for the broadcast session, an indication of a data rate for the broadcast session, an indication of a type of data for the broadcast session, information regarding content for the broadcast session, or any combination thereof.

18. The method of claim 15, wherein transmitting the request for the broadcast session comprises:
transmitting the request for the broadcast session to the base station or to a local server dedicated to serving a localized area that includes the base station.

19. The method of claim 15, further comprising:
determining completion of the broadcast session; and
transmitting a broadcast release request to the base station or to a local server dedicated to serving a localized area that includes the base station.

20. The method of claim 15, further comprising:
transmitting an authentication message to the base station or to a local server dedicated to serving a localized area that includes the base station.

21. A method for wireless communication at a network node, comprising:
receiving a setup request for a broadcast session from a source user equipment (UE);
transmitting to the source UE one or more multicast transmission parameters for the broadcast session;
receiving a listen request for the broadcast session from one or more target UEs;
transmitting configuration information for the broadcast session to at least one base station, the at least one base station local to the network node; and
transmitting to the source UE a broadcast release message based at least in part on an insufficient level of interest in the broadcast session.

22. The method of claim 21, wherein transmitting to the source UE one or more multicast transmission parameters for the broadcast session comprises:
transmitting to the source UE a user service description (USD) for the broadcast session, one or more Internet protocol (IP) addresses corresponding to the one or more target UEs, transmitting to the source UE an encryption key for the broadcast session, or any combination thereof.

23. A method for wireless communication at a network node, comprising:
receiving, from each of a plurality user equipments (UEs) in a geographic area, an indication of interest in private UE-initiated broadcast;
analyzing contact lists associated with the plurality of UEs to identify two or more UEs as common to each of the contact lists associated with the plurality of UEs;
selecting the two or more UEs from the plurality of UEs for inclusion in a UE-initiated broadcast group, the selecting based at least in part on the two or more UEs being common to each of the contact lists associated with the plurality of UEs;
assigning a group UE identifier to the UE-initiated broadcast group; and
transmitting to the selected UEs configuration information for use in UE-initiated broadcast associated with the group UE identifier.

24. The method of claim 23, further comprising:
receiving an additional indication of interest in UE-initiated broadcast from an additional UE in the geographic area;
selecting the additional UE for inclusion in the UE-initiated broadcast group; and
transmitting to the additional UE configuration information for use in a UE-initiated broadcast associated with the group UE identifier.

25. The method of claim 23, wherein the configuration information for use in UE-initiated broadcast associated with the group UE identifier comprises session description protocol (SDP) information, encryption information, or any combination thereof.

* * * * *